US011736449B2

(12) United States Patent
Yorga et al.

(10) Patent No.: US 11,736,449 B2
(45) Date of Patent: Aug. 22, 2023

(54) SYSTEM AND METHOD TO ALLOW ANONYMOUS USERS TO CONTRIBUTE MULTIMEDIA CONTENT ACROSS MULTIPLE DIGITAL WORKSPACES

(71) Applicant: Nureva Inc., Calgary (CA)

(72) Inventors: Erica Patricia Yorga, Calgary (CA); Gabriela Alexandra Jurca, Calgary (CA); Ian Richard Collinson, Calgary (CA); David Gregory Popovich, Ottawa (CA); Suzanne Marie Ferguson, Calgary (CA)

(73) Assignee: Nureva, Inc., Calgary (CA)

( * ) Notice: Subject to any disclaimer, the term of this patent is extended or adjusted under 35 U.S.C. 154(b) by 302 days.

(21) Appl. No.: 17/116,654

(22) Filed: Dec. 9, 2020

(65) Prior Publication Data

US 2021/0176216 A1     Jun. 10, 2021

Related U.S. Application Data

(60) Provisional application No. 62/945,982, filed on Dec. 10, 2019.

(51) Int. Cl.
*H04L 29/06*      (2006.01)
*H04L 9/40*       (2022.01)
(Continued)

(52) U.S. Cl.
CPC .......... *H04L 63/0421* (2013.01); *G06F 9/541* (2013.01); *G06F 16/2379* (2019.01); *G06F 21/44* (2013.01); *H04L 65/403* (2013.01)

(58) Field of Classification Search
CPC ...... G06F 21/62; G06F 16/2379; G06F 9/541; G06F 21/44; H04L 63/065; H04L 63/10;
(Continued)

(56) References Cited

U.S. PATENT DOCUMENTS

| 7,730,030 B1* | 6/2010 | Xu | G06Q 10/10 |
| | | | 707/758 |
| 2005/0288961 A1* | 12/2005 | Tabrizi | G06Q 10/00 |
| | | | 717/126 |

(Continued)

FOREIGN PATENT DOCUMENTS

| CA | 2930415 A1 | 5/2015 |
| GB | 2518244 A | 3/2015 |
| WO | 2006028850 A2 | 3/2006 |

OTHER PUBLICATIONS

International Search Report and Written Opinion dated Mar. 22, 2021, from PCT Application No. PCT/CA2020/051690, 12 sheets.
(Continued)

*Primary Examiner* — Malcolm Cribbs
(74) *Attorney, Agent, or Firm* — Katten Muchin Rosenman LLP

(57) ABSTRACT

The disclosed invention provides system and method for providing electronic collaborations between a plurality of user devices connected through networks. The user devices include one or more collaborator devices and one or more anonymous contributor devices. The system includes instructions for contribution processor and instructions for digital workspace processor. The contribution processor is coupled through the networks to the one or more anonymous contributor devices including contribution applications, and the digital workspace processor is coupled through the networks to the one or more collaborator devices including digital workspace applications. The system and method allows anonymous devices geographically located anywhere, in real-time, to simultaneously contribute data for the purpose of using the contributed data in one or more unique digital workspaces.

35 Claims, 63 Drawing Sheets

(51) Int. Cl.
  *G06F 9/54* (2006.01)
  *H04L 65/403* (2022.01)
  *G06F 21/44* (2013.01)
  *G06F 16/23* (2019.01)

(58) Field of Classification Search
  CPC ... H04L 63/101; H04L 63/102; H04L 63/104; H04L 63/105; H04L 63/0421; H04L 65/403; H04L 12/1831; H04L 67/131
  See application file for complete search history.

(56) References Cited

U.S. PATENT DOCUMENTS

2014/0149880 A1   5/2014  Farouki
2019/0121961 A1*  4/2019  Coleman ............. H04L 63/0227

OTHER PUBLICATIONS

Abdel-Wahab, "Multiuser tools architecture for group collaboration in computer networks". Computer Communications, Apr. 1990 (Apr. 1990), vol. 13(3), pp. 165-169, DOI:10.1016/0140-3664(90)90102-M, *the entire document, particularly System Architecture*.

* cited by examiner

FIG. 1 (100) Prior Art
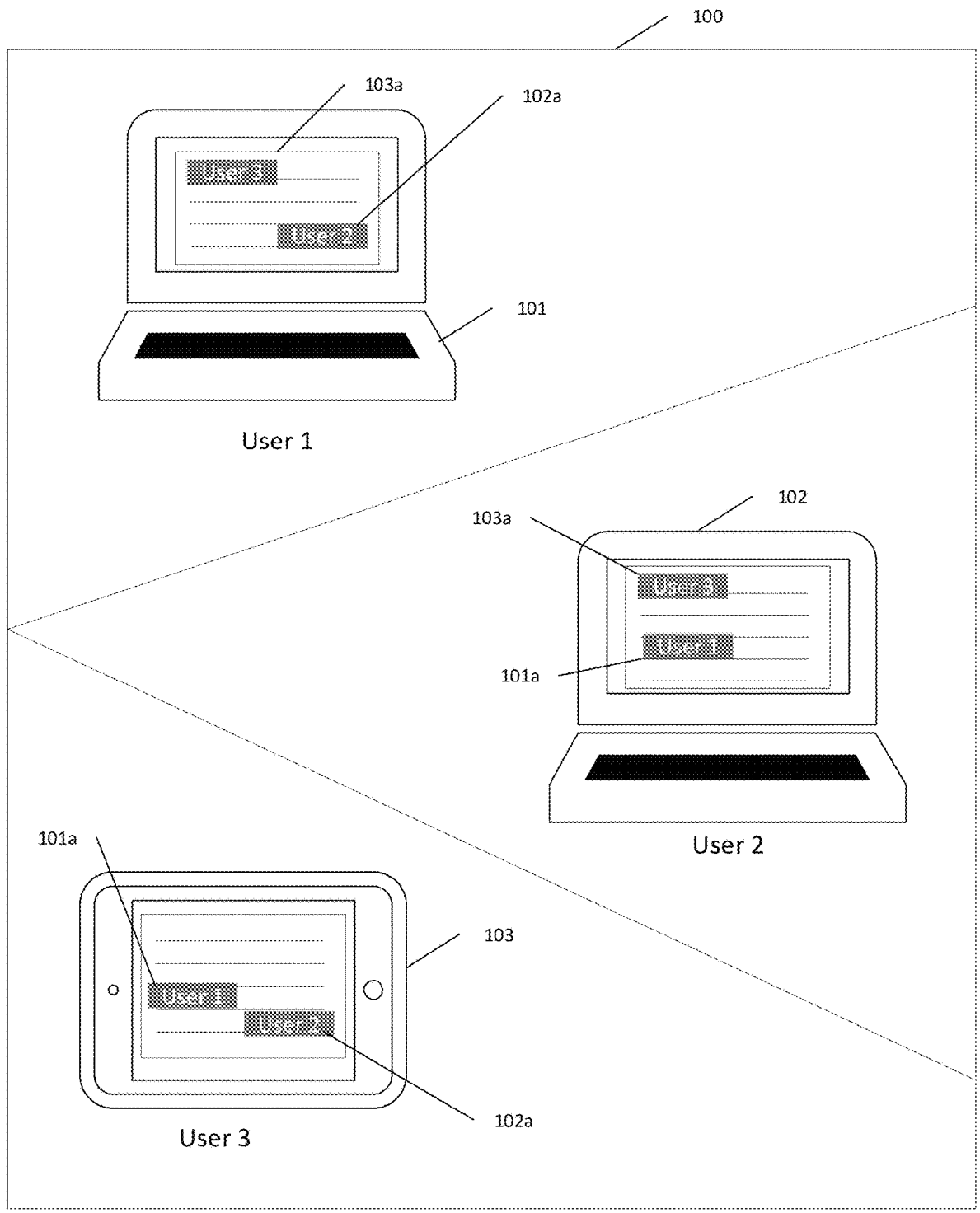

FIG. 2 (200) Prior Art
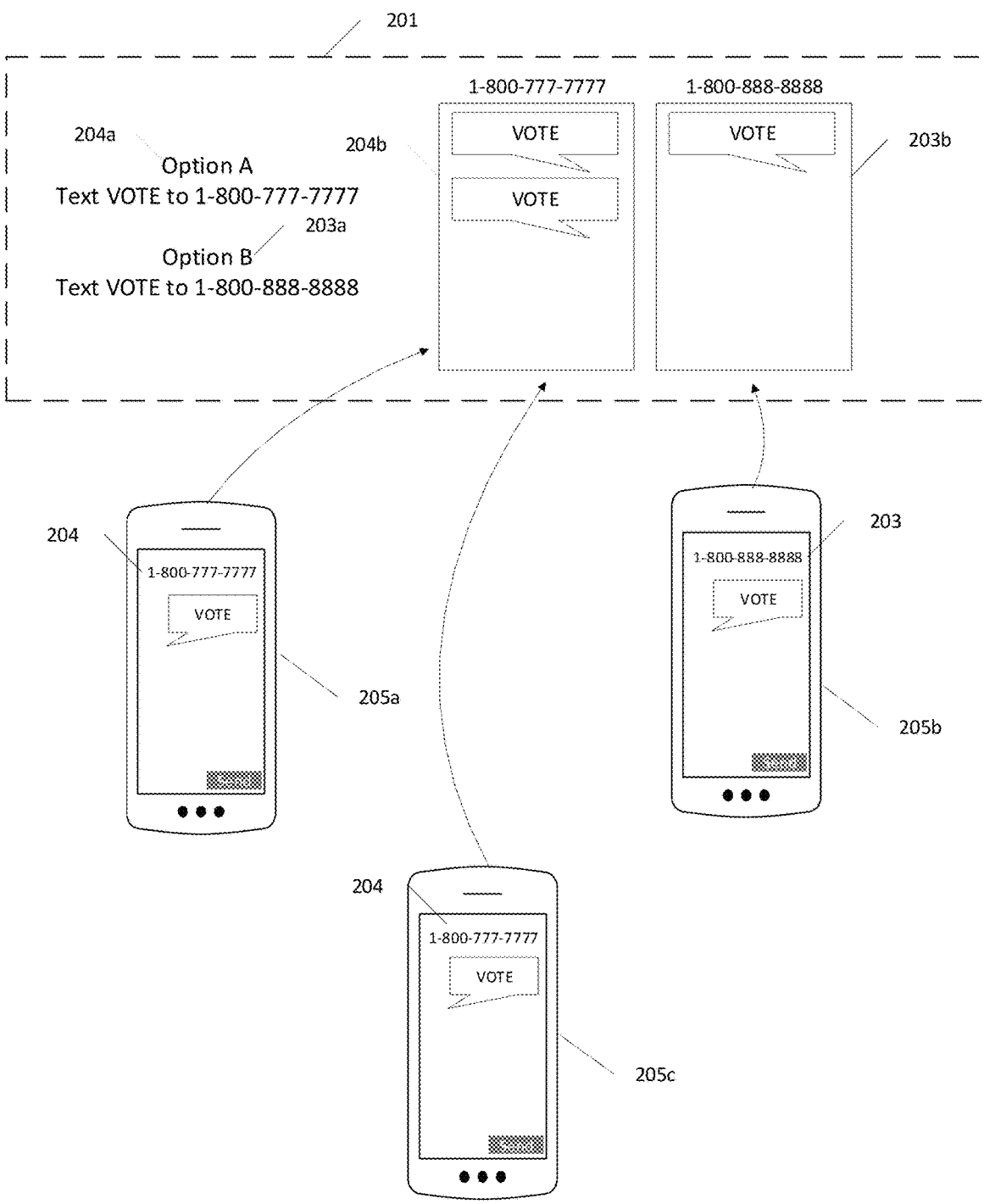

FIG. 3 (300) Prior Art
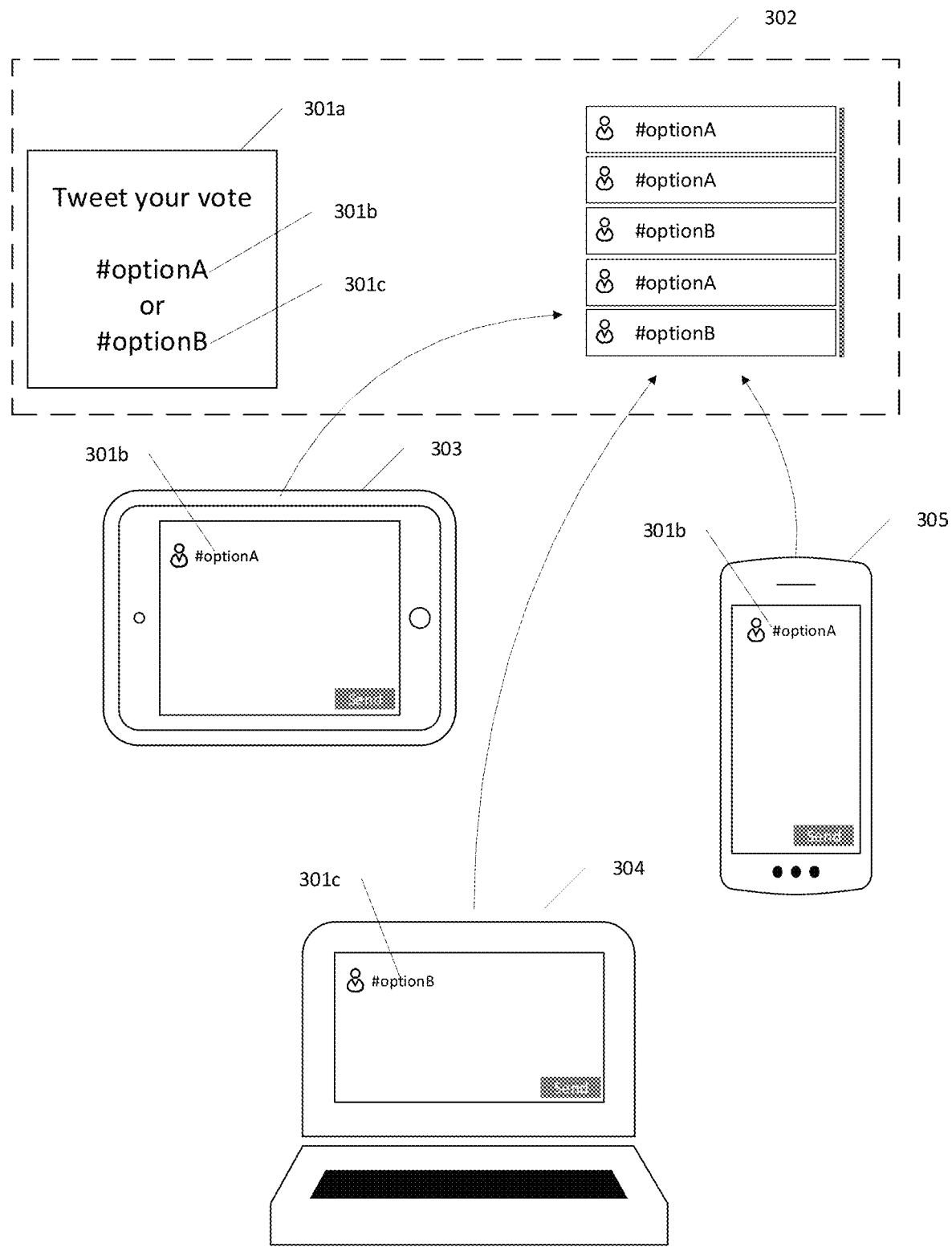

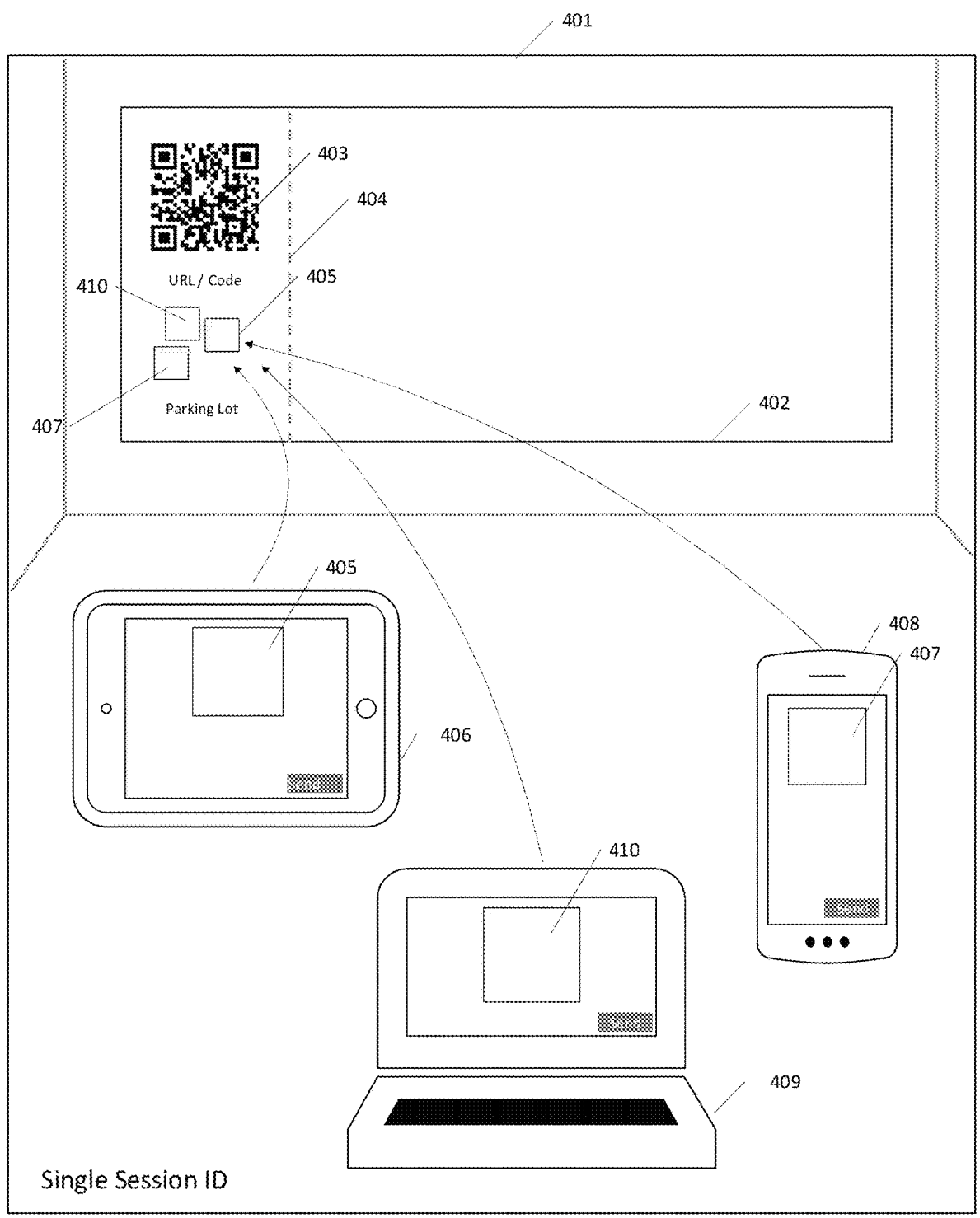
FIG. 4a (400) Prior Art

FIG. 4b (400) – Prior Art
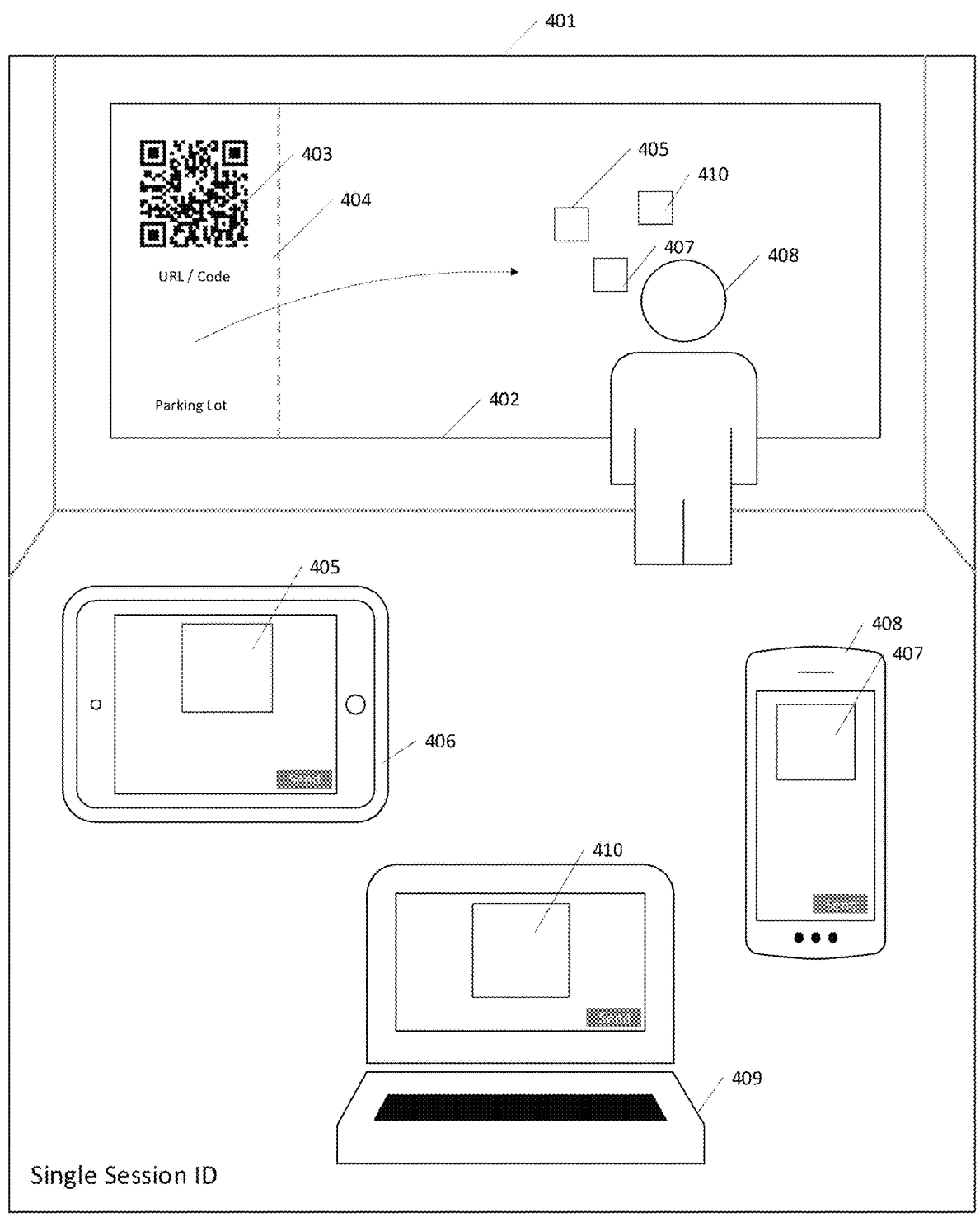

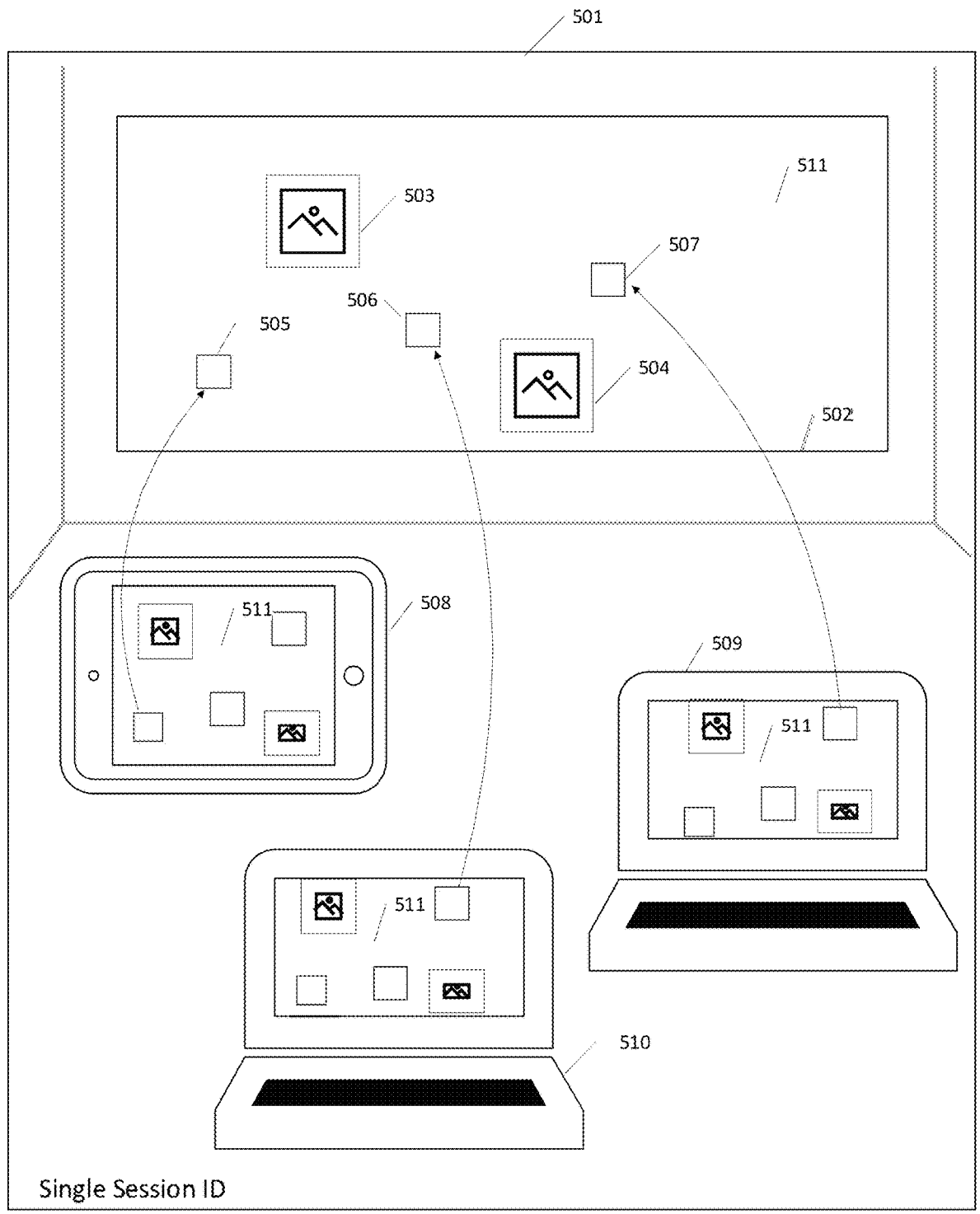

Fig. 6a System Diagram
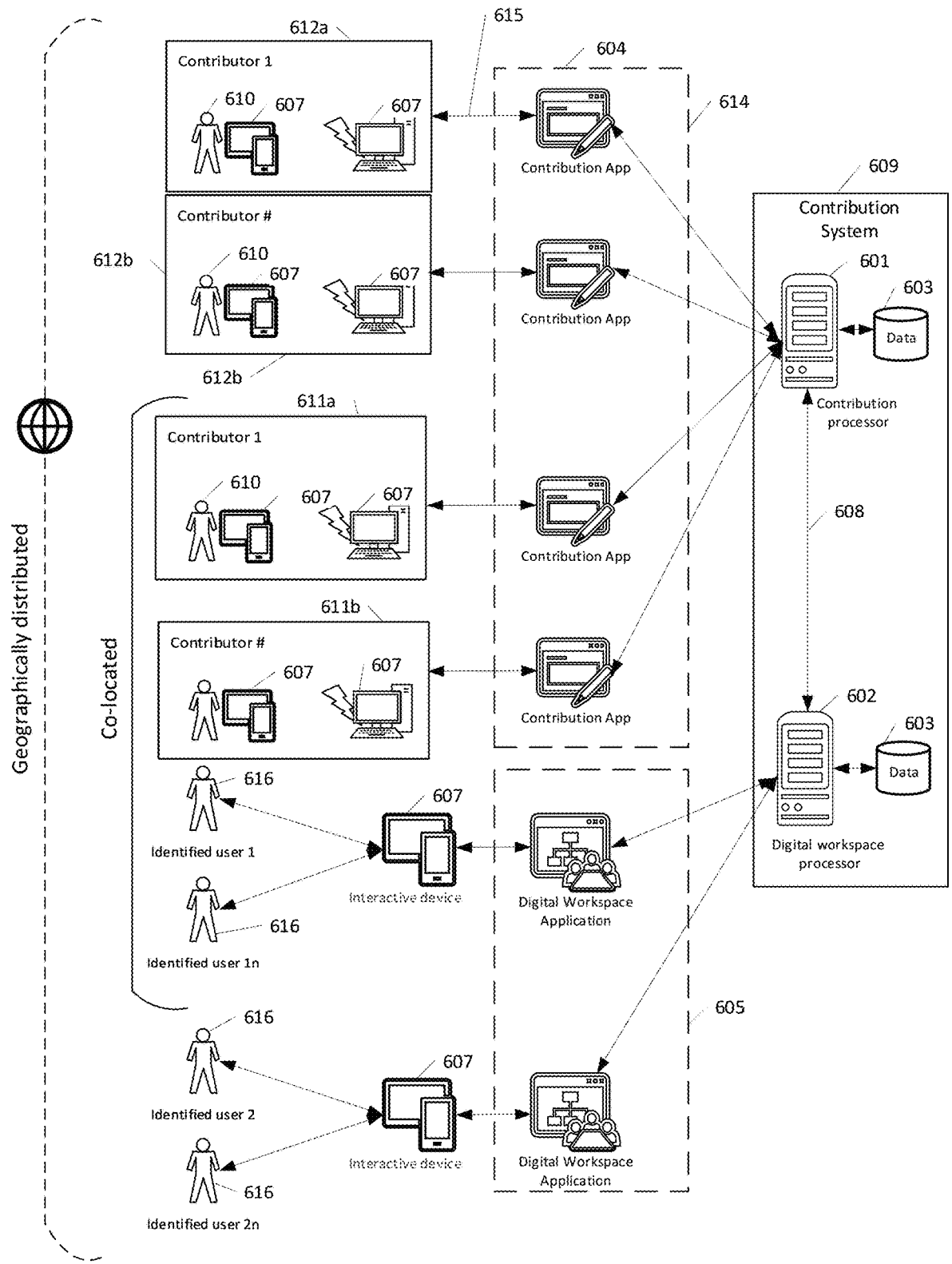

Fig. 6b System Diagram Con't
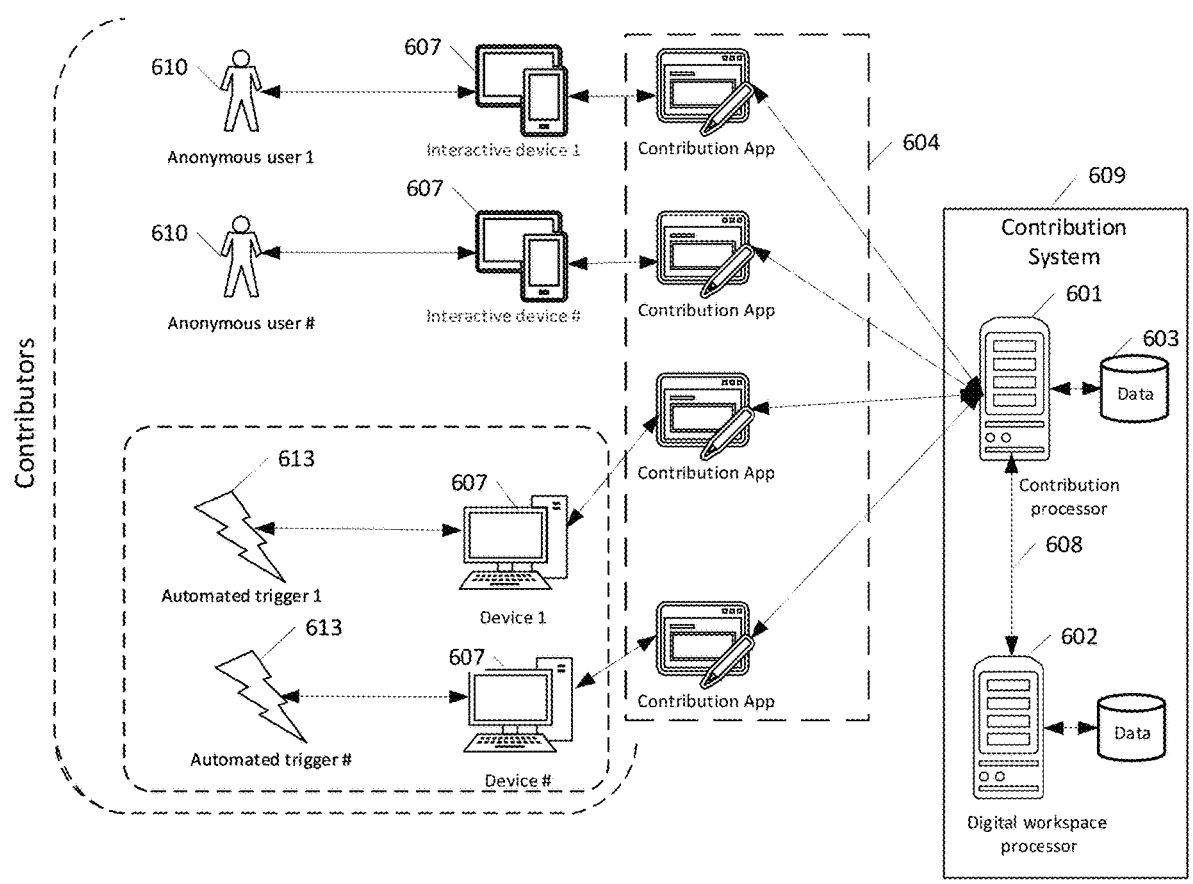

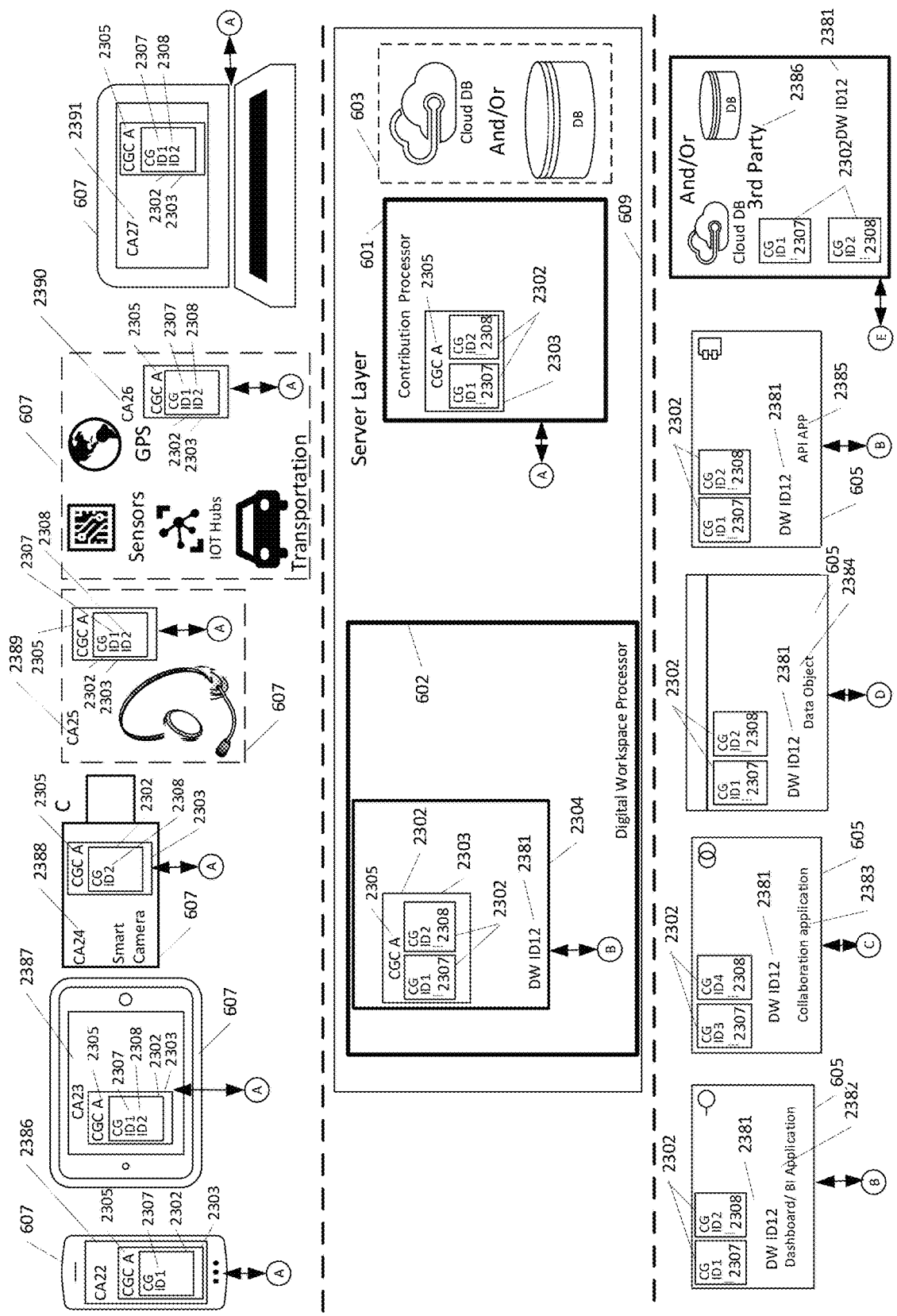

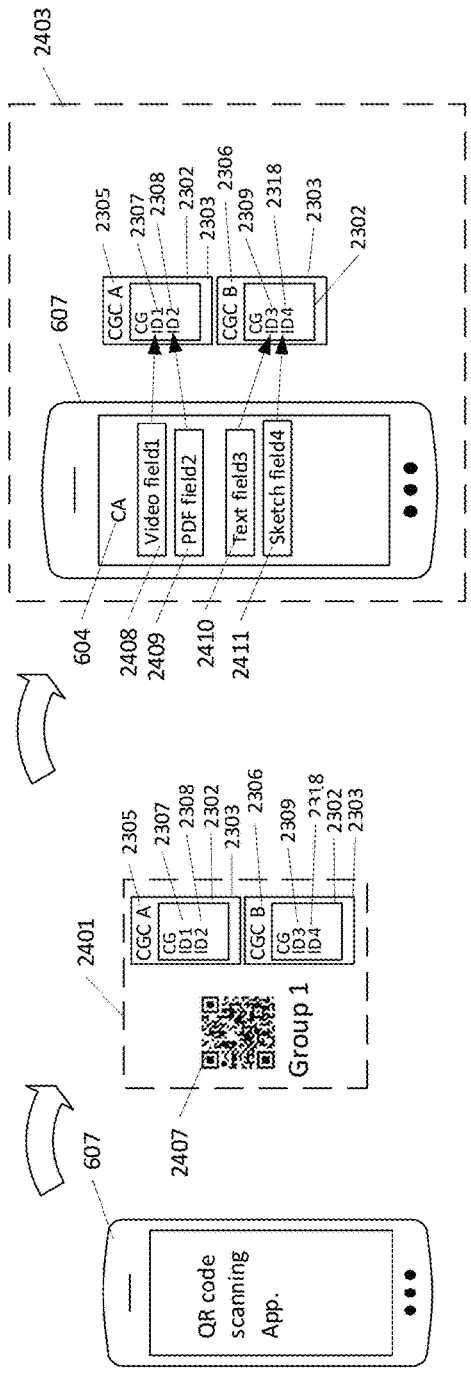

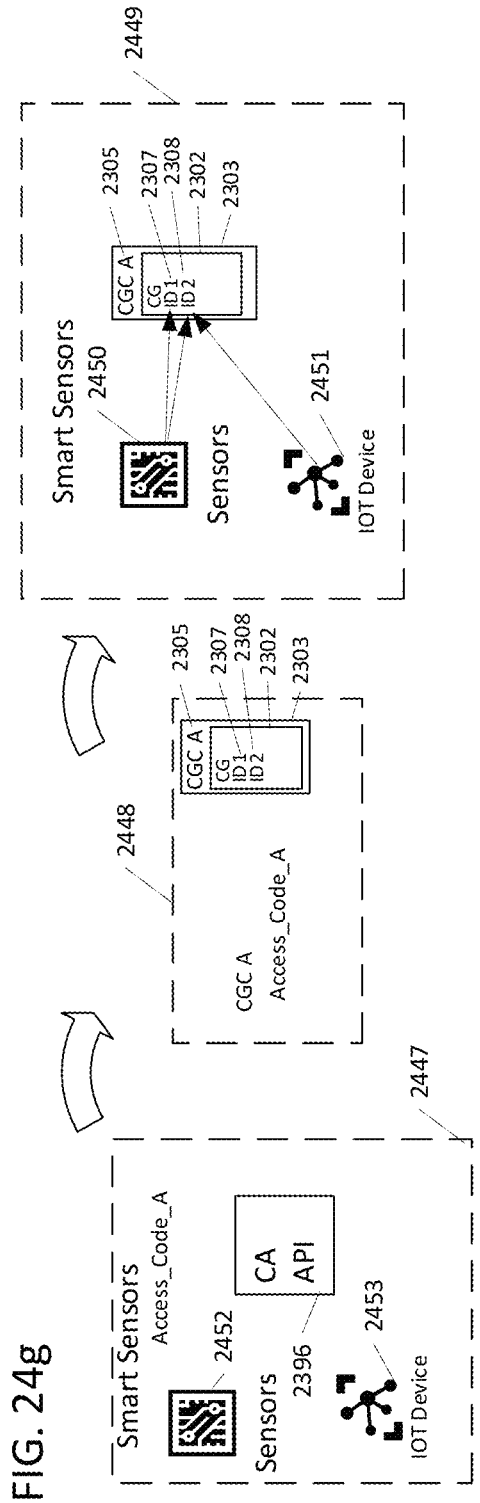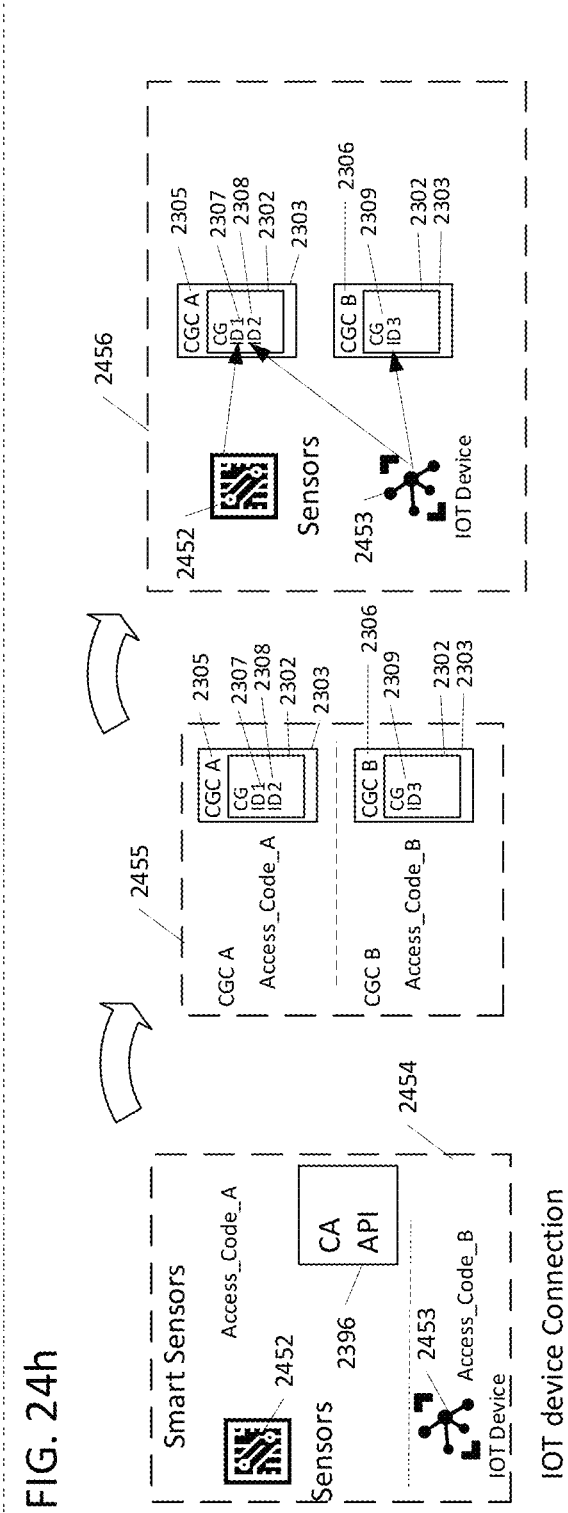

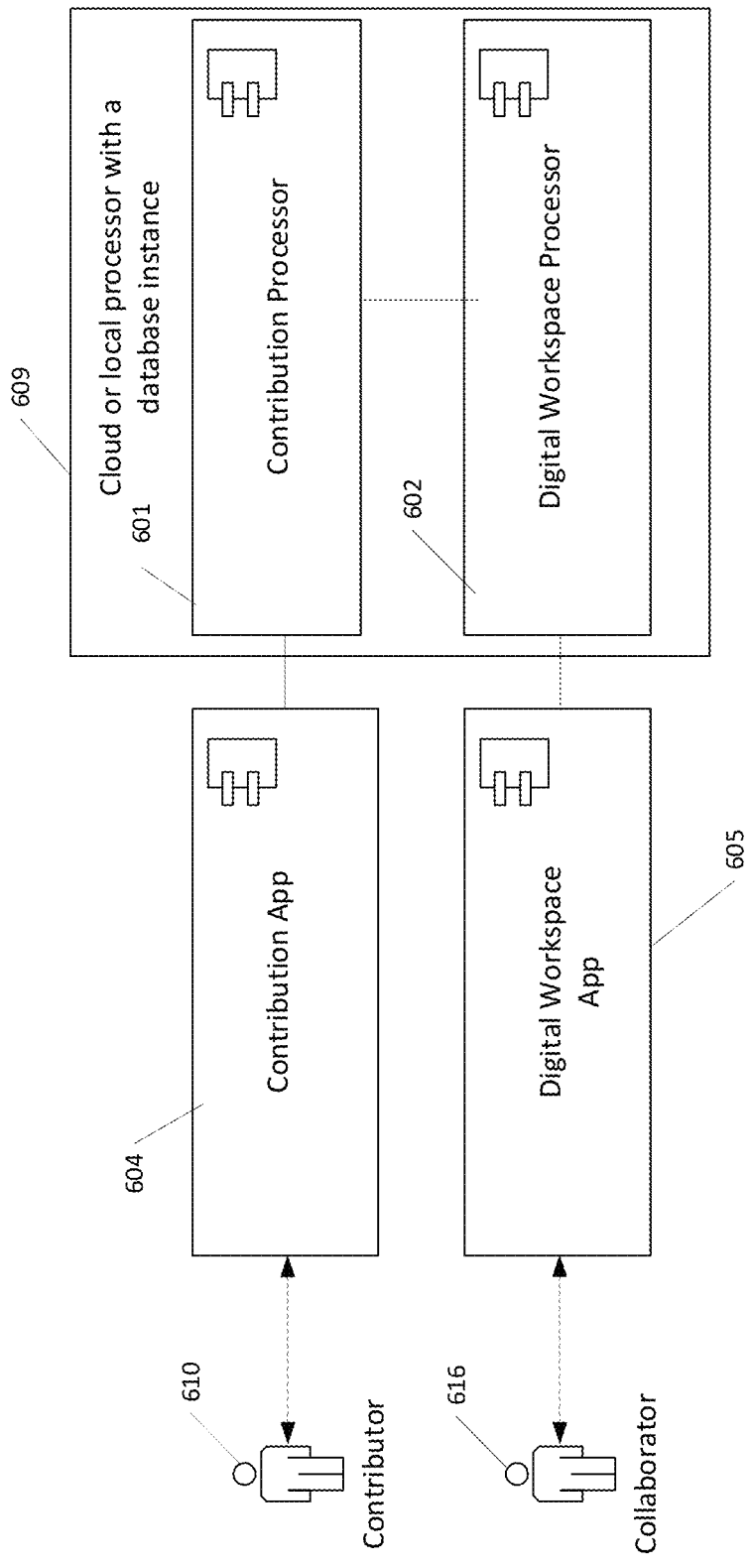
FIG. 25a Function Diagram

FIG. 27a A contributor attempts to connect to a contribution session
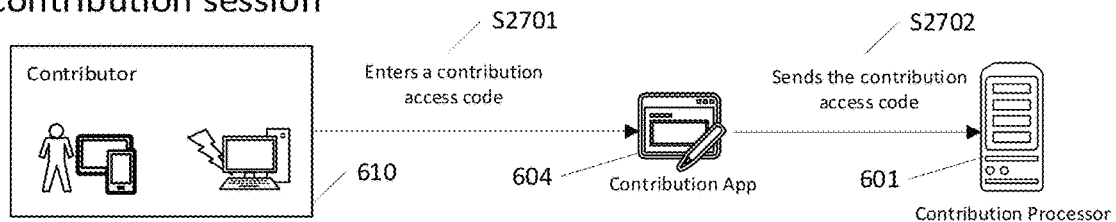
FIG. 27b The contribution access code is valid
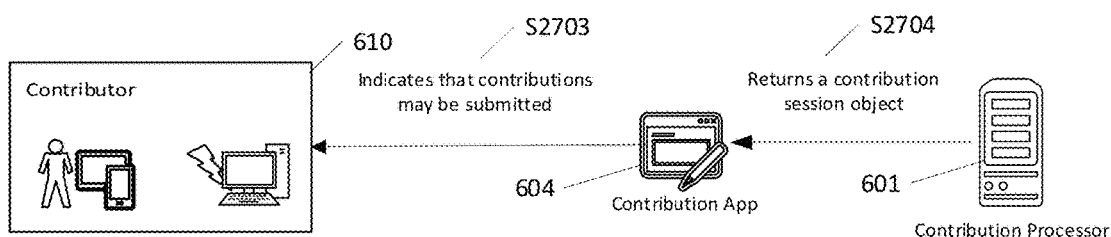
FIG. 27c The contribution access code is invalid
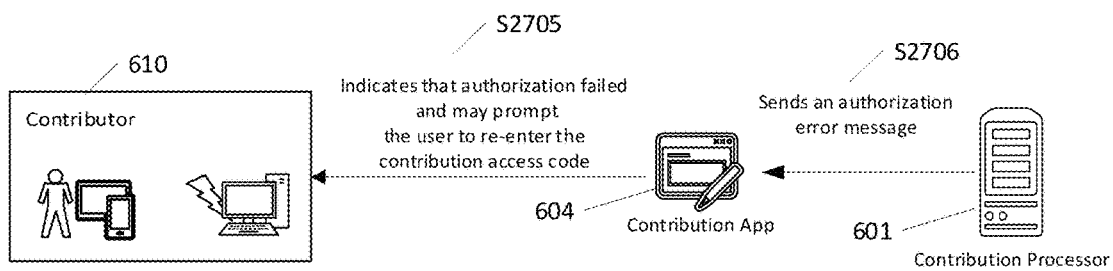

| Rule ID | Rule Description | Target Object | Rule Category | Rule Priority |
|---|---|---|---|---|
| 1 | Contributor must be connected to Wi-Fi hotspot "Pet park" | CAC 1 | Authorization | 1 |
| 2 | Contribution must be text | CGC A | Constraint | 1 |
| 3 | Contribution must be at least 5 characters long | CG 1 | Constraint | 2 |
| 4 | Convert text to uppercase | CG 1 | Transformation | 1 |

FIG. 31b

| Rule Type | Effect | Examples |
|---|---|---|
| Authorization rules | Prevent or allow contributions from being made or accepted | • Can only contribute between 12pm and 1pm Mountain Standard Time<br>• Can only contribute from an IP address that begins with 192.168.x.x.<br>• If there exists a CG linked to this session has five contribution data objects, then do not accept any more contributions for that CG<br>• Only accept contributions from Calgary, Alberta |
| Configuration rules | Affect the look, behavior, or structure of the containers that hold contribution data | • Display the possible contribution values as poker cards<br>• Display the possible contribution options in a dropdown menu<br>• For a particular CGC, include a company branded welcome message above the input boxes<br>• A CCG must only contain a maximum of three CG<br>• A CCG contains exactly two CG<br>• If the contribution data must be a geolocation, then display the user's submitted geolocations using red pins on a map |
| Constraint rules | Define any constraints for the contribution data | • Contribution data must be between 1 and 10<br>• Contribution data must be text<br>• Contribution data must be an image<br>• No duplicates accepted<br>• Contribution data must belong to the set {1, 2, 3, 5, 8, 13, ?}<br>• Contribution data must be correctly formatted JSON or XML text<br>• Images must be PNG or JPEG<br>• Image size must be between 1MB and 20 MB<br>• Validation by an external service |
| Transformation rules | Define transformations that affect the contribution data or meta-data | • Translate text from French to English<br>• Detect faces in an image<br>• Replace profane words with symbols<br>• Transformation by an external service<br>• Trim text that exceeds 10 characters<br>• Detect sentiment of the text<br>• Brighten an image<br>• Change the color of the text to blue<br>• Convert time zone to UTC |

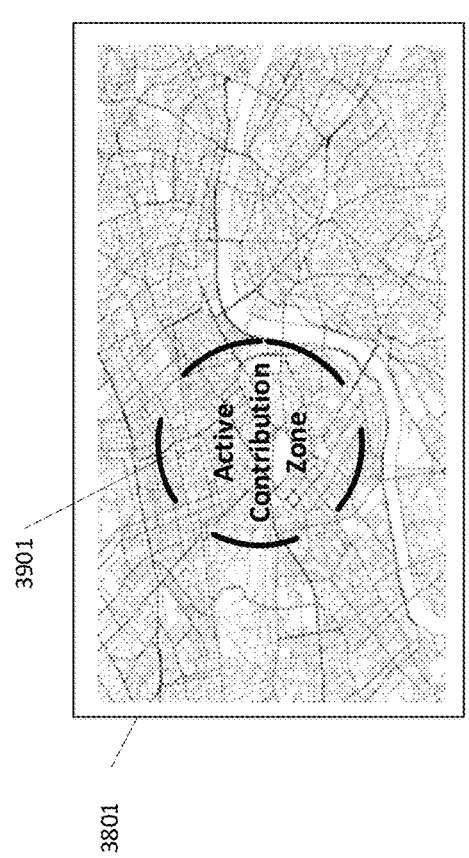
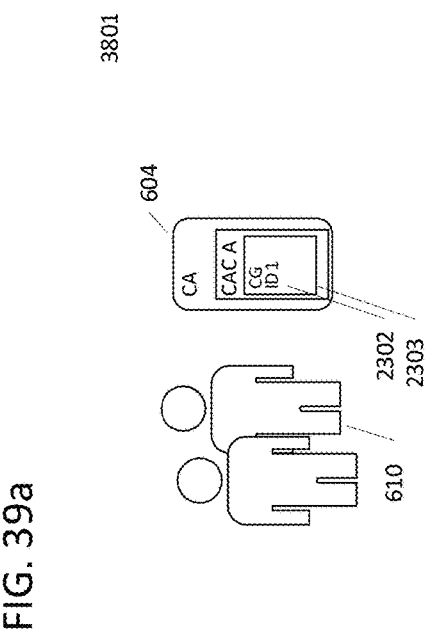
FIG. 39a
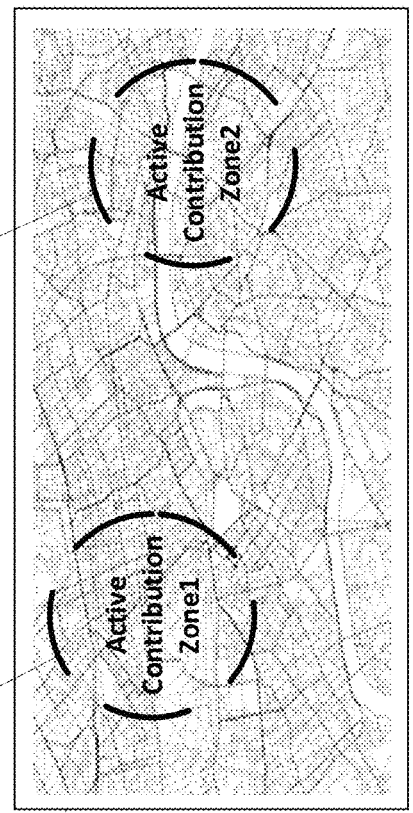
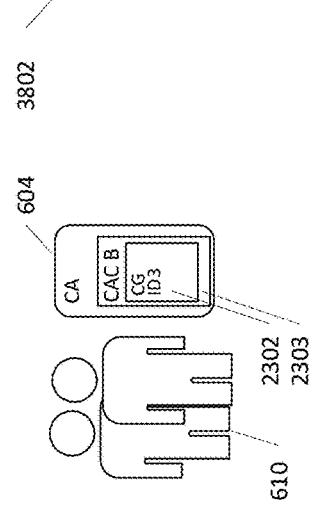
FIG. 39b

SYSTEM AND METHOD TO ALLOW ANONYMOUS USERS TO CONTRIBUTE MULTIMEDIA CONTENT ACROSS MULTIPLE DIGITAL WORKSPACES

CROSS REFERENCE TO RELATED APPLICATIONS

This application claims the priority of U.S. Provisional Application Ser. No. 62/945,982, filed on December 10, 2019, which is hereby incorporated herein by reference in its entirety.

BACKGROUND OF THE INVENTION

Field of the Invention

The present invention generally relates to allowing anonymous users/contributors and smart devices to simultaneously contribute ad-hoc multimedia content referred to as contribution data via any device to one or more digital workspace sessions in real-time without the need to be logged in to a specific digital workspace session for the purpose of allowing users to quickly share contribution data into one or more digital workspace environment(s), resulting in the simultaneous gathering and submission of anonymous user/contributor contribution data that would normally be limited to requiring structured authenticated users and constrained digital workspace data mappings, while being limited to a single digital workspace.

Description of Related Art

There are many scenarios where it is desirable to be able to collect and collaborate on common documents and or collections of data. When teams or groups of individuals want to and/or are required to electronically work in a collaborative effort on a project, documents, or on other business assets and/or platforms, collaboration tools and applications are usually utilized. This is especially necessary when teams are not collocated and are required to work remotely.

Typically, in the current art, each user/collaborator is required to have each user/collaborator is required to pass an authentication mechanism such as an account and password combination to access a collaboration application. It is usually desirable to be able to track individual user contributions and attribution data. This is typically not a problem when all users are part of the same company or group. The present invention will allow such collaboration without requiring a user to have a user account and/or password and/or be signed-in, preferably in real-time.

If a collaboration effort had the requirement for anonymous user contributions, the team members would gather the information through other tools and methods. They would take the anonymous contributor data input and through some level of groups, sorting and summarizing and enter the anonymous contributor data into the appropriate fields or sections of the collaboration program.

The requirement to have all users of the collaboration to be signed-in users of the collaboration presents many problems and limitations that are difficult to overcome. If one has a large volume of contribution data it can become very cumbersome for the collaborators to deal with and enter the data into the collaboration system while attempting to keep the data context, data accuracy, and be representative of the actual contributor's contributions. As a result, data may be summarized, grouped, and/or reduced in some way to be more manageable. This can be very limiting and thus can reduce the value of the contributed data greatly.

Certain collaboration systems have developed ways for anonymous contributors to contribute directly into a collaboration application. This is usually implemented by having anonymous contributors access a web-application provided by the collaborators via their mobile or laptop device. This web-based or thin client application is typically very constrained as to the type of data the collaborators are looking for and also to very limited modalities such as only notes, only texts, images etc. The web-based application is typically linked directly to the collaboration application workspace content only. The contributed data is usually submitted to a very specific area in the collaboration workspace/document called a parking lot. All of the contributor data would be dropped to that spot. This requires the collaborators to move and manipulate the data as to how they want to position it and see it in the workspace/document. So, although there is now a mechanism to have an anonymous contributor submit data directly into a collaboration application, many constraints still exist that limit the usefulness of the current art.

Further drawbacks exist, such that collaborators are not able to have the anonymous contributors submit content to multiple collaboration workspaces at the same time (e.g., in real-time). So, if a common data set is required multiple tools are needed to collect, manage and then import the data into the collaboration applications.

Further to the above described limitations, other drawbacks are even more evident in the current art for reuse of the same data contributions within the same collaboration application. A contributor's contributed data is only able to be delivered to a single container/location in the collaboration application requiring a collaborator to manipulate and copy the data, as needed, to different locations and objects in the collaboration digital workspace. This can become extremely cumbersome and very impractical when medium to very large data sets are involved. Typically, the contribution data is manipulated and analyzed outside of the collaboration application and is imported as a summary description and/or graphical presentation, thus creating very limited uses of the data in a team collaborative format.

Thus, the current art is not able to provide the necessary access and flexibility for contributors to submit content that can be utilized across one or more digital workspaces and then mapped to one or more digital workspace applications.

SUMMARY OF THE INVENTION

An object of the present embodiments is to allow for a substantially improved, scalable, and configurable contribution and management system that allows anonymous persons and devices geographically located anywhere, in real-time, to simultaneously contribute multimedia data for the purpose of using the contributed data in one or more unique digital workspaces, regardless of the geographic location of the anonymous person or device. And, more specifically, it is an object of the invention to preferably allow the contribution data to be linked to any one or more digital workspace applications for the purpose of displaying multiple times through as many as needed graphical object interpretations.

These advantages and others are achieved, for example, by a system including one or more servers coupled to one or more user devices through networks for allowing the user devices to contribute multimedia data to one or more digital workspaces regardless of geographic locations of the user devices. The system includes a contribution processor implemented in the one or more servers, a digital workspace processor implemented in the one or more servers, and one or more databases to store data from the contribution processor and the digital workspace processor. The contribution processor includes one or more contribution group collections that comprise one or more contribution groups, and is configured to receive contribution data from the user devices and to store the contribution data in the one or more contribution groups. The contribution data include any type of data object. The digital workspace processor includes the one or more digital workspaces and is configured to access the contribution data in the contribution processor via application programing interface (API) by mapping the contribution group collections and contribution groups of the contribution processor to the one or more digital workspaces. The digital workspace processor is configured to allow one or more authenticated user devices to access the contribution data, and the contribution data stored in the contribution groups are accessed and used by any of a plurality of different types of digital workspace applications of the authenticated user devices that are allowed to access the one or more digital workspaces to which the contribution groups are mapped.

These advantages and others are further achieved, for example, by a method for allowing one or more user devices to contribute multimedia data to one or more digital workspaces regardless of geographic locations of the user devices by utilizing one or more servers coupled to the user devices through networks. The method includes interfacing with contribution applications installed in the user devices, via a contribution processor implemented in the servers, for authenticating and collecting contribution data, receiving, via the contribution processor, contribution data from the contribution applications of the user devices, storing the contribution data in corresponding contribution groups of contribution group collections of the contribution processor, mapping the contribution group collections and contribution groups of the contribution processor to the one or more digital workspaces of a digital workspace processor implemented in the servers, and allowing one or more authenticated user devices to access the contribution data via the digital workspace processor. The contribution processor includes one or more contribution group collections that include one or more contribution groups that store the contribution data. The contribution data include any type of data object. The contribution applications include one or more contribution group collections including one or more contribution groups mapped by the contribution processor, and the contribution data is submitted to the one or more contribution groups of the contribution applications. The digital workspace processor is configured to access the contribution data in the contribution processor via API. The contribution data stored in the contribution groups are accessed and used by any of a plurality of different types of digital workspace applications of the authenticated user devices that are allowed to access the one or more digital workspaces to which the contribution groups are mapped.

These advantages and others are also achieved, for example, by one or more non-transitory computer-readable media implemented in one or more servers coupled to one or more user devices through networks for allowing the user devices to contribute multimedia data to one or more digital workspaces regardless of geographic locations of the user devices. The non-transitory computer readable media including instructions configured to cause one or more processors to perform operations that include interfacing with contribution applications installed in the user devices, via a contribution processor implemented in the servers, for authenticating and collecting contribution data, receiving, via the contribution processor, contribution data from the contribution applications of the user devices, storing the contribution data in corresponding contribution groups of contribution group collections of the contribution processor, mapping the contribution group collections and contribution groups of the contribution processor to the one or more digital workspaces implemented in the servers, and allowing one or more authenticated user devices to access the contribution data via the digital workspace processor.

BRIEF DESCRIPTION OF THE DRAWINGS

The preferred embodiments described herein and illustrated by the drawings hereinafter be to illustrate and not to limit the invention, where like designations denote like elements.

FIG. 1 is a prior art diagrammatic illustration of a web-based document collaboration application on mobile devices.

FIG. 2 is a prior art diagrammatic illustration of using mobile devices for text message voting applications.

FIG. 3 is a prior art diagrammatic illustration of using mobile devices to send hashtags via a twitter-like messaging application.

FIGS. 4a and 4b are, respectively, prior art diagrammatic illustrations of using a collaboration application and mobile devices to send content to a fixed parking lot area on a digital workspace.

FIG. 5 is a prior art illustrative example of a typical collaboration system.

FIGS. 6a and 6b are examples of an exemplary embodiment of the present invention allowing anonymous contributors to simultaneously send content to multiple contribution containers that can then be mapped and utilized on a plurality of independent digital workspaces in real-time.

FIGS. 23a, 23b, 23c, 23d, 23e, 23f, 23g and 23h are diagrammatic illustrations of a preferred data flow and object mappings of the contribution group collection and contribution groups from the contribution application to the contribution processor to the digital workspace processor to the digital workspace applications FIGS. 24a, 24b, 24c, 24d, 24e, 24f, 24g and 24h are diagrammatic illustrations of a plurality of preferred connection modalities to support access, data flow, and object mappings of the contribution group collection and contribution groups to the contribution application and contribution processor.

FIGS. 25a and 25b are implementation-preferred embodiment system function diagrams of the preferred contribution system.

FIGS. 27a, 27b and 27c are system function diagrams of the preferred contribution application authorization process.

FIGS. 31a, 31b and 31c are diagrammatic illustrations of how the preferred system rules are applied.

FIGS. 39a and 39b are diagrammatic illustrations examples of how the preferred system location-based contribution rules can be applied.

DETAILED DESCRIPTION

Figure 7:
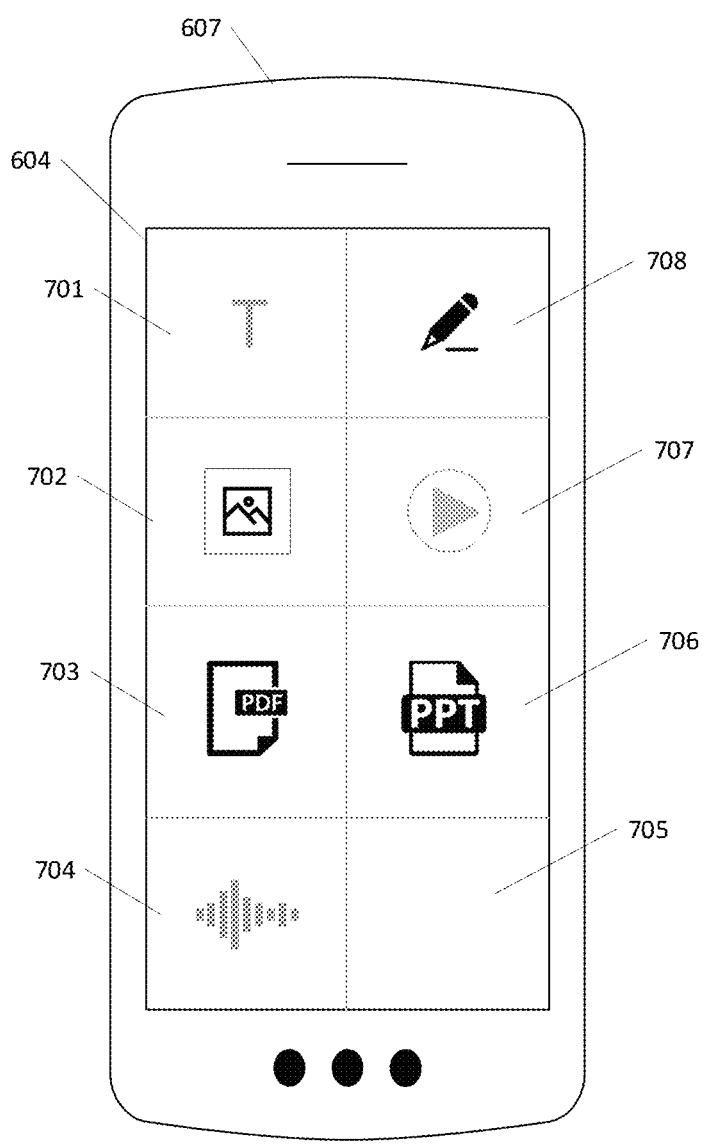
FIG. 7 is diagrammatic illustration of an example of the contribution application contribution modalities that may be allowed within a contribution session.

The present invention is directed to apparatus, methods, and computer readable media to simultaneously optimize the gather of ad-hoc multimedia contribution data from a plurality of contributors/users that are not signed into (anonymous) a digital workspace application as collaborators, by preferably allowing the contributors to link to a contribution application, which is preferably connected to a contribution system through a network connection, which is able to be interfaced and mapped to a plurality of digital workspace application for the purpose of allowing unsigned users (anonymous) to contribute data to one or more separate and distinct digital workspaces for team collaboration sessions and documents.

Advantageously, embodiments of the present apparatus and methods provide a means to configure a contribution system to allow any number of geographically located anonymous contributors to simultaneously submit multimedia contribution data to a plurality of collaborative digital workspace applications, while allowing the collaborators to configure the contribution data to be directed to and interpreted on any number of graphical display objects within a single digital work space application for the purpose of display and analysis, while also allowing the collaborators to configure the contribution data to be directed to a plurality of unique digital work space applications disassociated from each other.

A notable challenge to allowing simultaneous anonymous data contribution to a digital workspace is preferably not allowing the user/contributor to have direct access to the digital workspace content in real-time. For example, in the current art, the contributor/user needs to sign into the digital workspace to gain access and then by default the contributor/user is not anonymous.

Further to those systems that allow a weblink-style-only access to the digital workspace, the present invention will still deliver their contribution content to a single digital workspace directly in the form of the content being assigned to a parking lot space within the digital workspace application.

Another notable challenge is allowing a single instance of anonymous user/contributor submitted data and/or groups of datasets to be utilized in real-time within a single digital workspace multiple times, through various graphical interpretations, analysis, filters, and/or groupings. For example, in the current art when a contributor submits data to a digital workspace/document, the content is submitted as a one-time, one-to-one entry on the digital workspace. If the submission is required to be displayed or utilized in multiple ways on a different location and format on the digital workspace, the user/contributor would need to reenter the same data in the new format and new location on the digital workspace.

Another notable challenge is allowing a single instance of anonymous user/contributor data or groups of datasets to be utilized across one or more unique digital workspace instances in real-time. In the current art, a user/contributor signs into a single digital workspace session and if they want to access another digital workspace session, they need to close the original digital workspace session and open up the new digital workspace session and sign in.

Another notable challenge is allowing a smart device, TOT device, and/or any other non-person contributor device to be able to contribute anonymous ad-hoc content to a digital workspace and/or a plurality of digital workspaces. For example, in the current art devices have not been used in this way as devices are specifically mapped to hardcoded data fields and structures that are then read, interpreted, and utilized for a specific purpose.

Definitions:

A "device" in this specification may include, but is not limited to, one or more of, or any combination of processing device(s) such as, processor(s), a cell phone, tablets, computers, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a network, such as devices embedded in cars, trucks, aircraft, household appliances (refrigerators, GPS, cameras, audio pickup devices, sensors, stoves, thermostats, lights, electrical control circuits, the Internet of Things (TOT), etc.). The device may send/receive messages through types of networks that range from a local area network to a wide area network (e.g., the Internet), and includes other types of networks, such as wireless local area networks, campus area networks, metropolitan area networks, virtual private networks, or others.

An "engine" is preferably a program that performs a core function for other programs. An engine can be a central or focal program in an operating system, subsystem, application program or hardware/firmware system that coordinates the overall operation of other programs. It is also used to describe a special-purpose program containing an algorithm that can sometimes be changed. The best-known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably an apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

A "contribution application" (CA) is preferably a software program that performs a core function for collecting contribution data for the purpose of submitting to the contribution processor programs. A contribution application can be a central or focal program in an operating system, subsystem, application program or hardware/firmware system that coordinates the overall operation of collecting and submitting contribution data to the contribution processor. It is also used to describe a special-purpose program containing an algorithm that can sometimes be changed. The contribution application is designed to be used by people to submit to contributions to a contribution processor. The contribution application may also consist of a software application that may submit contributions to a contribution application through an application programming interface (API).

A "contribution processor" (CP) is preferably a software program and/or platform and/or one or more processors and/or one or more servers that perform(s) core functions for handling contribution sessions and contributions. The contribution processor(s) may store contribution sessions and authorize contribution applications and/or other API apps into contribution sessions. The contribution processor receives contributions, processes the data, applies contribution rules to the data, and stores the data as contribution objects. The contribution processor serves contribution rules, contribution data structures, and/or contribution data objects. A contribution processor may be hosted on a server or a stand-alone personal computer, where the server may be located in a cloud server infrastructure or may be located as a private local server. The contribution processor may also be hosted across distributed servers, or its subcomponents may exist as stand-alone services. The contribution processor may be co-located with the digital workspace processor, and can share a data base (DB) with the digital workspace processor or may use a stand-alone DB. The contribution processor may also store links between contribution sessions and digital workspaces. A contribution processor can be a central or focal program in an operating system, subsystem, application program, and/or hardware/firmware system that coordinates the overall operation of collecting, storing, managing, and/or linking the stores of contributions to the digital workspace processor.

A "digital workspace" (DW) is a technology framework that allows end-users to securely access, view, manage, and/or modify data from any location, from any device. The framework may provide a unified experience for users that share data together.

A "digital workspace processor" (DWP) is a software program and/or platform and/or one or more processors and/or one or more servers that preferably perform(s) core functions for handling any digital workspace sessions and the multimedia data of the digital workspace. A digital workspace processor allows data to be stored for the purpose of storage, editing, collaboration, and/or linking digital workspace and typically stores the content in a DB. However, how the data is stored is not germane to the implementation of the invention. The digital workspace processor(s) will utilize an API to access contributions on the contribution processor and will also provide an API for the contribution processor to send contributions to the digital workspace processor. The digital workspace processor will also serve data to the digital workspace application. A digital workspace processor may be co-located with the contribution processor, and it may also be co-located with a digital workspace application. A digital workspace processor may be hosted on a server or on a personal stand-alone computer, where the server may be located in a cloud server infrastructure or may be located as a private local server.

A "digital workspace application" (DWA) is a software program that is preferably designed for end users to access, view, and manipulate data of a digital workspace. A digital workspace application allows content to be made available for single users and/or any number of users to simultaneously log into and access the content stored in a digital workspace. A digital workspace application may be co-located with the digital workspace processor. A digital workspace application can be a single document format such as word processor, spread sheets, presentation, graphic files, video content, CAD, modeling, collaboration, design formats, and/or web-based tools. A digital workspace application may be run on any device from any location.

A "database" (DB) is an electronic system that stores data, edits data, and allows access to data. A database may be located in the cloud or it may exist as a privately installed instance. The database may be managed by some database management system software.

A "contribution system" (CS) is the aggregate processing components and functions of the contribution processor, digital workspace processor, and database structures. The contribution system may be hosted on a server or on a personal stand-alone computer, where the server may be located in a cloud server infrastructure or may be located as a private local server.

An "application programming interface" (API) is a common software interface that allows computer programs to communicate with other programs without human interaction being required. An API preferably contains the proper methods and protocols to establish communication with programs, for example, but not limited to: connection to the required processor, authentication, authorization, privilege rules, system rules, contribution rules, data management, and/or interpretation rules.

A "collaborator" is an end-user of a digital workspace and digital workspace application, typically one or more humans. The identity of a collaborator may be authenticated. The collaborator may view or modify data inside a digital workspace. A collaborator is typically required to have an identity and password to have access to the digital workspace to add and modify content. A collaborator, when used in conjunction with the contribution system, may have the privilege to administrate and configure the contribution systems configurations and settings including managing profiles, rules, authorizations, and/or appropriate data and data group mappings and structure creations.

A "contributor" is an entity that has been authorized to submit contributions to a contribution processor, typically one or more humans. The entity may consist of a person submitting contributions through a contribution application, where the contribution application is running on some device. The contributor may also comprise an automated process (non-person) that has been authorized to submit contributions to a contribution processor. A contributor can be geographically located anywhere and is not constrained to the location of the collaboration application participants or instances.

An "anonymous contributor" is a contributor that has been authorized to submit contribution data to a contribution processor and has not been authenticated to an identity. Meaning a user identity and password authentication structure and/or user account is not required. The anonymous contributor may also comprise an automated process (non-person) that has been authorized to submit contributions to a contribution processor. An anonymous contributor can be geographically located anywhere and is not constrained to the location of the collaboration application participants or instances.

A "contribution session" is represented by an active contribution access code that contributors may authorize against in order to submit contributions. A contribution session also represents the collection of child objects of some contribution access code. A contribution session object may be provided by the contribution processor to an authorized contribution application, where the contribution session object contains a contribution access token, which can then be used by the contribution application to submit contributions to a contribution processor. A contribution session object may also contain other information that may be used by the contribution application to make contributions, such as the contribution data structures, so that the contribution application can arrange the contribution data into the correct hierarchical tree of objects. A contribution session object may also contain contribution rules, so that they may be evaluated on the contribution application. A contribution session may be activated or deactivated by a collaborator/facilitator. If the contribution session is deactivated, then contributions may not be sent to the contribution objects of the contribution session, or contributors may not be allowed to authorize into the contribution session.

A "contribution" is data that is submitted to a contribution processor from either a contribution application or an API app. The contribution data may comprise contribution objects, along with their data and meta-data, a contribution access token, and/or other relevant meta-data, such as time and date of the submission. All multimedia data types are supported and within scope of the disclosure.

A "contribution access code" (CAC) is a contribution object that represents a contribution session and contains a code that is used to authorize contributors to submit content to the contribution session. A contribution access code may also link to and/or reference the contribution rules that may target access to the contribution session or contributions that are sent to the contribution session. The code is an identifier of the contribution session, where the code may be used interchangeably with the term "contribution access code." The form of the code may comprise words, numbers, letters, and/or symbols, and may be of any reasonable length that would be expected of an identifier. The code may also comprise for example but not limited to GPS location, voice ID and biometric information. The contribution access code should be transmittable to the contribution processor for validation.

A "contribution group collection" (CGC) is a contribution object that contains a set of other contribution group collections or contribution groups. A contribution group collection also contains contribution rules that may target the contribution group collection or any of its child objects. There may be any number of contribution groups collections configured and the disclosure imposes no limit. Logical contribution group collections are within scope of the disclosure. The contribution data contained within the contribution group collection will preferably remain persistent until such time that a collaborator removes, deletes, and/or clears the contribution group collection object of its contents.

A "contribution group" (CG) is a contribution object that contains a set of contribution data. A contribution group also contains contribution rules that may target the contribution groups or any of its child contribution data objects. There may be any number of contribution groups configured and the disclosure imposes no limit. The contribution data contained within the contribution group will preferably remain persistent until such time that a collaborator removes, deletes, and/or clears the contribution group object of its contents.

"Contribution data" (CD) is a contribution object that contains multimedia data that has been submitted to a CP for processing and storage. The data may include, but not be limited to, text, inking, document objects, notes objects, files, documents, spreadsheets, presentation formats, computer-aided design and drafting (CADD), design, and/or drawing formats. Additional meta-data may include, but is not limited to, time stamps, date, global positioning system (GPS) location, size, shape, resolution, users added attributes, inking, and/or annotations.

A "contribution data structure" is a term that describes the structures of either contribution access code, contribution group collection, contribution group, and/or contribution data. The term "contribution data structure" is used to describe the properties or functions that contribution objects have.

A "contribution object" is the instantiation of contribution data structures. Therefore, a contribution object is an instantiation of either a contribution access code, contribution group collection, contribution group, and/or contribution data. Contribution objects may be nested. For example, a contribution access code object may contain a reference to contribution group collection object, which may in turn contain a reference to a contribution group object, which then contain references to one or more contribution data.

A "contribution rule" contains logic that can be applied to contribution data objects either to authorize contribution, configure the objects, constrain the data, and/or transform the data. A contribution rule may be applied to an infinite number of contribution objects, and contribution objects may be targeted by an infinite number of contribution rules.

The term "rule" is used interchangeably with "contribution rule" and is construed to mean the same thing through the disclosure.

With reference to FIG. 1, shown is a prior art diagrammatic illustration of a web-based document collaboration application for mobile and computer devices. Web-based collaboration tools are common. Web-based applications are designed to work within a single project and/or document. The collaborators are signed-in to the digital workspace, meaning a username and password is required. Once the collaborators are authenticated and signed-in to the system, and if the digital workspace/document is not already open, they should access and open the actual digital workspace/document. The digital workspace/document is most often required to be open and active for the collaborators to create and edit the digital workspace/document. There is preferably little or no functionality provided for anonymous contributors to access and contribute to a shared digital workspace/document. The content is preferably structured and rigid to support the specific formatting, document style, text, and/or structure enforced by the document type. The collaborators content contribution is most often associated with the digital workspace/document. The digital workspace/document collaboration tools may have specific functionality to deal with the merging of content between collaborators. The collaborators could be working on the same document at the same time, or they could access the workspace/document at different times.

In simpler applications where "on the fly" merging is not possible, one collaborator will lock a document through a document setting feature, and then do their document editing. They will then release the document so other collaborators can access the document one at a time. This type of procedure is used to minimize document merging and data content over-writing errors.

Even in the most complex application, it is often not possible to add content to multiple documents at the same time. The content contributed to the digital workspace/document typically can only be used in the exact way the content was contributed. It typically cannot be interpreted and used in other ways without modifying the content. Collaborators are often not able to contribute content to multiple workspace simultaneously through a single content contribution submission.

The ability to allow anonymous persons and smart devices to contribute ad-hoc multimedia data content to one or more unique digital workspace applications simultaneously in real-time that are geographically located anywhere overcomes may of the limitations of the prior art, which is limited to having data content contributed to one active digital collaboration workspace at a time. According to one aspect of the present invention, a team collaboration session comprises (i) a group of signed-in collaborators who can contribute and manage content, and a (ii) group of anonymous content contributors who are not signed-in to the collaboration session who can, preferably, only contribute content to the digital workspace application. The collaborators who are signed-in directly to the digital workspace application have full access to the data to add, edit, modify, and work with the contributed data in any way. These contributors are able to access a contribution application via a contribution access code provided by the collaboration team. The contributors, as allowed by rules and configuration management provided by the contribution system can, if permitted, direct and submit multimedia content to one or more specific contribution groups contained in the contribution application. The contribution application communicates the multimedia contribution data to the contribution system in real-time. The contribution system stores the contributor's contribution data into a contribution processor via contribution group collections and contribution group objects. The contribution processor updates the appropriate mapped digital workspace instances contained in the digital workspace processor with the contribution data groups data, per the configuration settings and contribution group mappings as defined by a collaborator. A digital workspace instance owner/collaborator has the ability to map contribution group collections and contribution groups to one or more digital workspace instances. Enabled by the configurability and processing, the one or more digital workspaces applications can then be updated with anonymous contributor multimedia in real-time without the need for such a contributor to login to and/or submit data content multiple times to populate the one or more than one digital workspace instances at time.

By eliminating the need for a contributor, anonymous or otherwise, to be linked to a single digital workspace at any one time, typical in the current art, any number of collaboration systems are now able to take advantage of common anonymous contributor data contributions in real-time or post real-time which optimizes contributor data abstraction and reuse across a single digital workspace instance or a plurality of unique digital workspace instances.

In contrast, typical collaboration systems in the current art either require users to sign into the digital workspace application to contribute data content or if they allow anonymous users, they limit the anonymous users ability to contribute data to specific content such as notes, text, and/or images only, and the content is always directed to a single digital workspace session. Further exacerbating this problem is the inability to have a single user contribution to be utilized across more than one graphical object or context in a single digital workspace, and even more limiting is the requirement for the user to re-enter the data into other digital workspace instances if the data content needs to be duplicated.

According to a further aspect of the present invention, the contributor may be a person and/or a smart device or a device that is able to utilize an Application Programming Interface (API) interface or program library.

According to yet another aspect of the present invention, contributors can be of any number and geographically located anywhere a network connection is provided.

According to a further aspect of the present invention, the contributor application user interface may be customized by contribution rules provided by the contribution system on a per access link basis, based on rules that define acceptable contribution multimedia data types, contribution group mappings to data types, graphical presentation of object types, and allowable contribution limits that may comprise data ranges, data types, time, location and privilege based rules.

According to a further aspect of the present invention, the contribution rules applied to the contribution application and the digital workspace application from the contribution system can be of any type and number, The rules may be stacked, shared, inherited, nested, grouped, ordered, and/or sequenced in any manner that is laid out in the configuration parameters.

According to a further aspect of the present invention, the rules applied to the contribution groups and contribution group collections from the contribution system can be of any type and number. The rules may be stacked, shared, inherited, nested, grouped, ordered, and/or sequenced in any manner that is laid out in the configuration parameters.

According to another aspect of the present invention, contribution system processor components may be collocated in the same processor or they may be separated and scaled as required including, but not limited to, local server and/or cloud-based installations.

According to yet another aspect of the present invention, any number of contribution group collections and contribution groups can be created, and nested within each other. Logical contribution group collections are within the scope of the present invention and are able to be nested.

According to yet a further aspect of the present invention, any number of contribution group collections and contribution groups contained within the contribution processor can be mapped to one or more digital workspace instances contained in the digital workspace processor.

According to yet another aspect of the present invention, a single digital workspace instance contained in the digital workspace processor can be linked to any number of digital workspace applications.

According to a further aspect of the present invention, a digital workspace application can reuse any one of the mapped contribution groups, one or more times, for the purpose of reusing and/or redisplaying the contribution data content stored in the contribution group a plurality of ways.

According to another aspect of the present invention, a digital workspace application can re-load the contribution data from any contribution group at any time, as long as the data has not been deleted from the contribution processor.

According to a further aspect of the present invention, the digital workspace application interface may use rules provided by the contribution system on a per contribution group collection and/or contribution group that define acceptable application usage such as, but not limited to, data ranges, data types, time, location, and/or privilege based rules.

According to yet a further aspect of the present invention, any number of digital workspace instances contained in the digital workspace processor can be linked to any number of program applications and/or databases that support an application programming interface.

The present invention preferably provides the ability to allow for anonymous contributors and devices to simultaneously in real-time contribute multimedia data across one or more digital workspace applications while being able to reuse the same contributed data as many times as needed within a single digital workspace application, and not requiring the contributors to reenter the same data, which allows for more productive and effective participation within any one collaboration session, as well as vastly improved data availability, analysis, and presentation where there is a desire to have anonymous contributors input into the collaboration digital workspace.

Preferred embodiments comprise both algorithms and hardware accelerators to implement the structures and functions described herein.

With reference again to FIG.1, illustrated is this concept of the system 100 with three active collaborators User1 101, User2 102 and User3 103 all accessing the same document on their laptops and/or tablets. Every collaborator can see each other's content submission and modifications. For example, User1's content 101*a* is visible on both User2 102 and User3 103 display screens. The same applies for User2' content 102*a* is visible on User1 101 and User3 103 display screens. And User3's content 103*a* is visible on User1 1 01 and User2 102 display screens. The Users 101, 102, 103 cannot edit the same spot on the screen as there would be a direct data conflict in the document. This scenario is usually handled with a last-to-modify rule, meaning the last person to modify the field has their changes accepted and if the field was previously modified even a second beforehand the content modification is lost.

This type of collaboration tool is designed for document style collaboration and does not lend itself to be used for anonymous user real-time simultaneous content contribution in a collaborative team environment. Furthermore, to the above, Internet Of Things (IOT) and other smart sensor devices are not supported, meaning IOT devices do not contribute data directly to word documents for example, limiting the effectiveness of utilizing this technology for an ad-hoc team contribution data submission collaboration session.

With reference to FIG. 2, shown is a prior art diagram illustrative of using mobile devices for text message voting applications. Unlike web-based document collaboration tools, text-based voting submission tools 201 can allow for the large scale gathering of user submitted content through a text messaging system. The users 205a, 205b and 205c will typically be situated in a scenario where they are asked to vote on a particular topic, referred to as a voting topic. Each voting topic as shown in the example Option A 204a and Option B 203a is assigned a specific phone number. When the voting scenario is opened up for active voting the signed-in users 205a, 205b and 205c will send a text message to a specific phone number based on the options 203a, 204a available. For example, user 205a sent a text message to "1-800-777-7777" 204a. User 205b sent a text message to "1-800-888-888" 203. User 205c sent a text message to "1-800-777-7777" 204.

The system 201, at the session facilitator's end will typically display a vote tally under each option 204a, 203a. In this instance Option A 204a has two votes and Option B 203a has one vote submitted. This type of system is usually limited to counting the number of submitted text messages sent to each number within an allowed and active time specific window. The accumulated texts sent to a specific phone number are totaled resulting in an aggregate count for the purpose of voting on particular topics of interest. Content of the texts is not relevant in this scenario so there is usually no mechanism to utilize the text body content for further data analysis, manipulation, organization and/or collaboration.

The system 201 limitations do not allow anonymous users to contribute ad-hoc, simultaneous content in a team collaboration scenario. The submitted content is very limited and the user/contributor needs a valid phone number on a Public Switched Telephone Network (PSTN) network to text to another phone number. The ID of the user is indeed known, and the user is not anonymous. IOT and other smart sensor devices are typically not supported, further limiting the effectiveness of utilizing this technology for a team ad-hoc, contribution, and collaboration session.

With reference to FIG. 3, shown is a prior art diagram illustrative of using mobile devices to send content identified by hashtags (#) via a Twitter-like messaging application. Text messages are sent with a hash-tagged word, ("#" is inserted in front of the word) which gives the word special status and meaning in a web-based search engine and hashtag enabled application. The word with the "#" hash tag can be used to sort, filter, and group content (texts and posts). This implementation can be used for voting, sharing of opinions, and tagging content so it can be later filtered and sorted by hashtag enabled tools. The content submitted is usually in the form of a free typed dialog or comment to the point that anything can be submitted on any platform which is typical in the public domain. The management of the hashtags is typically controlled by the social media application owners. Users need an account in an application to submit content, so the contributors name or some form of identity is tied directly to the hash tag content which means the content submission is not anonymous and this defeats the purpose of anonymous data contribution. A limiting factor is that all content needs to be tagged with a hashtag to be useful and with no specific rules around hashtags it makes for grouping and usage of the data in a team collaboration scenario very cumbersome, unpredictable and difficult. IOT and smart devices data contribution would be very difficult and most likely not practical to implement considering the ad-hoc nature of how hashtag-based contribution data is created and utilized.

The diagram of FIG. 3 is based on a Twitter voting scenario. Two options 301a are presented. #optionA 301b and #optionB 301c are the two options users 303, 304 and 305 are asked to vote on. User 1 303 sends #optionA 301b via Twitter. User 2 305 sends #optionA 301b via Twitter. User 3 304 sends #optionB 301c via Twitter. The options 301a show up on the Twitter feed 302 which is available on any device with a web browser application. At that point the votes can be tallied and/or used within the limits of the social media application. It should be noted that users outside of the voting scenario may have access to the submitted hashtag data meaning the ability for secure and corporate team level collaboration is very limited.

With reference to FIGS. 4a and 4b, shown are, respectively, prior art diagrammatic illustrations of using a collaboration application and mobile devices to send content to a fixed parking lot area on a digital workspace. Unlike the previous prior art examples, this implementation is more suited to allowing users to contribute data to a team collaboration session.

The room 401 contains an interactive collaboration wall system typically made up of touch screen devices 402. The collaborators can submit content directly in the application on the wall interactive touch system 402 or through a web client application (not shown). The collaborators 408 are directly modifying the content in the digital workspace 402 when this happens. The collaboration system will sometimes have what is known as a data sharing option, which may be enabled through the use of a Quick Response (QR) code 403 or weblink address displayed on the screen. The mobile devices 406, 408, and 409 scan the QR code 403 and then a thin client web-based application opens up allowing the contributors to upload specific structured content to this active collaboration session 402 only. The submitted contents 405, 407, and 410 are uploaded only to the one specific digital workspace and is inserted into what is known as a parking lot area 404. The parking lot area 404 is a safe drop zone allowing contents 405, 407, and 410 to be submitted safely to the digital workspace 402. Otherwise, the content could potentially show up anywhere in the digital workspace 402 and cause issues and collisions with the already submitted content on the digital workspace application screen.

FIG. 4b illustrates how a collaborator 408 in the room is required to move the submitted contents 405, 407, 410 out of the parking lot area 404 and into the digital workspace 402 area to utilize and manipulate the submitted contents 405, 407, 410. Although anonymous users can contribute content to a specific session, the marshaling of the contribution data is very limited and structured. Multiple display interpretations of the contribution data is not allowed or supported. This means that the contribution data content can only be displayed in one way for example, such as a note or text. The contribution data content cannot be displayed as a note and within a table at the same time as there is only one instance available for any of the contributed data content by each anonymous user. The collaborators 408 would need to duplicate/copy the contributor's content into a new user display object such as a table. The contributed data is typically very limited to a single modality such as text notes or images for example. The contribution data is shared to and visible and available only to one digital workspace application. The limitations on the contribution data is constraining and preventing the overall usefulness to a single collaboration session only and does not solve the problems in the current collaboration space the preferred embodiment is designed to solve.

With reference to FIG. 5, shown is an illustrative example of a collaboration system in the current art which can typically be comprised a shared space 501 that may have a large interactive touch display device 502. The interactive touch display device 502 is connected to a single digital workspace session that allows for a variety of mixed media content 503, 504, 505, 506, or 507 to be inserted and displayed for the purpose of group collaboration sessions. The content can range from notes, sketches, text, images, and videos. Participants can add content directly at the interactive touch display and/or they can add content through a mobile device and/or computer device that is also connected directly to the digital workspace session 511. In this example a tablet 508, laptop 509 and laptop 510 are all signed participants to the collaboration digital workspace session 511. A participant on tablet 508 has added a note 505 to the digital workspace 511. A participant on laptop 509 has also added a note 507 to the digital workspace 511. A participant on laptop 510 has also added a note 506 to the common digital workspace 511. It should be noted that all participants see the same digital workspace content 511 and have direct access to add, delete, and modify content in any way. They need to sign into the digital workspace 511 and are not anonymous contributors. If anonymous contribution is required, another method is required to allow that type of data contribution to occur.

The scenarios presented in the current art are not able to sufficiently solve for the ability to have anonymous users/contributors to simultaneously contribute multimedia data at any time that can be utilized across multiple digital workspace instances whether they are active or not. The ability to reuse and interpret the contributed data across multiple display objects in the same application instance or separate application instances through an API is not offered. The current art is insufficient to provide adequate solutions to this problem. The current art is limited to single digital workspace environments where multiple users signed and anonymous can collaborate and contribute data to the digital workspace/document.

With reference to FIGS. 6a and 6b, shown are examples of an exemplary embodiment of the present invention allowing for anonymous contributors 610 to simultaneously contribute ad-hoc multimedia contribution data (CD) 3204 (see FIG. 18) through a contribution application 604 in real-time. The anonymous users, referred to as contributors 610, may be located at any geographic location worldwide that has access to a network connection that allows access to the contribution processor (CP) 601 system. They could be in the same room as the digital workspace application 605 or they could be literally anywhere a network connection is available such as, but not limited to, another room, city, continent, any public transportation or vehicle, at sea, in the air, and/or even in space. There is no requirement to have collocated contributors 610. The contributor 610 accesses the contribution system (CS) 609 via the contribution application 604. Contributors 610 can use any arrangement 611a, 611b, 612a, 612b of devices 607 and transition another device 607 that has access to the CA 604. Anonymous contributors 610, contributors, unsigned users, and contributors/users are construed to mean the same thing throughout the specification and should be interpreted mean the same thing.

The contribution application (CA) 604 allows the anonymous contributor(s) 610 to submit multimedia contribution data content, as outlined for example in FIG. 7. The CA 604 preferably maps the submitted multimedia contribution data (CD) 3204 content to configurable contribution groups (CG) 2302 and contribution group collections (CGC) 2303 (see FIGS. 18 and 19). The CA 604 is configured through contribution rules 3001 and configuration settings, as detailed in FIGS. 29a and 29b from the contribution system (CS) 609. Once multimedia CD 3204 has been submitted to the contribution application (CA) 604 by the anonymous contributor(s) 610, the CD 3204 is sent to the contribution processor (CP) 601 through a network connection. The CP 601 will store the CG 2302 and CGC 2303 to a database 603. The CP 601 is responsible for interfacing with the CA 604 for the purpose of authenticating, collecting, managing, and storing the multimedia content into the contribution groups (CG) 2302 and contribution group collections (CGC) 2303. The contribution processor 601 is connected via standard communication connection modalities 608 to the digital workspace processer (DWP) 602. If the CP 601 is collocated within the same server and/or program, then the connection is preferably made with a standard Application Programming Interface (API) and/or program library calls. The DWP 602 can preferably update one or more digital workspaces (DW) 2304 (see FIG. 20) at the same time that are mapped to a common CGC 2303 and CG 2302 reference. The contribution system 609 manages the digital workspace 2304 content, contribution rules 3001, authentication, management, mapping and data transfer to and from the CG 2302 and CGC 2303 between the DWP 602 and the CP 601, and the DWP 602 to the digital workspace application (DWA) 605. The DWP 602 can obtain the CD 3204 in real-time, meaning as the CD 3204 is contributed by the contributors 610. Alternatively, the DWP 602 can retrieve the CD 3204 from the CP 601 at any time, meaning that the CD 3204 contributed by the contributors 610 at any time after the CD 3204 was contributed in minutes, hours, days, weeks or years. As long as the CD 3204 is maintained in the CP 601 and DB 603, the CD 3204 is retrievable to be used by the DWP 602. It should be noted that the process of updating the digital workspace (DW) 2403 by the DWP 602 does not require the digital workspace (DW) 2403 to be open and/or in an active state by the collaborators 616. This is a significant benefit compared to the cited prior art in the field. The digital workspace (DW) 2403 can have its content updated such that the content from contributor(s) 610 is available, for example, when a collaboration session is scheduled at a later time.

The ability to collect data from anonymous contributors 610 at any time and from anywhere a network connection is available allows for tremendous data contribution and collection flexibility and opportunities. In situations where the contributor(s) 610 and collaborators 616 may be separated by significant time zone difference, the benefit to separate the data gathering, managing, and/or storing from the actively open digital workspace 2403 by the digital workspace application 605 is even more apparent. The ability to collect anonymous user/contributor 604 CD 3204 ahead of time and to have it linked to a plurality of digital workspaces 2403 is a significant improvement over the current art.

The digital workspace processor 602 is connected to a digital workspace application 605 through typical computer network connection methods. The communication between the digital workspace processor 602 and the digital workspace application 605 is handled through common program application interface (API) calls. A single digital workspace 2304 instance can be opened and utilized on a plurality of independent digital workspaces applications 605 and devices 607. The collaborators 616 launch the digital workspace application (DWA) 605 to access the digital workspace 2403 content on the DWP 602. The CD 3204 is downloaded to the digital workspace application 605 instance when the digital workspace application 605 is opened and active. At that point the CD 3204 can be utilized by the collaborator 616 as desired.

FIG. 6b further illustrates that a contributor 610 can be an automated trigger device 613 such as, but not limited to, a smart device, sensors, IOT, Global Positioning System (GPS) devices, cameras, audio recorders, and any other data acquisition device. The automated trigger device 613 would have contribution application API (CA API) 2396 installed providing access to the CS 609. The automated trigger device 613 is abstracted from the digital workspace 2304 (in the same manner a person contributed) by the contribution application 604 API layer. This means that an automated trigger device 613 can remain anonymous which is a significant difference from the current art where all devices are named with an ID identification of some sort and are known to the system.

With reference to FIG. 7, shown is diagrammatic illustration of an example of the contribution application 604 contribution modalities that may be allowed within a contribution session. A device 607 is illustrated which is running the CA 604. The device 607 is used by the contributor 610 to select and submit multimedia content also referred to as contribution data (CD) 3204. Shown are examples of the type of multi-media content CD 3204 that would be submitted via the contribution application 604. The example includes, but is not limited to, text 701, images 702, pdf documents 703, voice files 704, inking/ sketches 708, video files 707, power point documents 706, and/or any other 705 content. The contributor 610 can submit as many types of multimedia content 3204 and aggregate content as allowed by the configuration parameters obtained from the CP 601. It should be noted that a link or connection to the actual digital workspace 2403 is not required to submit CD 3204 and the digital workspace 2403 does not need to be open and active. The CG 2302 and the CGC 2303 need to be configured in the CP 601 to be able to submit CD 3204 by a contributor 610.

Figure 8A:
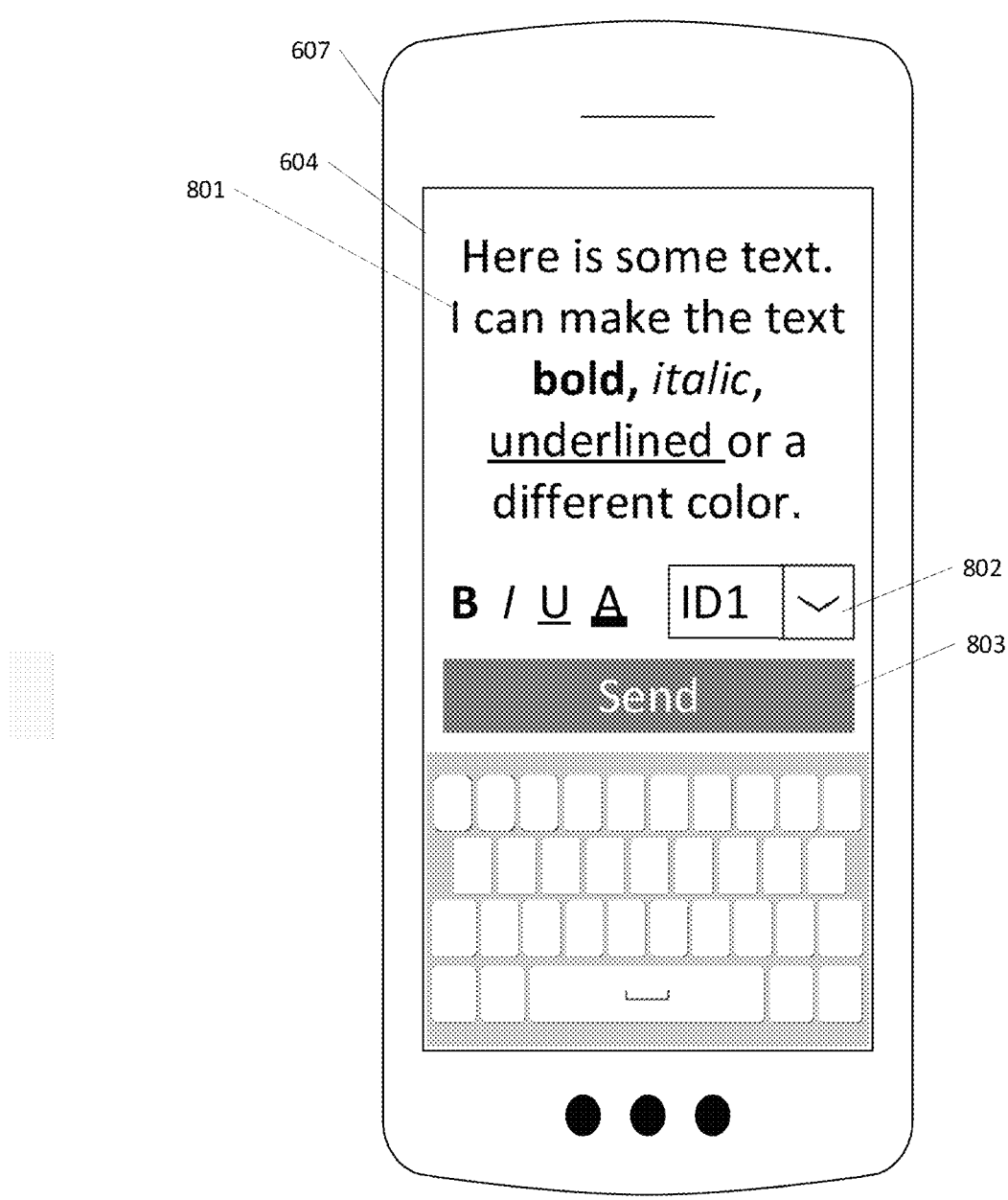
FIGS. 8a and 8b are diagrammatic illustrations of an example of a contributor submitting text to a contribution group collection within the contribution application.
Figure 8B:
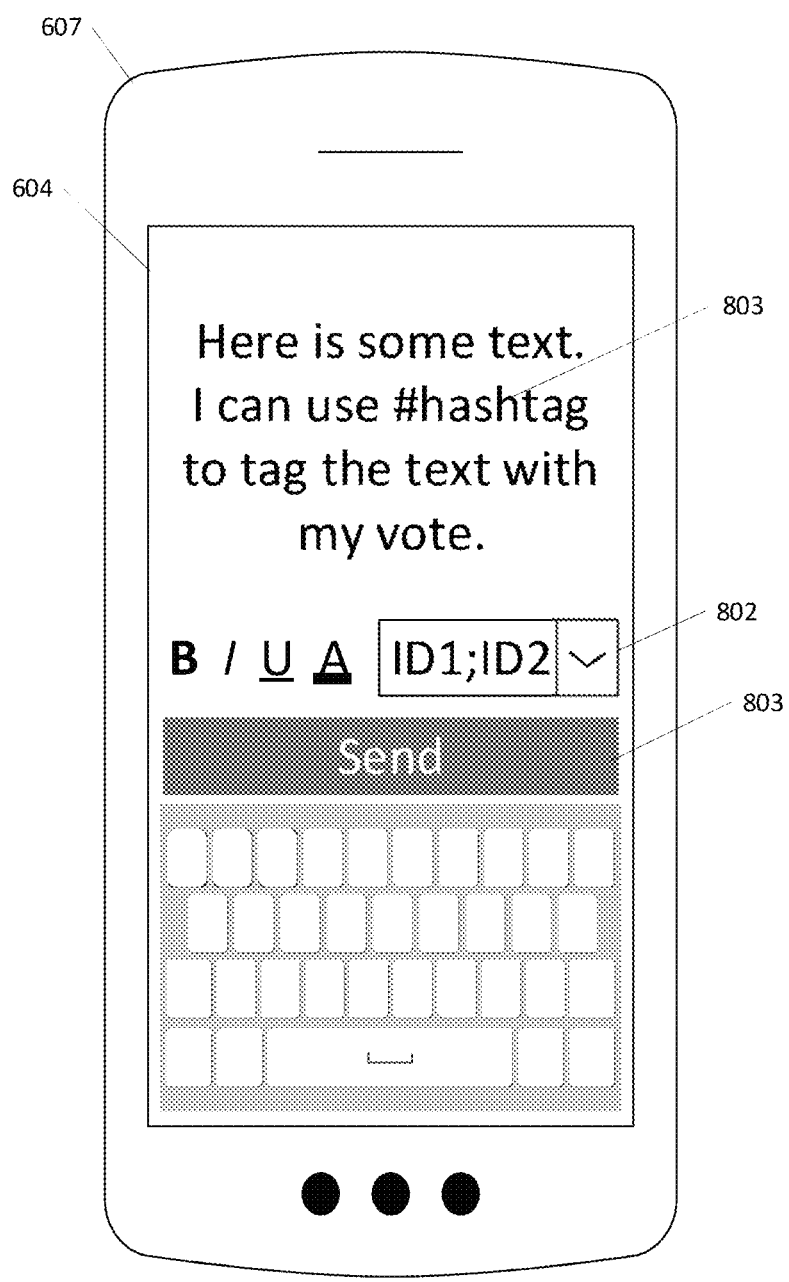

With reference to FIGS. 8a and 8b, shown are diagrammatic illustrations of an example of an anonymous contributor 610 submitting text 801 to a contribution group collection 2303 within the contribution application 604. Once the contributor 610 has selected the text option 701, the contributor 610 is able to type the text 801 into the user interface of the CA 604. The contributor 610 also has the option to direct the text 801 content to the appropriate CG 2302, ID1 802, if more than one option is available. In this instance the contributor 610 has selected ID1 802. It should be noted that ID 1 802 is a name reference and the actual CG 2302 identifying name can be configured and set to a text, number, or other alpha numeric values that make sense to the data collection effort. The name of the CG 2302 is configured by the collaborator 616 in charge of the digital workspace space 2304 and or digital workspace application 605 if they happen to be the same person. The name is set when the CG 2302 is created and/or configured in the CP 601. Once the contributor 610 is finished entering the text 801, the contributor 610 presses the send button 803 as illustrated on the diagram. At that point the data is sent to the CP 601 by the CA 604. The contributor 610 is able to send additional text 801 or return to the main screen of the CA 604 to select another available multimedia content type to submit if it is available and allowed by the contribution processor 601 rules 3001.

FIG. 8b illustrates the contributor 604 entering and submitting text 803 as illustrated in FIG. 8a, with the addition of text marked with a hashtag ("#hashtag") 803a. The #hashtag 803 allows for sorting and filtering of the data within the digital workspace application 605. Also illustrated is the addition of a second CG 2302, ID1 and ID2 802a separated by a ";" for example. The contributor 610 has the option to insert the contribution data 3204 into either one CG 2302 or both CGs 2302. This flexibility is a significant improvement over the current art allowing for many data sharing and mapping possibilities. It should be noted that there could be one or more than one CG 2302 to select from. This is determined by the requirements for the data collection sessions and is preferably configured by the collaborator 616 who is responsible for configuration of the CGC 2303 and CG 2302 mappings in the CP 601 and DWP 601 systems.

Figure 9:
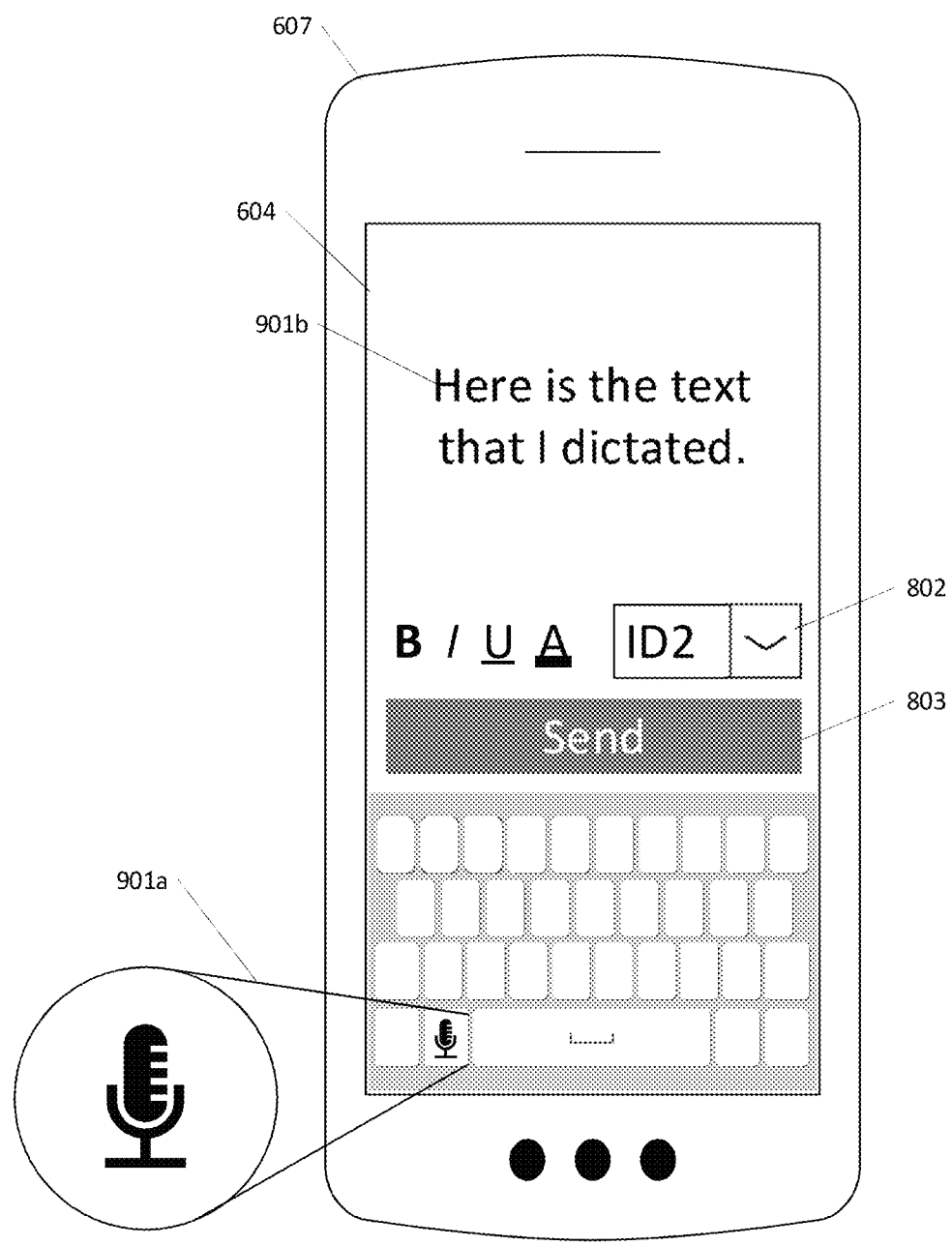
FIG. 9 is a diagrammatic illustration of an example of a contributor submitting voice to text information to a contribution group collection within the contribution application.

With reference to FIG. 9, shown is a diagrammatic illustration of an example of a contributor 610 submitting "voice to text" 901a, 901b to contribution group(s) which may be represented by ID2 802, within the contribution application 604. The Contributor 610 is utilizing the "voice to text" option available on most smart phone devices 607 and shown on CA 604. By selecting the microphone recording button 901a, the contributor 610 is able to utilize their voice to enter data in text format 901b to contribute to the CP 601. In this example the contributor 610 has decided to select CG 2302, ID2 802.

Figure 10:
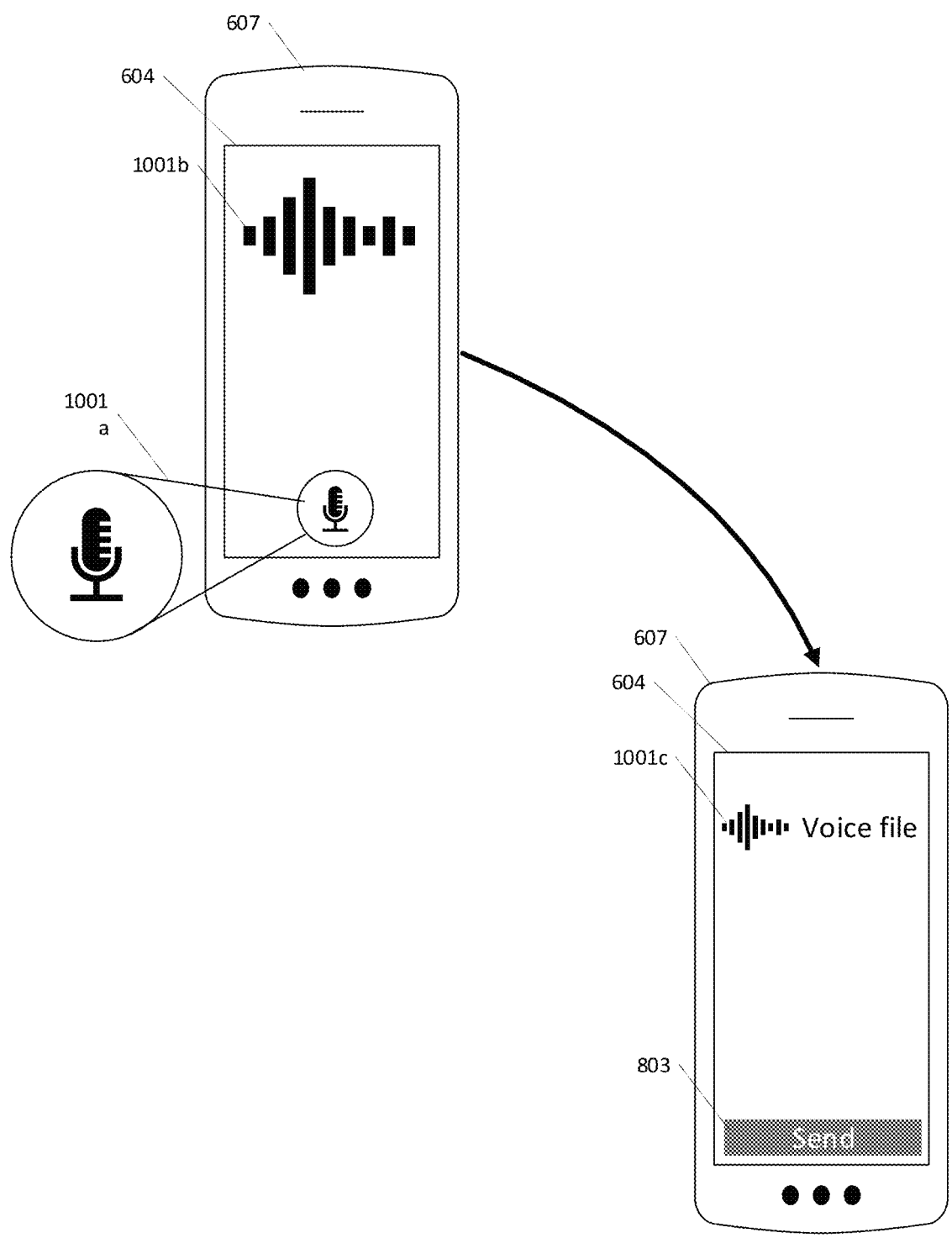
FIG. 10 is a diagrammatic illustration of an example of a contributor submitting a voice file to a contribution group collection within the contribution application.

With reference to FIG. 10, shown is a diagrammatic illustration of an example of a contributor 610 submitting a voice file 1001b to a contribution group 2302 within the contribution application 604. FIG. 10 is similar to FIG. 9 except the contributor 610 is choosing to submit a voice file 1001a, 1001b, 1001c. It should be noted that the CG 2302 has been preassigned by the collaborator 616, so the option to select the CG 2302 is not available to the contributor 604. The contributor 610 just needs to select the send button after the recoding of the voice file 1001c is completed.

Figure 11:
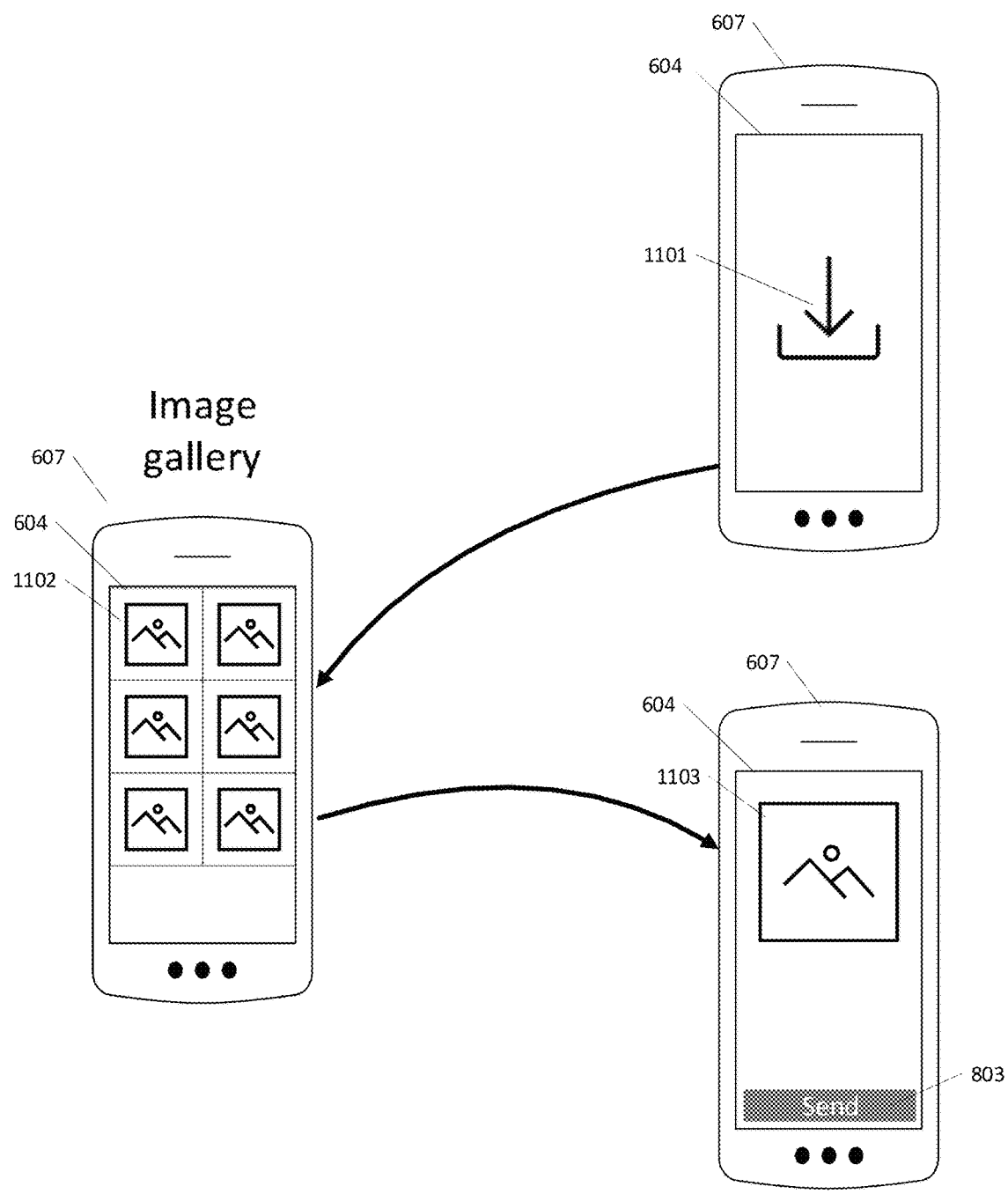
FIG. 11 is a diagrammatic illustration of an example of a contributor submitting image files to a contribution group collection within the contribution application.

With reference to FIG. 11, shown is a diagrammatic illustration of an example of a contributor 610 submitting image files 1102 to a contribution group 2302 within the contribution application 604. The contributor 610 selects an image 1101 to import 1102, 1103. The location of the image may be on the device, in the cloud, or available on the network and/or internet. The contributor 610 just needs access to the image to import it to the CA 604 and then press "Send" 803.

Figure 12:
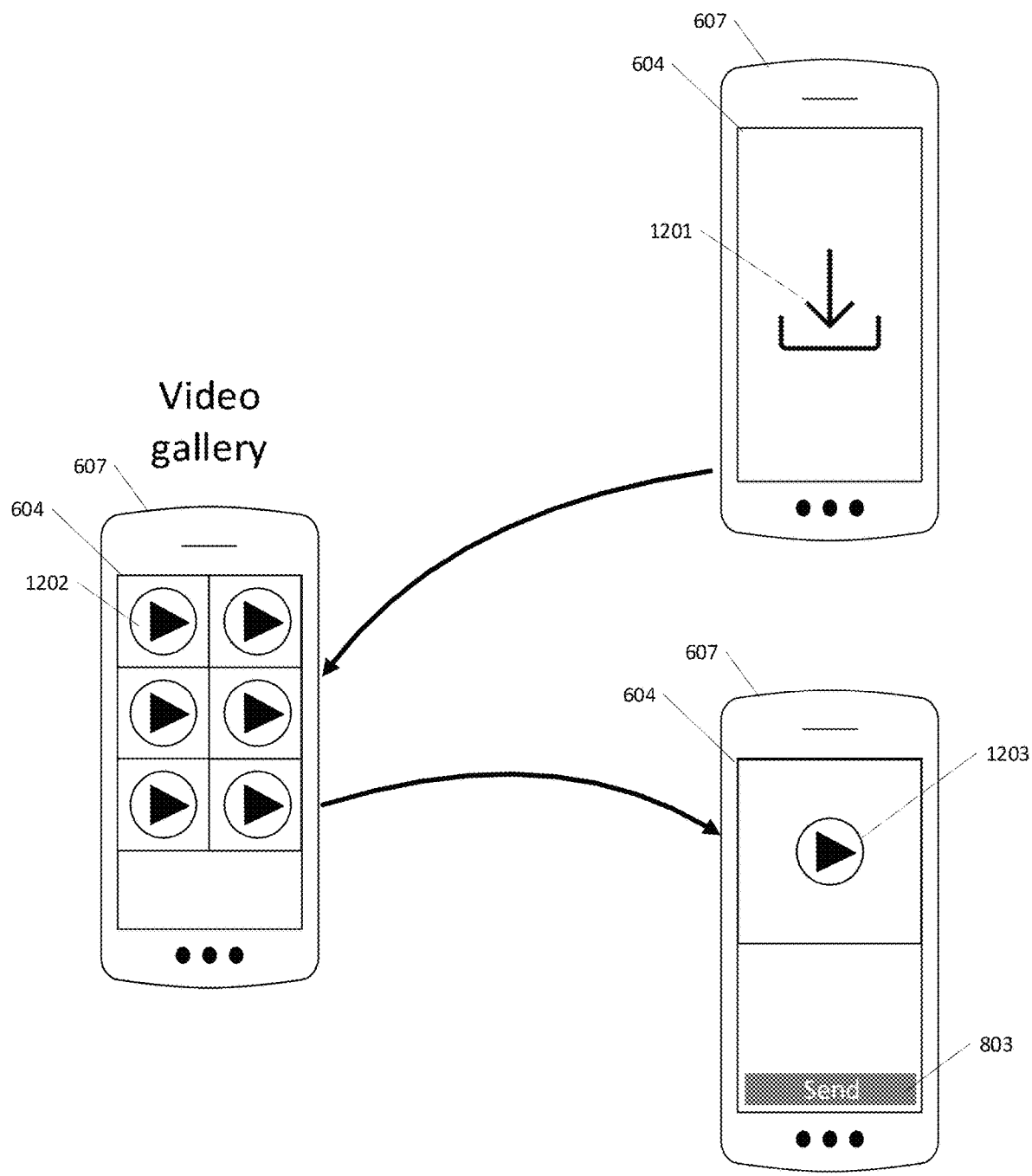
FIG. 12 is a diagrammatic illustration of an example of a contributor submitting video multi-media files to a contribution group collection within the contribution application.

With reference to FIG. 12, shown is a diagrammatic illustration of an example of a contributor 610 submitting video multi-media files 1202 to a contribution group 2302 within the contribution application 604. The contributor 610 is selecting and sending a video file 1201, 1202, 1203.

Figure 13:
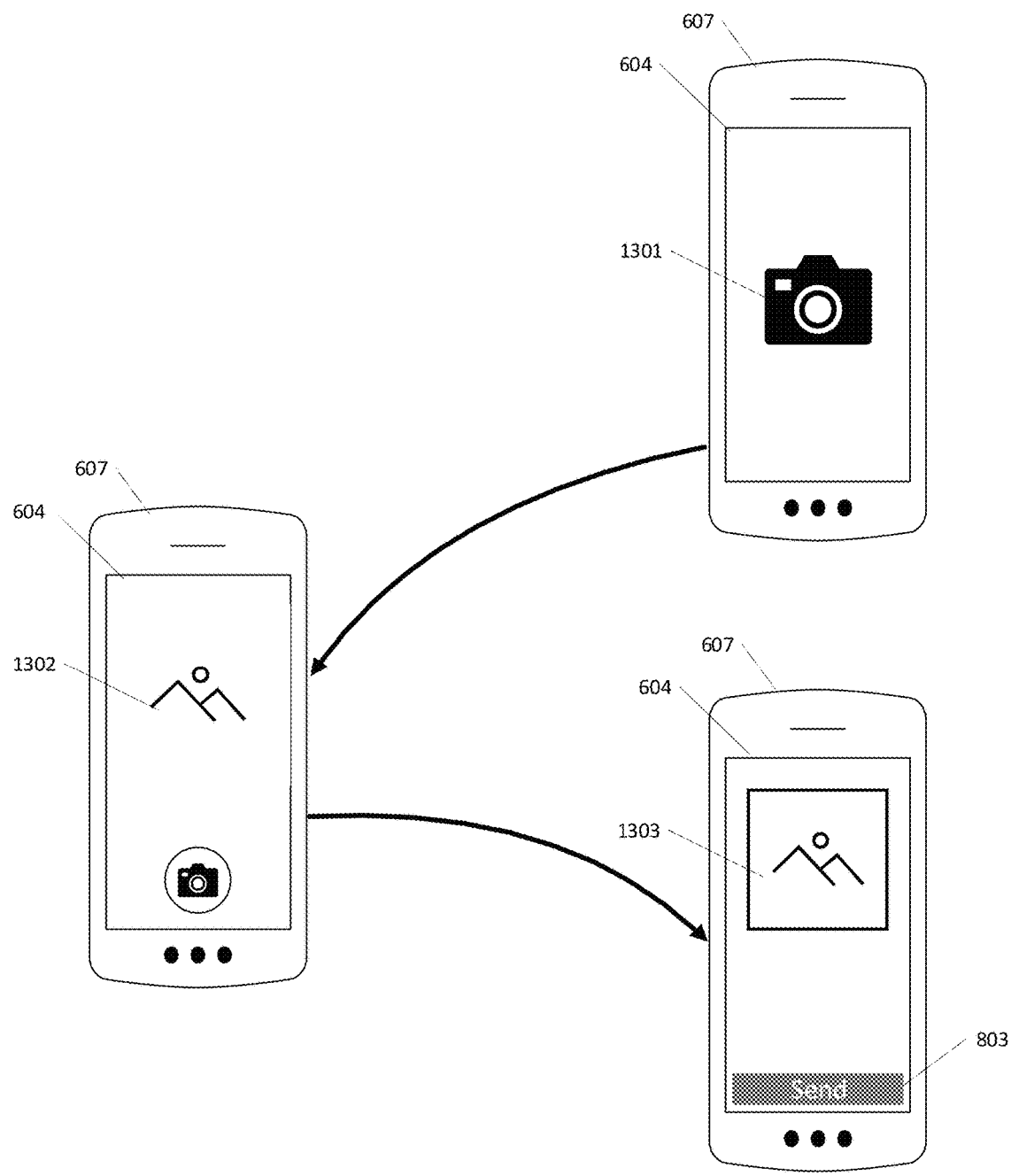
FIG. 13 is a diagrammatic illustration of an example of a contributor capturing camera pictures and submitting them to a contribution group collection within the contribution application.

With reference to FIG. 13, shown is a diagrammatic illustration of an example of a contributor 610 submitting camera pictures 1302 to a contribution group 2302 within the contribution application 604. The contributor 610 is using the built-in camera on the device 607 to capture and submit a camera image 1301, 1302, 1303. Once the contributor 610 has taken an image 1302 they select the "Send" 803 button to submit the image 1302. As per other examples the CG 2302 has been preassigned.

Figure 14:
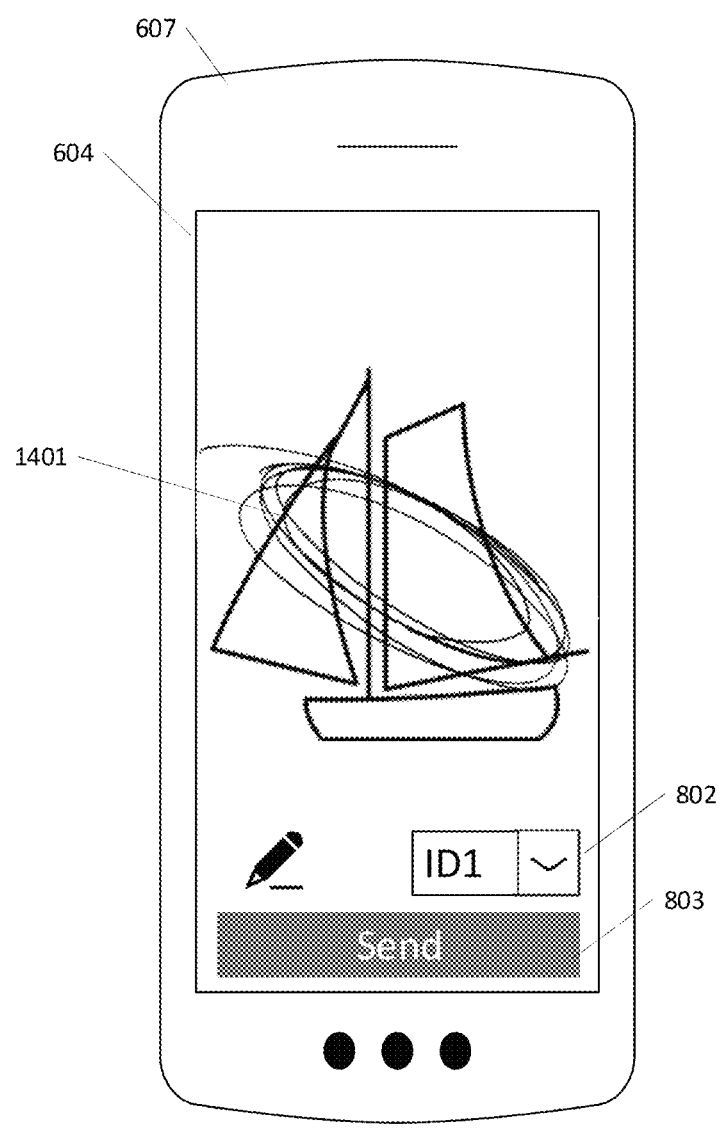
FIG. 14 is a diagrammatic illustration of an example of a contributor inking on and then submitting image content to a contribution group collection within the contribution application.

With reference to FIG. 14, shown is a diagrammatic illustration of an example of a contributor 610 inking 1401 and then submitting multimedia content, CD 3204 to a contribution group 2302 within the contribution application 604. A contributor 610 may want to ink a sketch or inking 1401 on an image before submitting their content for contribution. The CA 604 supports inking 1401 on multimedia files that support inking 1401 allowing for more complete and complex data content submissions. The contributor 610 has chosen to submit the inked content 1401 to CG 2302 ID1 802.

Figure 15:
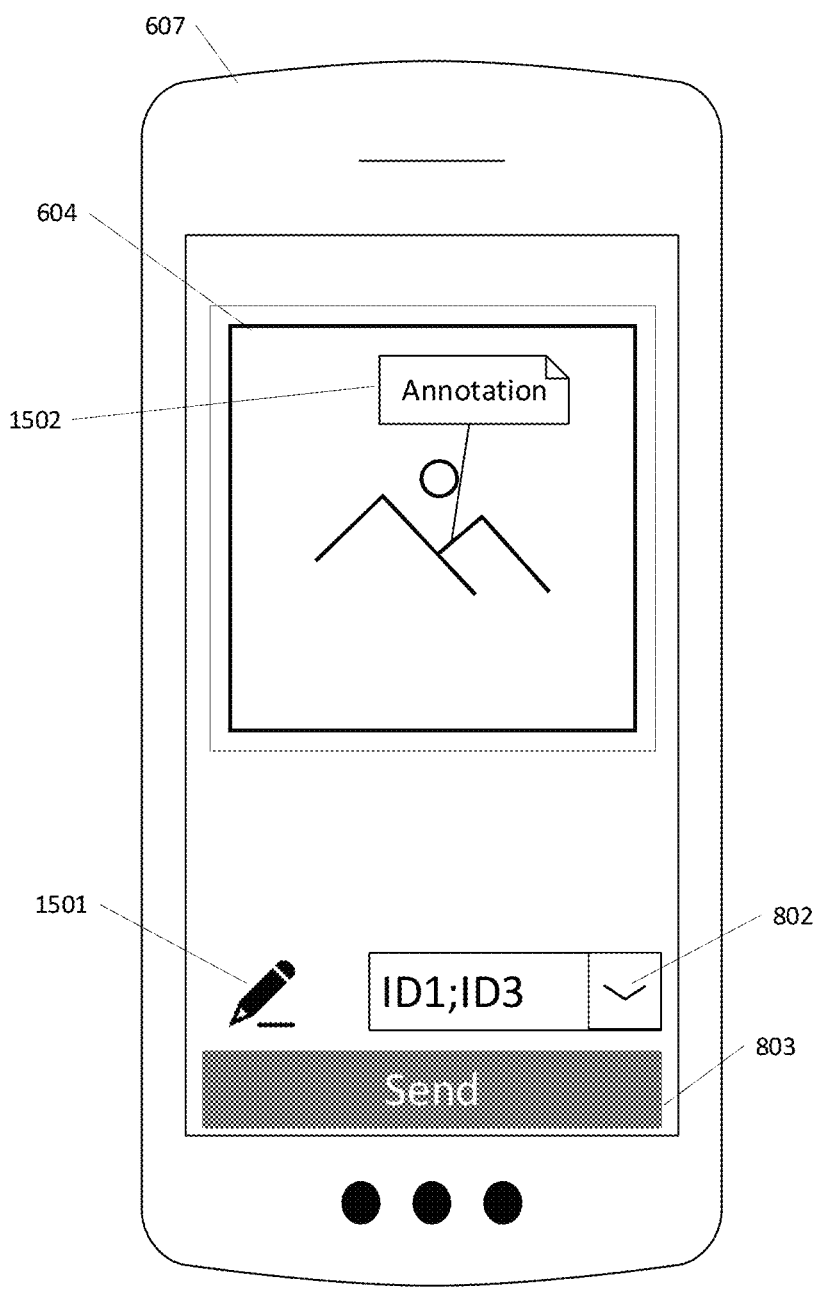
FIG. 15 is a diagrammatic illustration of an example of a contributor annotating on and then submitting image content to multiple a contribution group collection within the contribution application.

With reference to FIG. 15, shown is a diagrammatic illustration of an example of a contributor 610 annotating 1502 and then submitting multimedia content, CD 3204 to a contribution group 2302 within the contribution application 604. Further to the inking example in FIG. 14, the contributor 610 also has the ability to annotate 1502 the multimedia content. Annotation 1502 is a powerful technique to provide extra supporting descriptive data, comments, and meta data to an existing multimedia file, which is especially important to provide context for example during a collaboration session for the contribution data 3204.

Figure 16:
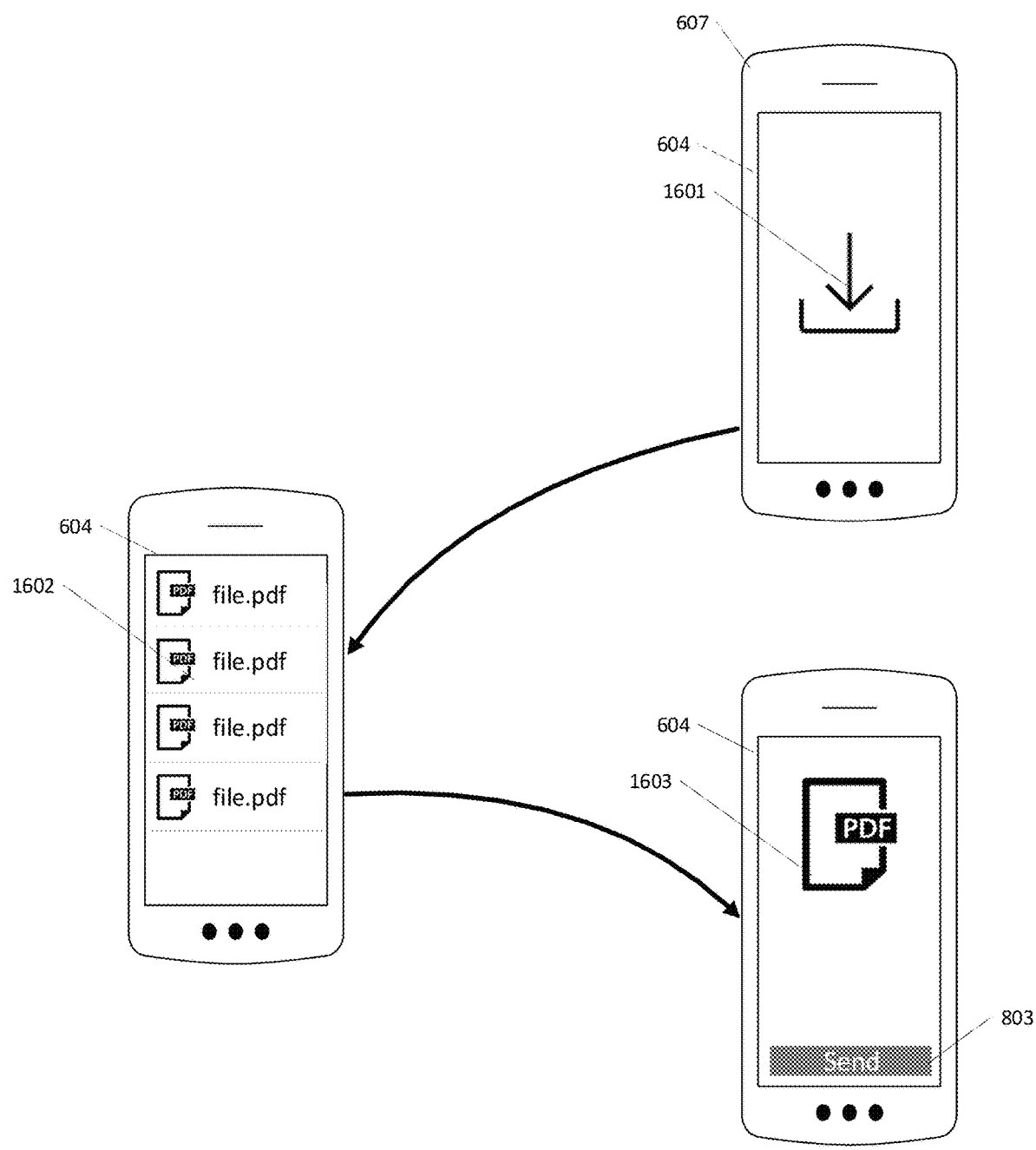
FIG. 16 is a diagrammatic illustration of an example of a contributor selecting and loading a PDF file and then submitting it to a contribution group collection within the contribution application.

With reference to FIG. 16, shown is a diagrammatic illustration of an example of a contributor 610 loading a PDF file 1601, 1602, 1603 and then submitting it to a contribution group 2302 within the contribution application 604. In addition to submitting multimedia content, CD 3204 the contributor 610 has the option to submit PDF documents 1602, via the CA 604.

Figure 17:
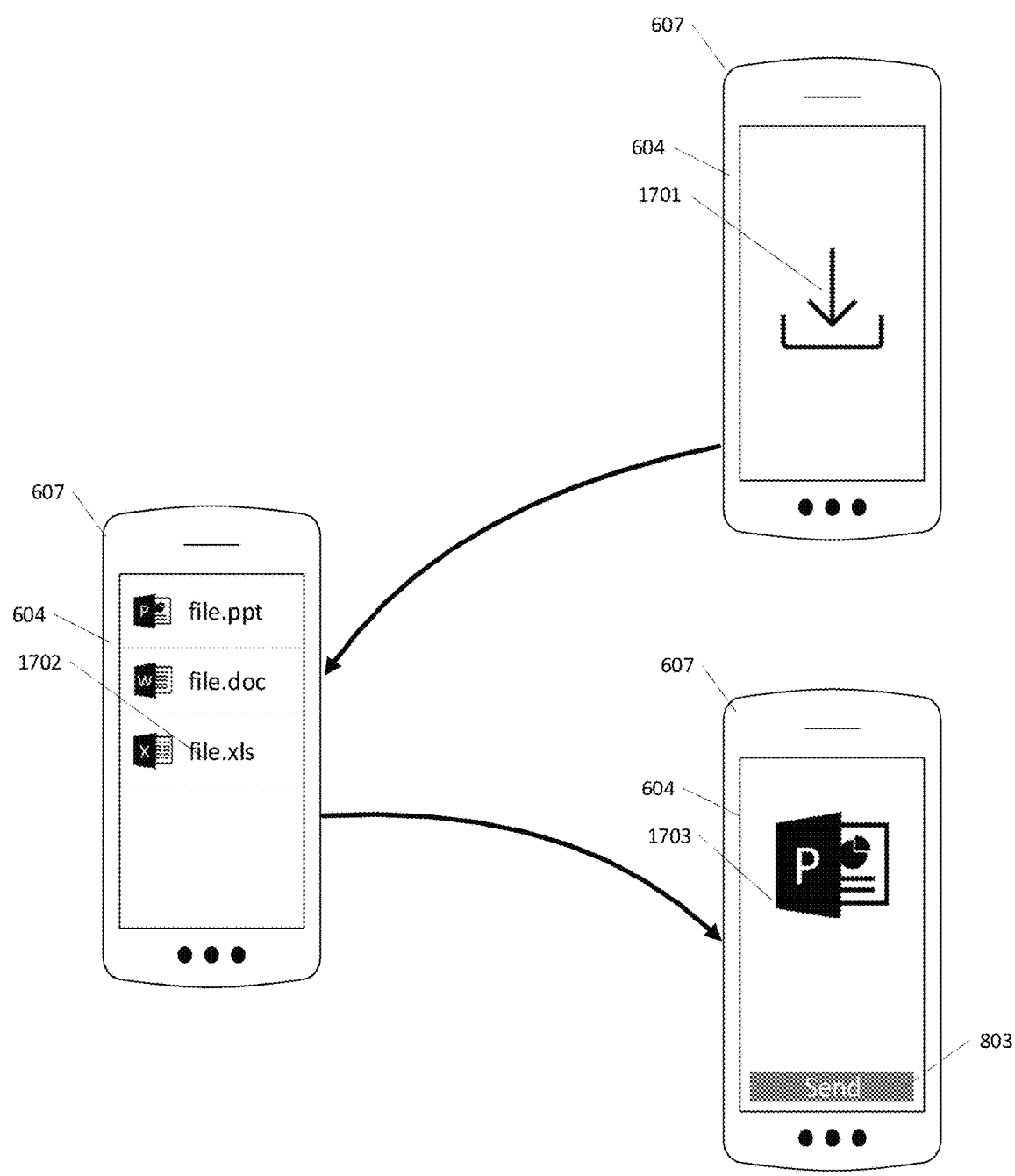
FIG. 17 is a diagrammatic illustration of an example of a contributor selecting and loading any file type file and then submitting it to a contribution group collection within the contribution application.

With reference to FIG. 17, shown is a diagrammatic illustration of an example of a contributor 610 loading any file type file 1701, 1702, 1703 and then submitting it to a contribution group 2302 within the contribution application 604. The CG 2302 is able to support the storing of numerous document object types. Examples shown, but not limited to, are .ppt, .doc, .xls 1702, and any other industry standard structured file types.

It should be noted that the contributor 610 does not need to understand and be constrained to the file formats that may or may not be supported by the digital workspace application 605. Because the CP 601 data can be mapped to any number of digital workspaces 2404 the CP 601 can preferably store any data and file format which can be utilized at a later date by the digital workspace applications 605 that support the submitted data and file formats. The functionality to abstract the data submission of the CD 3204 and storage from the specific digital workspace 2304 is another benefit that is provided by the preferred embodiment of the invention. This functionality allows for the support of dynamic content contribution at any time, separating the process of submitting and separating the process of submitting content from the process of collecting content for the purpose of displaying the content on a digital workspace applications 605 during a collaboration session. The data collection (contributions) process also allows for submitting to numerous CG 2302 at the same time and/or to different CG 2302 with each contributor 610 contribution 3301 allowing for tremendous flexibility for mapping and storing the contribution data 3204. In addition to the contributor 610 having the option to select which CG 2302 to send the data to, the collaborator 616 has the ability to map the CG 2302 to as many digital workspace applications 605 and objects on the digital workspace applications 605 as required or desired. So, a one to one mapping of data content submission to the data being displayed on the digital workspace application 605 is not required and is a significant improvement over the current functionality in the current art for systems of this purpose.

With reference to FIGS. 18, 19, 20, 21 and 22a-22e, illustrated are a representative multi-contributor 610 contribution session process from the beginning through to the contribution data 3204 being utilized in various ways on one or more digital workspace applications 605 by collaborators 616. The images illustrate the dataflow and concepts supported by an exemplary embodiment of the invention.

Figure 18:
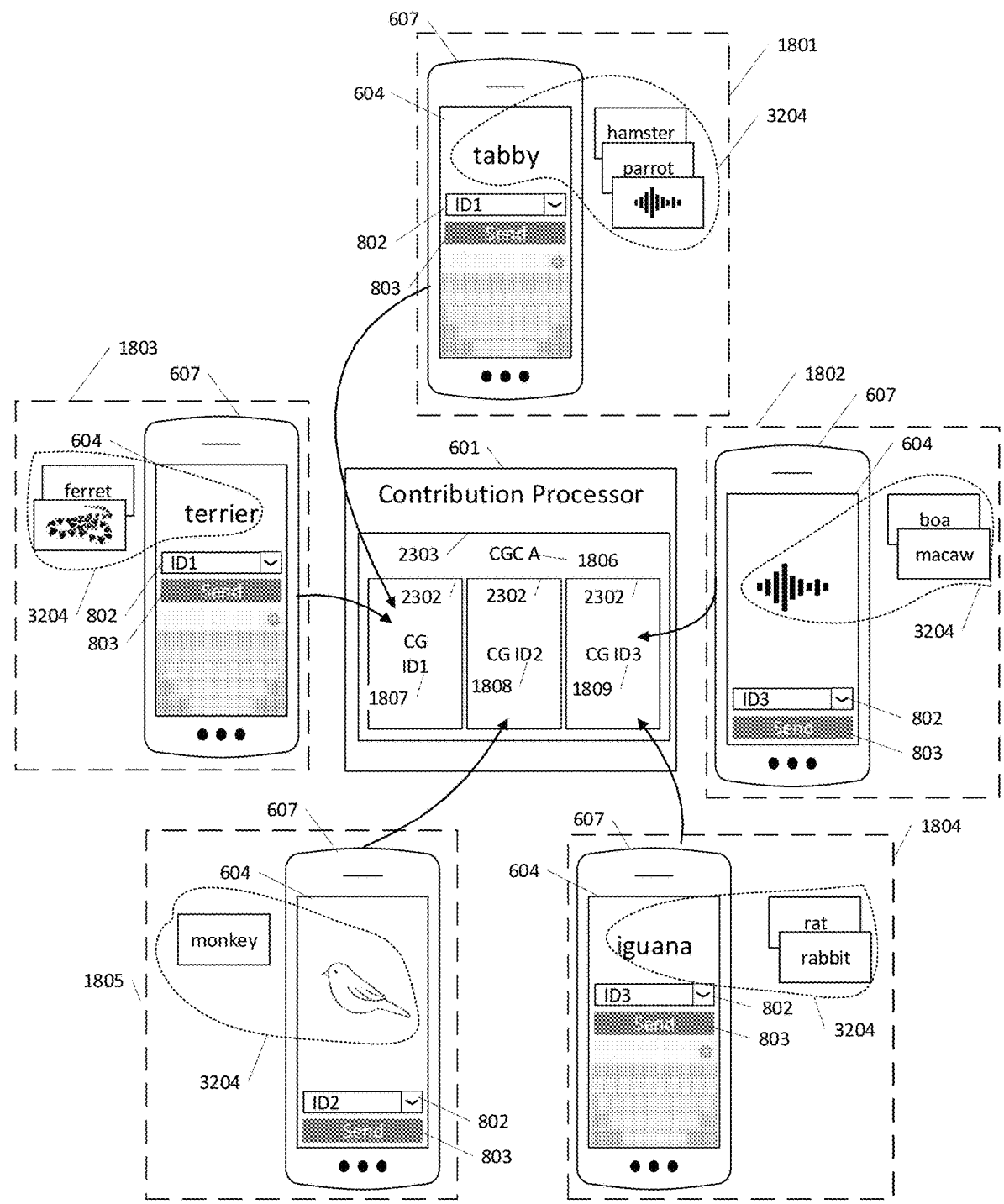
FIG. 18 is a diagrammatic illustration of an example of contributors loading mixed media content and then submitting them to a contribution group collection within the contribution application.

With reference to FIG. 18, shown is a diagrammatic illustration of a group of contributors 610 loading mixed media content, CD 3204, and then submitting the CD 3204 to a contribution group 2302 within the contribution application 604 which is then sent via a network connection to the CP 601. In this illustration, numerous devices 607 are being utilized by contributors 610 (not shown for clarity) to submit CD 3204 to the CP 601. The overall collaboration session theme is about favorite pets. Note the location of the contributors 610 is not important. The contributors 610 may be collocated with the collaborators 616 or they may be geographically located anywhere a network connection is available. The CP 601 has a CGC 2303 object named CGC A 1806 configured which contains CG ID1 1807, CG ID2 1808, CG ID3 1809. The CGC A 1806 is accessed by CA 604. Contribution session 1801 has had four items submitted comprising the content "hamster", "parrot", "tabby", and a voice file submitted into the CG ID1 1807. Contribution session 1802, has had three items submitted consisting of a voice file, "boa", and "macaw" text submitted into CG ID3 1809.

Contribution session 1803 has had three items submitted comprising "terrier", "ferret" text and an image of a "snake" submitted into CG ID 1807. Contribution session 1804, has had three items submitted comprising "iguana", "rabbit", and "rat" text items submitted into CG ID3 1809. Contribution session 1805, has had two items submitted comprising "monkey" text item and a "bird" image submitted into CG ID2 1808. For clarity, each contributor 610 is submitting a handful of items (data content), however any number of items and types of items can be submitted by the contributors 610. For example, 10's of items, 100's of items' 1000's of items, 10,000's of items, or more than 10,000,000's of items can be submitted and stored. The limited number of contributors 610 sessions shown is also for clarity, and any number can be supported by the contribution system (CS) 609. At this point, once all the data has been submitted by the CA(s) 604, the CP 601 has the contribution data 3204 stored within the correct CG(s) 2302 and CGC 2303.

Figure 19:
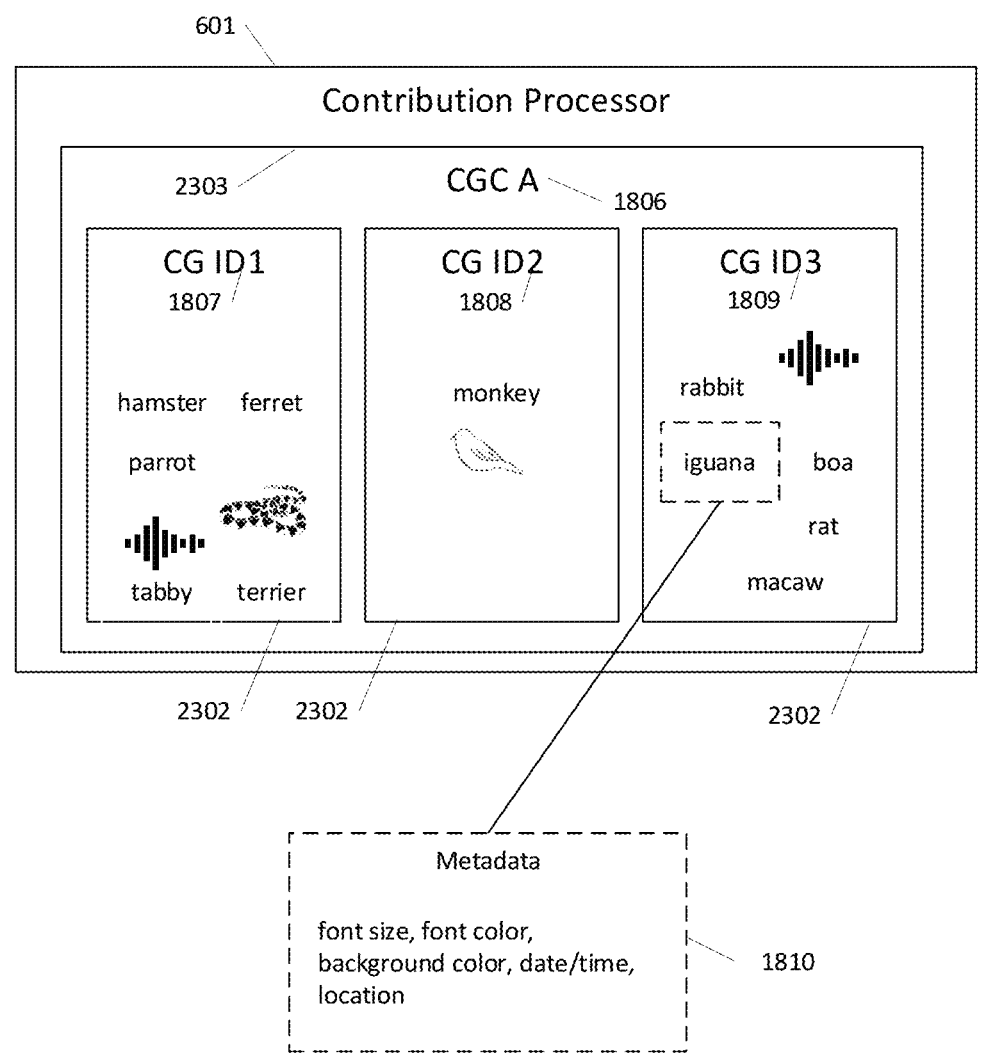
FIG. 19 is a diagrammatic illustration of an example of the submitted mixed media content stored within the contribution group collection and contribution groups within the contribution processor.

With reference to FIG. 19, shown is a diagrammatic illustration of an example of the submitted mixed media content stored within the contribution processer 601, contribution group collection 2303, and the contribution groups 2302. The diagram illustrates conceptually how the CD 3204 is captured within each of the CG 2302 ID1 1807, ID2 1808, ID3 1809 within the CGC 2303 contained in the CP 601. CG 2302 ID1 1807 contains all multimedia sent to CG 2302 ID1 1807. The data contained within CG 2302 ID1 1807 contains "tabby", "terrier", "hamster", "ferret", "parrot" text data, and an image of a "snake", and a "voice" file. CG 2302 ID2 1809 contains "monkey" text item and a "bird" image file. CG 2302 ID3 1809 contains "rat", "rabbit", "macaw", "iguana", and "boa" text, as well as a "voice" file. All CD 3204 data items contain metadata 1810 that is also stored with each item as part of the CG 2302 items.

Figure 20:
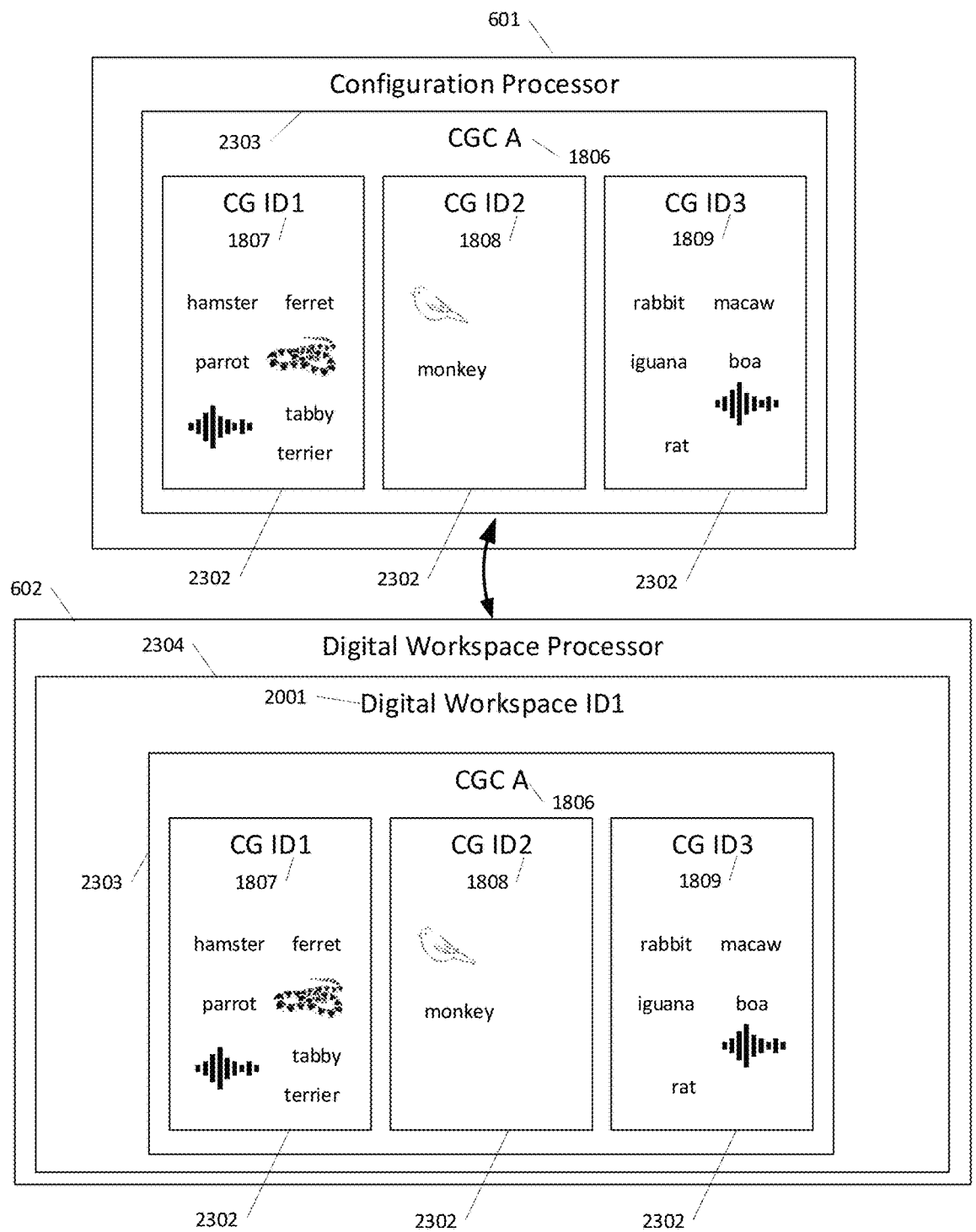
FIG. 20 is a diagrammatic illustration of an example of the submitted mixed media content stored within the contribution group collection and contribution groups in the contribution processor and mapped to the digital workspace processor.

With reference to FIG. 20, shown is a diagrammatic illustration of the submitted CD 3204 stored within the contribution processer 601 by contribution group collections 2303 and contribution groups 2302 which are mapped to the digital workspace processor (DWP) 602. Illustrated in this diagram is how the CGC 2303, CGC A 1806 contained in the CP 601 is mapped to digital workspace 2304 labeled as "Digital Workspace ID1" 2001, which is contained in the DWP 602. Although one digital workspace 2304 is shown, any number of digital workspaces 2304 can be mapped to CGC A 1806 contained in the CP 601. FIGS. 23a-23g illustrate this capability and will be detailed later in the specification.

Figure 21:
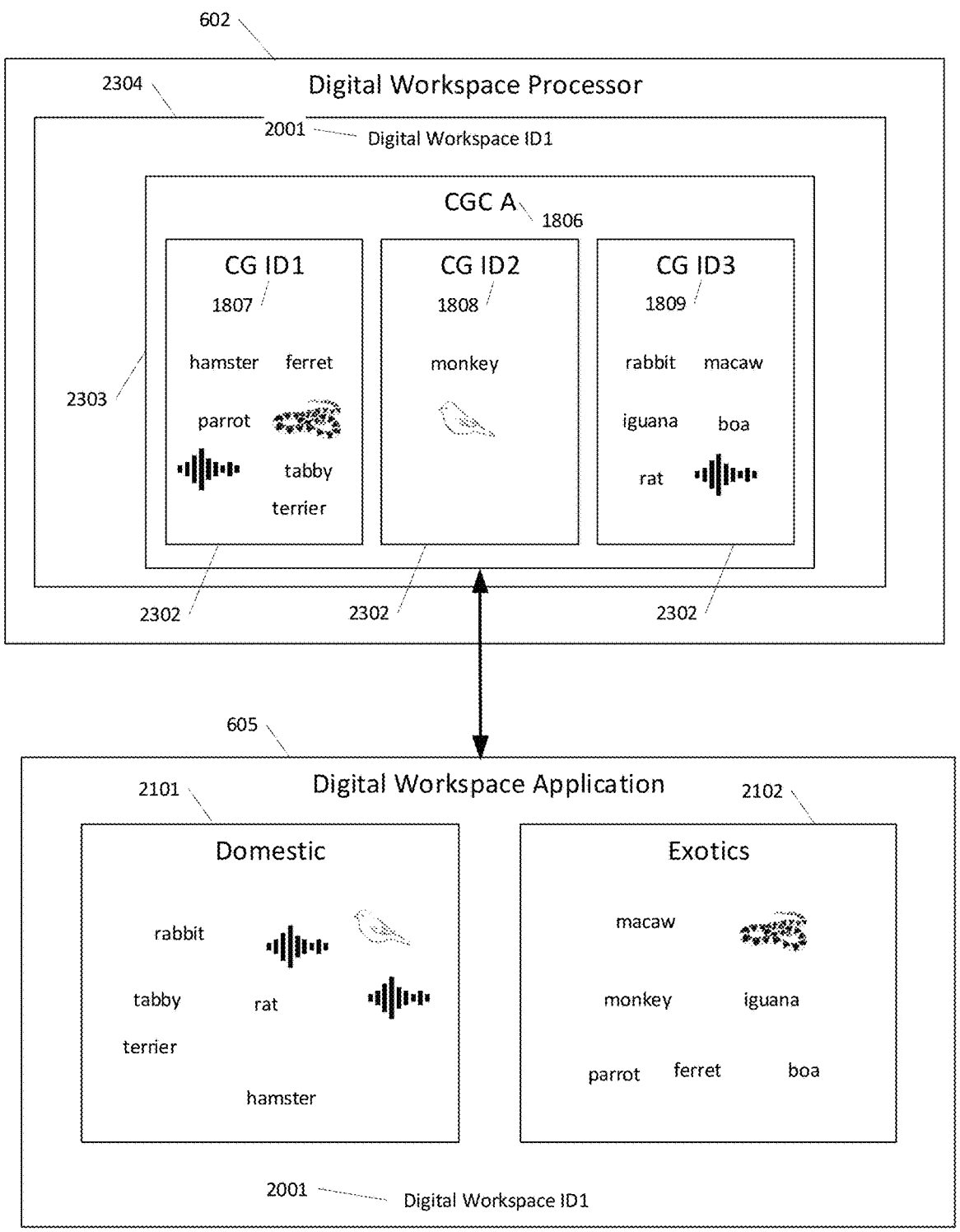
FIG. 21 is a diagrammatic illustration of an example of the submitted mixed media content stored within the contribution group collection and contribution groups in the digital workspace processor, and the mapping of the mixed media content to a digital workspace application.

With reference to FIG. 21, shown is a diagrammatic illustration of an example of the submitted CD 3204 stored within the CGC 2303 and CG 2302 in the digital workspace processor 602 mapped to a digital workspace application 605. The data from CGC A 1806 is linked to and downloaded by the digital workspace application 605. The CD 3204 has been organized into a graphical object such as a table, based on whether the pet is considered domestic 2101 or exotic 2102. Domestic 2101 contains five data items consisting of "rabbit", "tabby", "rat", "terrier", and "hamster" text data, two "voice" files, and one "image" file. Exotics 2102 contains items comprising five text fields "macaw", "monkey", "iguana", "parrot", "ferret", and "boa", and one "image" file.

The sorting of Domestic 2101 and Exotics 2102 is a choice made by the collaborator 616 that set up the digital workspace application 605. Any sorting and arrangement of the contribution data 3204 is possible and within the bounds of the preferred embodiment of the disclosure. The manipulation of the CD 3204 items illustrated on the digital workspace application 605 demonstrates the separation of the data contribution sessions 1801, 1802, 1803, 1804, 1805 from how the CD 3204 is displayed, managed, analyzed, and consumed by the collaborators 616 in the digital workspace application 605. If the contributors 610 were to add new CD 3204 to the collaboration session, the new CD 3204 would show up in the digital workspace application 605 in real-time, as new CD 3204 is added and processed by the contribution system 609.

It should be noted that the collaborator 616 can at any time choose to move, manipulate, delete, edit, and/or group the contributor 610 CD 3204 content, and/or add new content to the digital workspace 605, at any time. The collaborator 616 has the ability to create new objects, groups/containers 2101, 2102 at any time and direct the CD 3204 content to those containers. If the collaborator 616 deletes any CD 3204 content off of the digital workspace application 605, it is not deleted from the CGC 2303 or the CG 2302 objects. The CD 3204 is persistent in the CD 2302 and CGC 2302 objects. The deletion of the content in the CG 2302 and CGC 2303 objects is managed through a separate process on the contribution system 609 and could be reloaded if the CD 3204 was accidently deleted from the digital workspace application 605. The digital workspace application 605 containers 2101, 2102 do not need to be created ahead of time. The CG 2302, CGC 2303 data from the digital workspace processor 602 is available to be used at any time the CG 2302 container groups and CGC 2303 collections are mapped to the digital workspace ID1 2001.

With reference to FIGS. 22a, 22b, 22c, 22d, and 22e, shown are diagrammatic illustrations of examples of the submitted mixed media CD 3204 stored within the CGC 2303 and CG 2302 in the digital workspace processor 602 and mapped to a plurality of unique digital workspace application 605 instances and displayed through multiple graphical and textual interpretations.

Figure 22A:
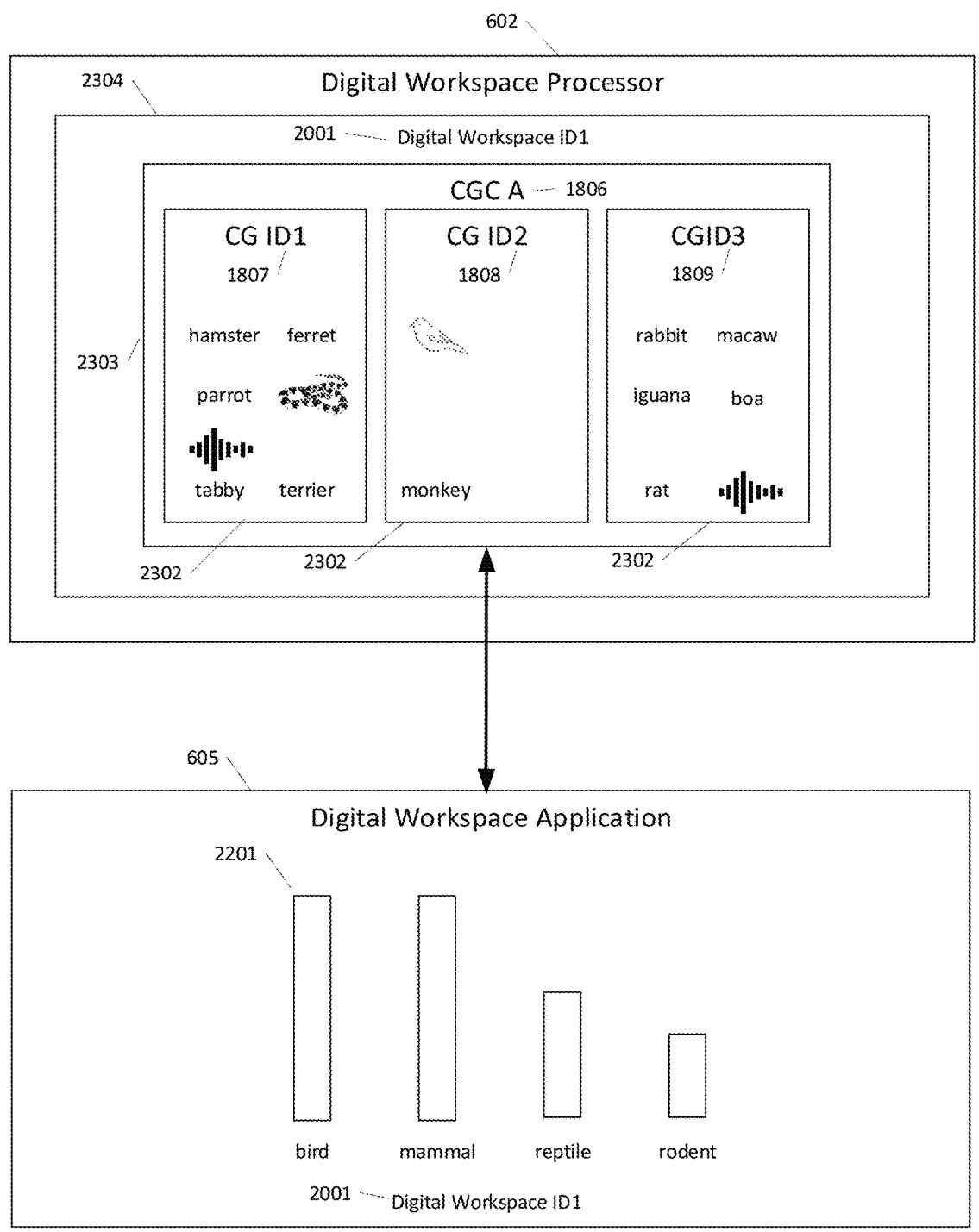
FIGS. 22a, 22b, 22c, 22d, and 22e are diagrammatic illustrations of examples of the submitted mixed media content stored within the contribution group collection and contribution groups in the digital workspace processor mapped to a plurality of digital workspace applications and displayed through multiple different graphical interpretations.

FIG. 22a illustrates the CD 3204 from CGC A 1806 being displayed in the digital workspace application 605 as a series of bars graphs 2201 which are aggregate totals of the type of animals. The meta-data is captured along with the specific CD 3204 which allows for powerful interpretations of the CD 3204 at the digital workspace application 605 layer. The CD 3204 data set has been displayed in two totally different ways. First as a demarcation of exotics 2102 and domestic 2101 groups, and then as accumulated totals in a bar graph 2201 based on type of pet. The contributors 610 did not need to know how the CD 3204 was being utilized. The contribution system (CS) 609 allows for tremendous flexibility to collect CD 3204 from anonymous users/contributors 610 and directed to any number of digital workspace 2304 instances which are linked to one or more DWA 605.

Figure 22B:
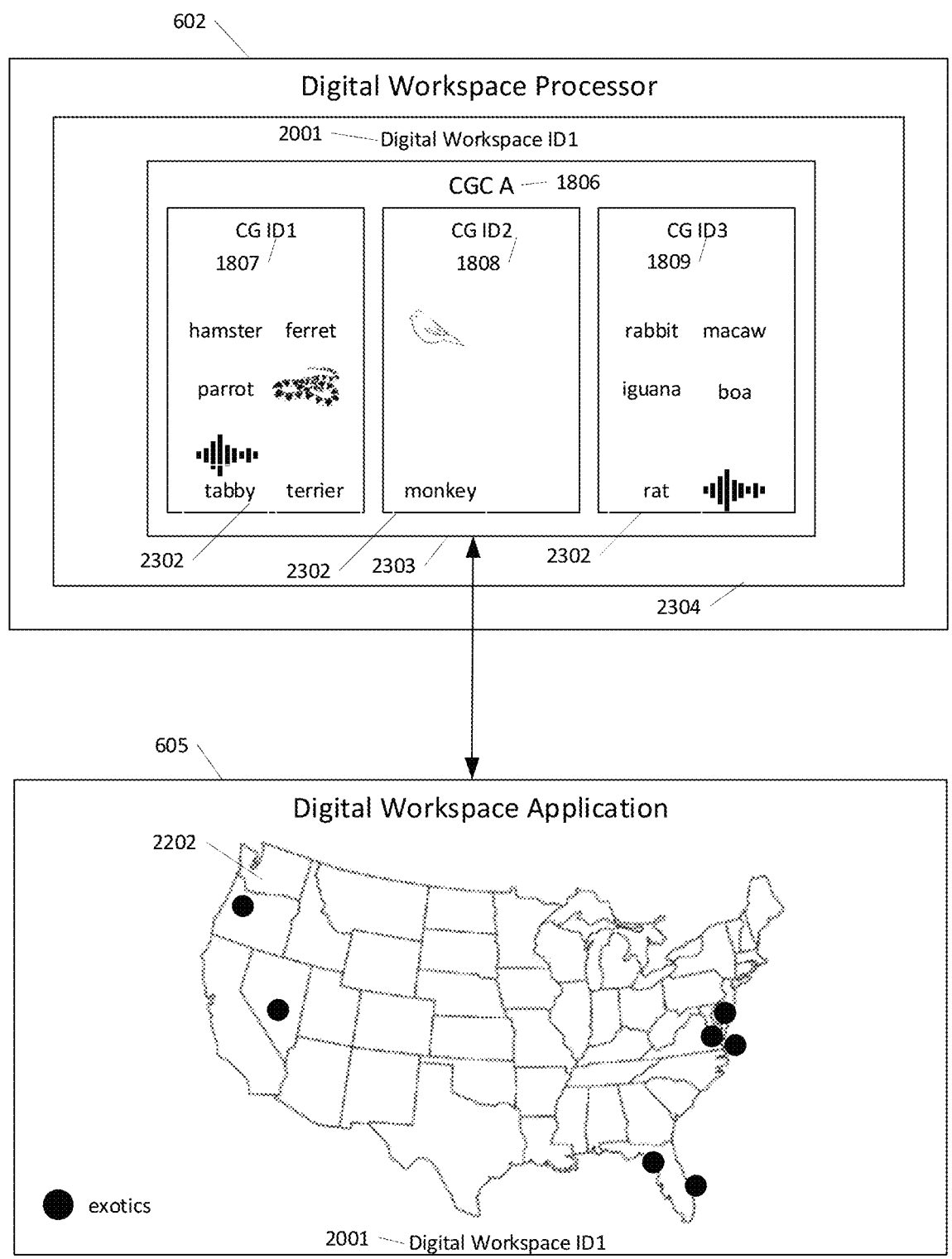

FIG. 22b utilizes the same CGC A 1806 CD 3204 data set and displays only the "exotic" animals on a geographic map 2202, based on the collected meta-data which contains the GPS coordinates of the contributors 610.

Figure 22C:
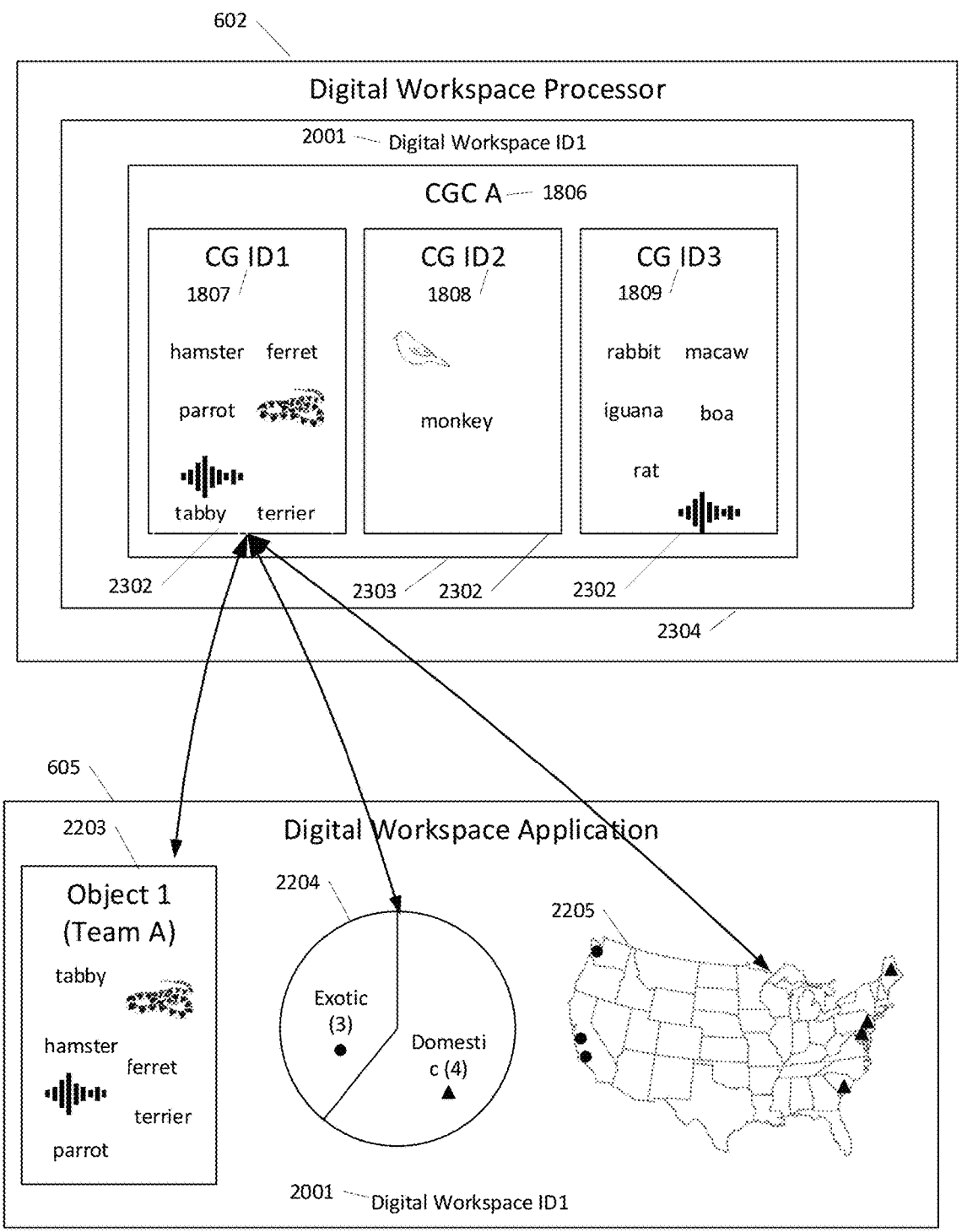

FIG. 22c further builds on the concept of taking the same CGC 1806 dataset and utilizing only the CG ID1 1807 data. The digital workspace application 605 has a group object 2203, a pie chart 2204 and a map object 2205 all referencing the same data set CG ID1 1807.

The ability to utilize the contributor 610 CD 3204 for any number of data presentation object types in real-time is beneficial to collaboration sessions in general and provides functionality not currently available in the current art. The collaborator 616 is freed from the tedious task of moving and manipulating the data from a parking lot area when the CD 3204 data sets can be mapped to any number of graphical objects and containers in real-time. The collaborators 616 do not need to copy the CD 3204 data to other data objects or locations on the digital workspace application 605 screen which is a more efficient and effective use of their time. As stated previously, the collaborators 616 have the ability to modify, edit, delete, and use the contributed data 3204 as per any other content that has been submitted to the digital workspace application 605 outside of the anonymous user data contribution sessions.

Any digital workspace application 605 data objects that can accept data are within scope of the disclosure, requiring only a standard translation layer to map the CD 3204 to the desired fields and layout. Examples of digital workspace application 605 data objects (DW objects) supported are, but not limited to, graphs, tables, lists, groups, charts, documents, spreadsheet, presentation formats, text fields. If a voice file or video file is part of the CD 3204 the collaborator 616 would access the content as per the typical methods for accessing the content via a user collaborative interface.

Figure 22D:
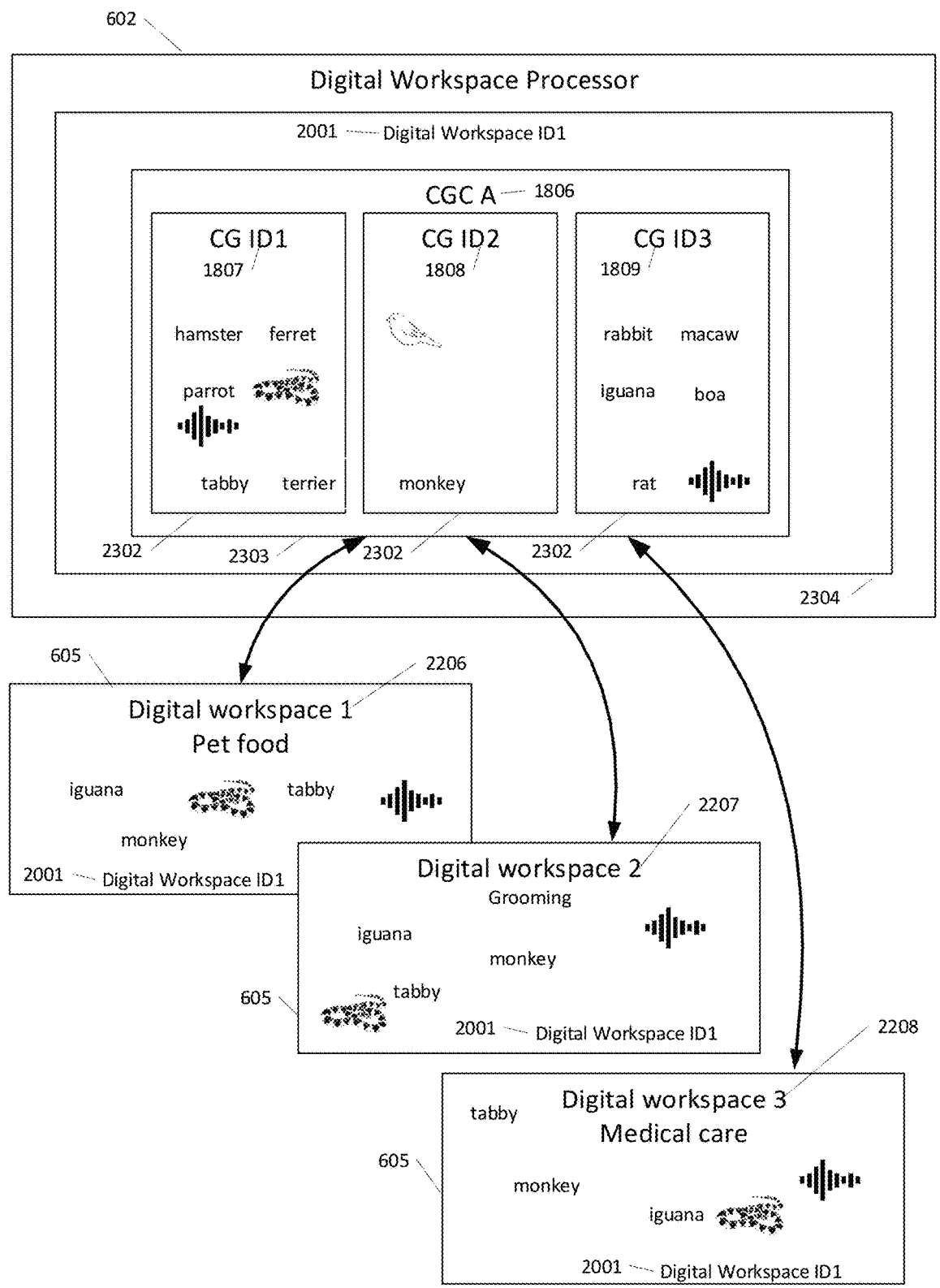

FIG. 22d illustrates the functionality of allowing a single CGC 2303 to be mapped to multiple unique digital workspaces 605 at the same time. CGC A 1806 is mapped to digital workspace 1 2206, digital workspace 2 2207, and digital workspace 3 2208. All three digital workspaces 2206, 2207, 2208 are accessing all three CG 2302 ID's at the same time CG ID1 1807, CG ID2 1808 and CG ID3 1809. Each digital workspace application instance 2206, 2207, 2208 has a different focus on the CD 3204 dataset. The collaborators 616 of digital workspace 1 2206 are focused on analyzing the pet food needs of the pets. The collaborators 616 of digital workspace 2 2207 are focused on the grooming needs of the pets, while the collaborators 616 of digital workspace 3 2208 are focused on the medical needs of the pets. This scenario illustrates how a common data set CGC A 1806 is accessible by numerous digital workspace applications 605 for the purpose of looking at the data with their unique needs in mind. The digital workspace applications 605 do not need to be the same application type for example, collaboration software, document software, spreadsheet software and even presentation software. The application software would need the ability to utilize an API functionality such as the one provided by CS API 2396 for the digital workspace processor 602.

Figure 22E:
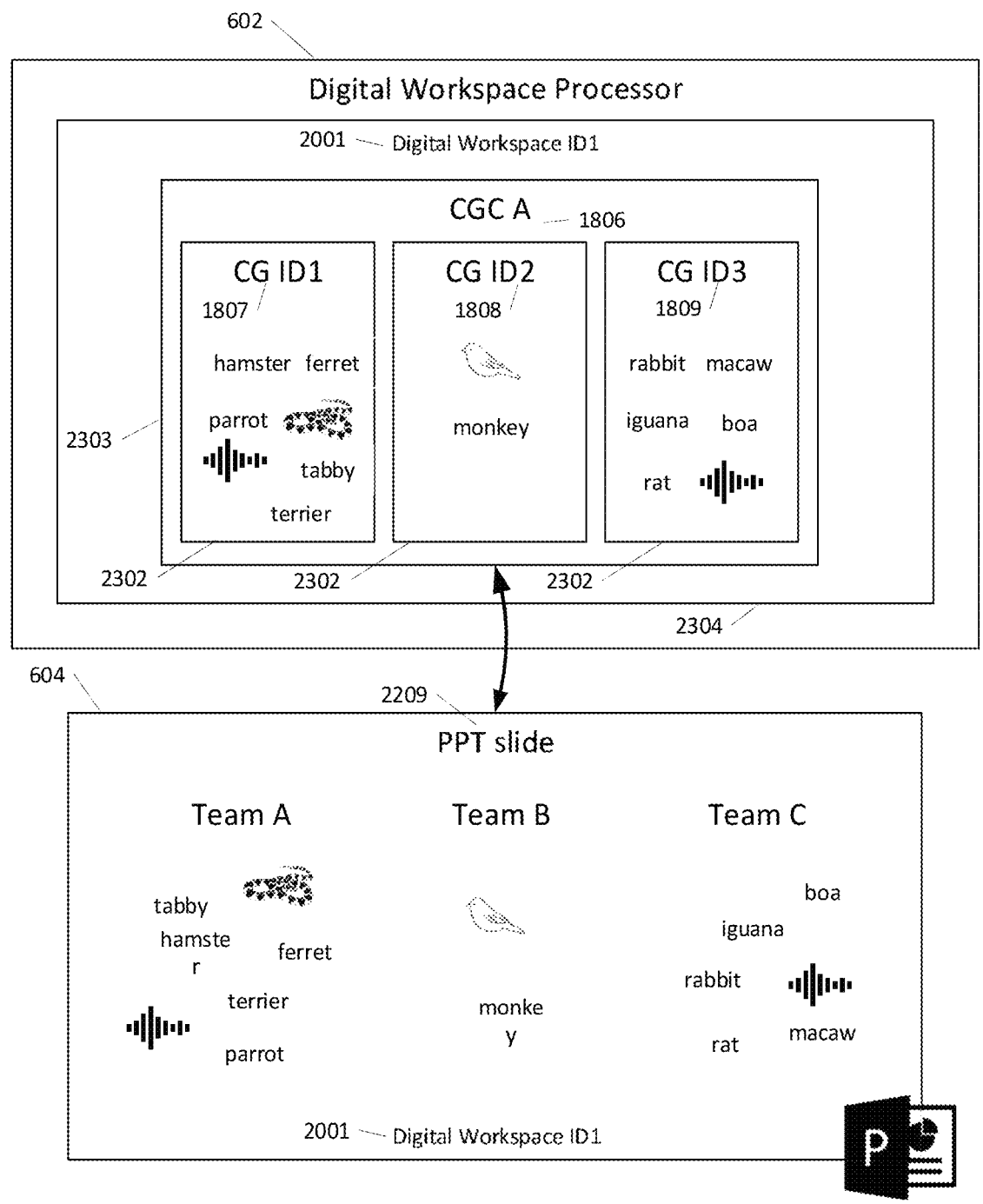

FIG. 22e illustrates an example of using a presentation program such as Microsoft Power Point 2209 referencing the CS API 2396 to access the CD 3204 and presenting in real-time from CGC A 1806.

The functionality to be able to utilize anonymous contributor/user 610 who can be geographically located anywhere, contribution data 3204, across any number of digital workspace applications 605 simultaneously, allows for a new level of team collaboration and data sharing that enables work teams to work more effectively and efficiently. The contributors 610 are not limited to the type of multimedia content they can share to the digital workspace application 605. The collaborators 616 are not constrained to predefined sharing objects, document types and/or rigid data field constraints. Contributors 610 can submit CD 3204 when the digital workspace application 605 is not open/active. This means that the contributors 610 are not limited to contributing to only an active digital workspace 605 which could prevent merge errors and other users from modifying their data contribution content unexpectedly. Data-contribution-race condition errors are eliminated by the fact that contributors 610 are never accessing the live document/digital workspace 2304, so data content corruption and deleting issues cannot happen and do not need to be managed.

With reference to FIGS. 23a, 23b, 23c, 23d, 23e, 23f, 23g and 23h, shown are diagrammatic illustrations of data flow and object mappings of the contribution group collections 2303 and contribution groups 2302 from the contribution application 604 to the contribution processor 601 to the digital workspace processor 602 to the digital workspace applications 605

Figure 23A:
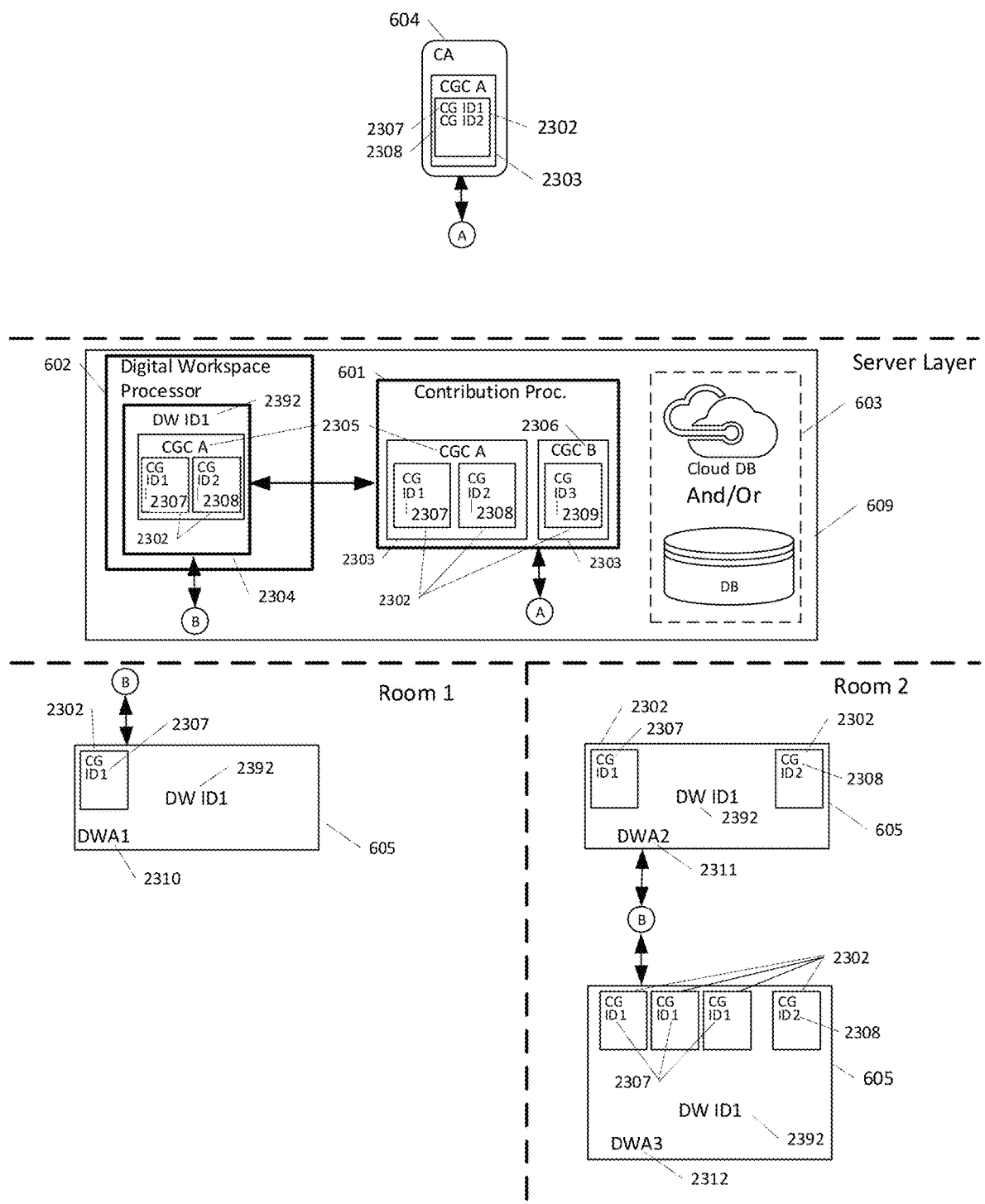

FIG. 23a is a diagrammatic illustration of the preferred embodiment and how the processors and data objects are laid out and mapped to support real-time contribution data (CD) 3204 from anonymous contributors users 610. Using a connection link as outlined in FIGS. 24a-24h, CD 3204 can be submitted through the CA 604 and then transmitted to the CS 609, which is then made available to a plurality of DWA 605. This is accomplished by utilizing contribution group (CG) 2302 objects and contribution group collection (CGC) 2303 objects which are object containers containing the CD 3204. The CG 2302 and CGC 2303 are outlined in detail in FIG. 32a. The actual electronic devices 607 are not shown, and only the processes/application layer and data objects are shown for clarity. The CA 604 can be utilized anywhere a network connection is available and be accessed by a contributor 610. In this example, for simplicity the CA 604 is mapped to a single CGC 2303 labeled as CGC A 2305. The CGC A 2305 contains two CG 2302 objects labeled as CG ID1 2307 and CG ID2 2308. The contributor 610 can submit CD 3204 to either or both CD ID1 2307 and CG ID2 2308. The CGC A 2305 is communicated in real-time to the CS 609 as CD 3204 is submitted.

The CS 609 comprises a database (DB) 603, a contribution processer (CP) 601, and a digital workspace processor (DWP) 602. Both the CP 601 and the DWP 602 are connected to the DB 603. The CP 601 is used to collect all of the CD 3204 from the contributors 610. The DWP 602 maps the CD 3204 to specific digital workspace 2304 instances. The digital workspace applications 605 map/connect to the DWP 602 and DW 2304 instance to obtain the CD 3204 submitted by the contributors 610. The layers of abstraction supplied by the CP 601 and the DWP 602 allow for very flexible and scalable system architectures with the ability to connect to any digital workspace application 605. The CS 609 processors can be collocated on the same server/hardware or they can be distributed across multiple processors/servers.

The CP 601 in this simplified example contains two CGC 2303 objects labeled as CGC A 2305 and CGC B 2306. The CGC A 2305 further contains two CG 2302 objects, labeled as CG ID1 2307 and CG ID2 2308. The CGC B 2306 contains CG ID3 2306 object. One CGC 2303 is illustrated in this example. As the contributor 610 submits CD 3204 via the CA 604, the CD 3204 in CGC A 2305 is transmitted through connection "A" to the CP 601 and is mapped within the CP 601 to the same CGC 2303, CGC A 2305. Once the CD 3204 is available in the CP 601 the CD 3204 is now available to the DWP 602.

The DWP 602 contains digital workspace (DW) 2304 instances. The DW 2304 instances are the cloud/database storage 603 of the digital workspace 2304 instance. Contained in the DW 2304 are the CGC 2303 object mappings and the rules 3001 for utilizing the CGC 2303 objects. DW 2304 instance is labeled as DW 2304 ID1 2392. There are three separate digital works space application DWA 605: DWA1 2310 in Room 1 and two DWA 605 (DWA2 2311 and DWA3 2312) in Room 2 (which may be remote from each other). All three DWA 605 instances are connected to the same DW 2304 ID1 2392 instance, meaning all three DWA 605 have access to the same CD 3204, through the CGC A 2305 object. DWA1 2310 is mapped to CG ID 2307 only. As a result, DWA1 2310 will only have available the CD 3204 submitted into CD ID1 2307. The DWA1 2310 can display and position the CG ID1 2307 object CD 3204 in anyway the collaborator(s) 616 of the digital workspace application 605 desire, and they are not constrained as per the current art to utilizing a parking lot, or to specific fields in forms and documents. Room 2 further illustrates how DWA2 2311 utilizes CG ID1 2307 and CG ID2 2308 within the DWA 605. In Room 2, DWA3 2312 mapped CG ID1 2307 three times while CG ID2 2308 is mapped once. It should be noted that by mapping the CG ID1 2307 object three times, the collaborators 616 have the option to display and utilize the CD 3204 multiple ways. This capability to reuse the same CD 3204 allows for tremendous flexibility to visualize, analyze, and collaborate on the submitted CD 3204.

Through the CA 604 on a device 607, the CD 3204 can be submitted by contributors 610 and then utilized by collaborators 616 on a plurality of unique DWA 605 instances in real-time, allowing for the access to the same CD 3204 that collaborators 616 have never had previously in the current art. Typically, numerous data transformations, importing and exporting from various applications, and a high degree of manual effort was required by the contributors 610 and collaborators 616 in the current art.

Figure 23B:
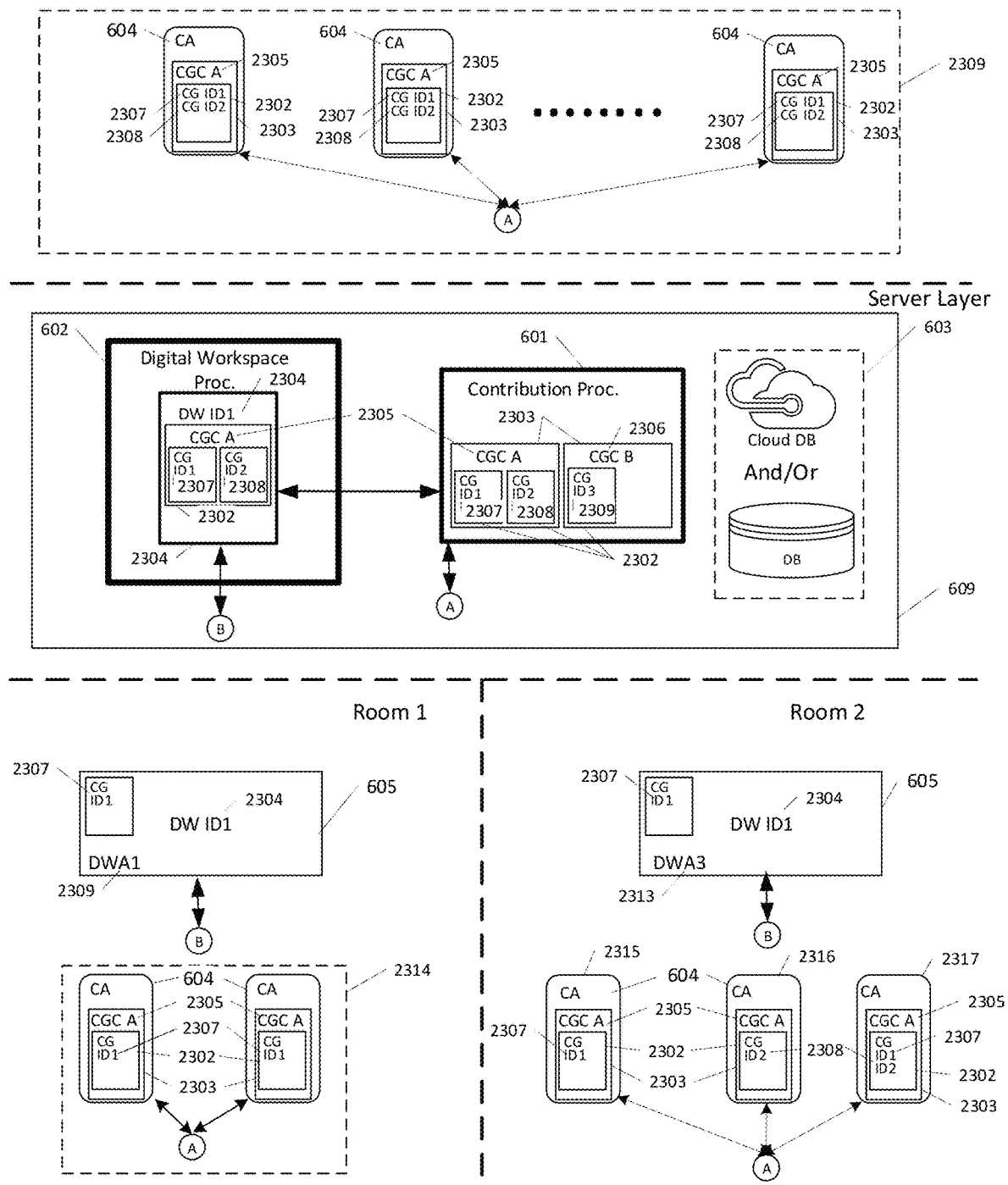

FIG. 23b outlines a more complex scenario of how the CD 3204 can be mapped from one or more CA 604 into one or more DWA 605. Eight CA 604 instances are illustrated, however there is no limit to the number of CA 604 instances used and active. Not located in Room 1 and Room 2 are a plurality of CA 604 instances that can be located anywhere (geographically) a network connection is available to the CS 609. All three CA 604 are mapped to the same CGC 2303, CGC A 2305. The CS 609 is laid out as previously outlined in FIG. 23a.

Room 1 now contains one DWA 604 labeled DWA1 2309 and two CA 604 instances. The CA 604 instances are the same as the above non-collocated instances on devices 607. Both instances are mapped to the CGC 2303, CGC A 2305. Unlike the non-collocated CA 604 instances as illustrated in 2314, the CA 604 instances are only mapped to CG ID1 2307. This flexibility and configuration provided by the CS 609 which the collaborator 616 sets up ahead of time as part of the DWA 605 session configuration. The flexibility to be able to direct the CD 3204 to any CG 2302 and DWA 605 is a very powerful aspect of the preferred embodiment. The Room 1 CA 604 instances communicate "A" to the CP 601 and do not communicate to the DWA 605 directly. This is because the CA 604 is not a collaboration application and the users of the CA 604 are not able to modify, edit, or do anything other than submit content to the DWA 605 through the CS 609. The contributors 610 are not signed-in users/collaborators 616 of the system, only ad-hoc anonymous contributors 610 of CD 3204, and as such cannot directly modify content on the DWA 605. The contributors 610 would be required to log into the DWA 605 and launch the DWA 605 on their device 607 which they could do at the same time if desired and is not constrained in this embodiment. There may be scenarios where access to both the CA 604 and DWA 605 are enabled and accessed on the same device 607, depending on the privilege of the users and the process the collaborator 616 and session facilitator are using. A session facilitator maybe a senior collaborator 616 that is running the collaboration session on the main DWA 605 in the room and/or across may rooms and instances. The DWA 605 in Room 1 is linked to DW ID1 2392, and as such is mapped to CGC A 2304.

Room 2 contains one DWA 605 instance DWA3 2313. The DWA3 2313 is linked to CG ID1 2307 only. The collaborator 616 can reconfigure this mapping at any time through the configuration settings of the DWA3 2313. The DWA3 2313 has access to CG ID2 2308 at any time through CGC A 2305, while the DWA3 2313 is mapped to DW ID 2392. Currently, DWA3 2313 is utilizing the CD 3204 available through CG ID1 2307. Also located in Room 2 are three CA 604 instances 2315, 2316, and 2317. Each CA 604 instance is mapped to CGC A 2305 uniquely demonstrating the flexibility of various CG 2302 mappings available through the configuration of the CGC 2303 objects contained in the CS 609.

CA 604 instance 2315 is configured to contribute to CG ID1 2307 only. The CA 604 instance 2316 is configured to contribute to CG ID2 2308 only. The CA 604 instance 2317 is configured to contribute to both CG ID1 2307 and CG ID2 2308. This type of configuration flexibility allows for, for example, break out groups to contribute to different CG 2302 objects within a common CGC 2303, allowing for unique and diversified CD 3204 contributions while allowing the facilitator/collaborator 616 to marshal the CD 3204 to specific DWA 605 CG 2302 instance mappings. Various groups of contributors 610 can be tasked with collecting and submitting certain CD 3204 types and their CD 3204 can be organized and maintained in separate CGC 2303 and of CG 2302 objects.

Figure 23C:
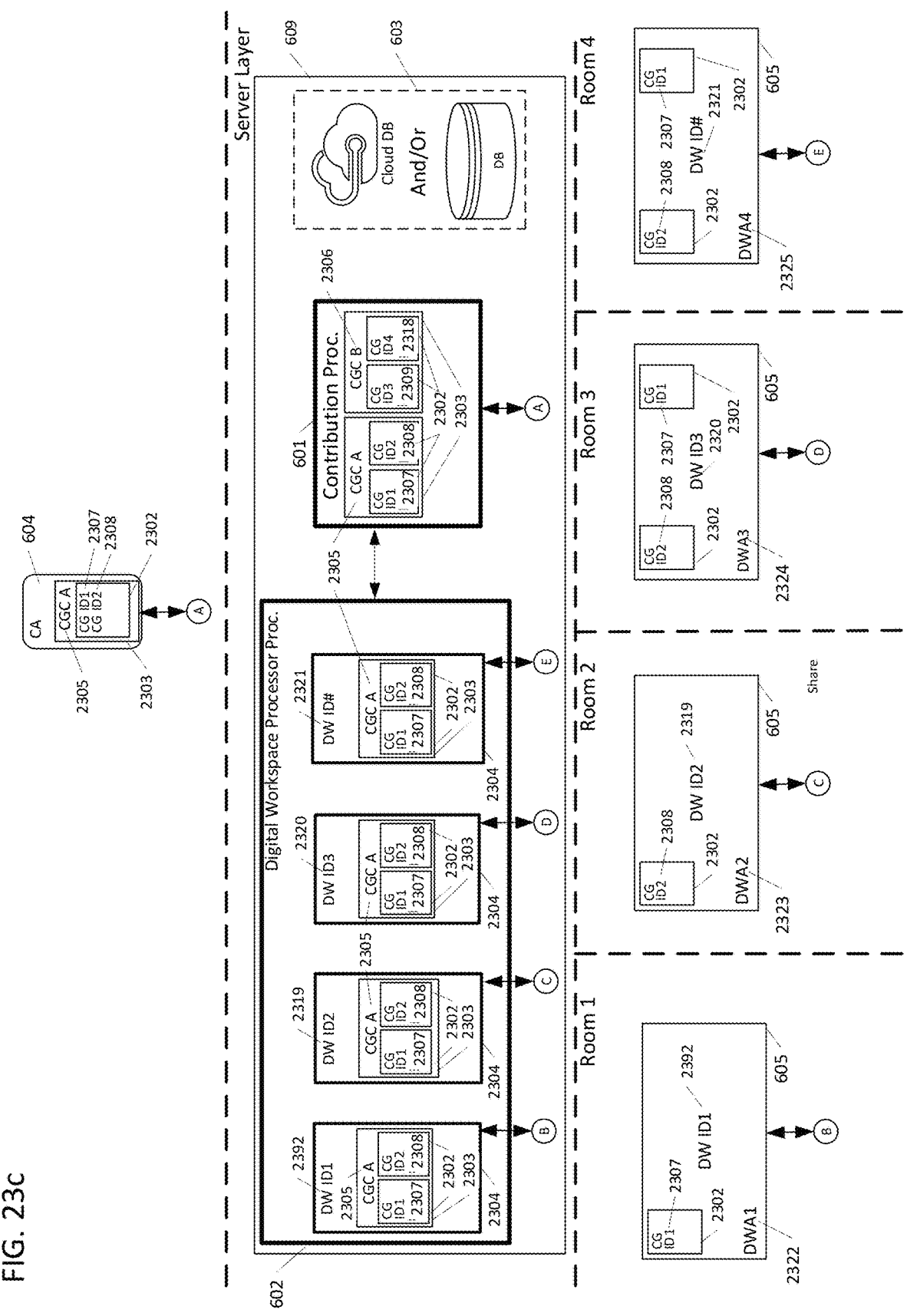

FIG. 23c elaborates on more complex CGC 2303 and CG 2302 mappings between the CA 604 instance and multiple DW 2304 mappings. A single CA 604 can be shared across a plurality of DW 2304 instances which can then be mapped to numerous DWA 605 instances, allowing for numerous combinations and mappings from a single submitted contributor 610, CD 3204, in real-time. Although one contributor 610 is shown for simplicity as illustrated previously, any number of contributors 610 and CA 604 are allowed.

The CA 604 is mapped to CGC A 2305 which is also mapped to CG ID 2307 and CG ID2 2308. The contributor 610 can submit CD to either CG 2302, CG ID1 2307, and/or CG ID2 2308. The CP 601 has been configured for two CGC 2303, CGC A 2305 and CGC B 2306. The CGC A 2305 contains CG ID1 2307 and CG ID2 2308. The CGC B contains CG ID3 2309 and CG ID4 2318.

The DWP 602 has been configured with four DW 2304 instances DW ID 2392, DW ID2 2319, DW ID3 2320, and DW ID# 2321. Any number of DW 2304 instances can be created and configured as denoted by the "#" in the DW ID # 2321 instance. All four instances DW ID 1 2392, DW ID2 2319, DW ID3 2320, and DW ID# 2321 are all configured to utilize the CGC A 2305 group. Note that each DW 2304 has a unique DWA connection point. The DW ID1 2392 is connected to "B", the DW ID2 2319 is connected to "C", the DW ID3 2320 is connected to "D", and the DW ID# 2321 is connected to "E". Room 1 contains a single DWA 605 instance, DWA1 2322. The DWA1 2322 has been configured to map to DW ID1 2392 and is further configured to utilize the CG ID 2307 object. Room 2 contains a single DWA 605 instance, DWA2 2323, which is mapped to DW ID2 2319 and is configured to utilize CG ID2 2308. Room 3 contains a single DWA 605 instance DWA3 2324, which is mapped to DW ID3 2320 and is configured to utilize CG ID1 2307 and CG ID2 2308. Room 4 contains a single DWA 605 instance, DWA# 2325, which is mapped to DW ID# 2321 and is configured to utilize CG ID 2307 and CG ID2 2308. As illustrated, each unique DWA 605 has the capability to be mapped to a unique DW 2304 instance. This level of configuration allows for very complex CD 3204 sharing scenarios and mappings while abstracting the CD 3204 from the DWA 605. Being able to map across many DWA 605 instances overcomes many limitations of the current art in a collaboration environment.

Figure 23D:
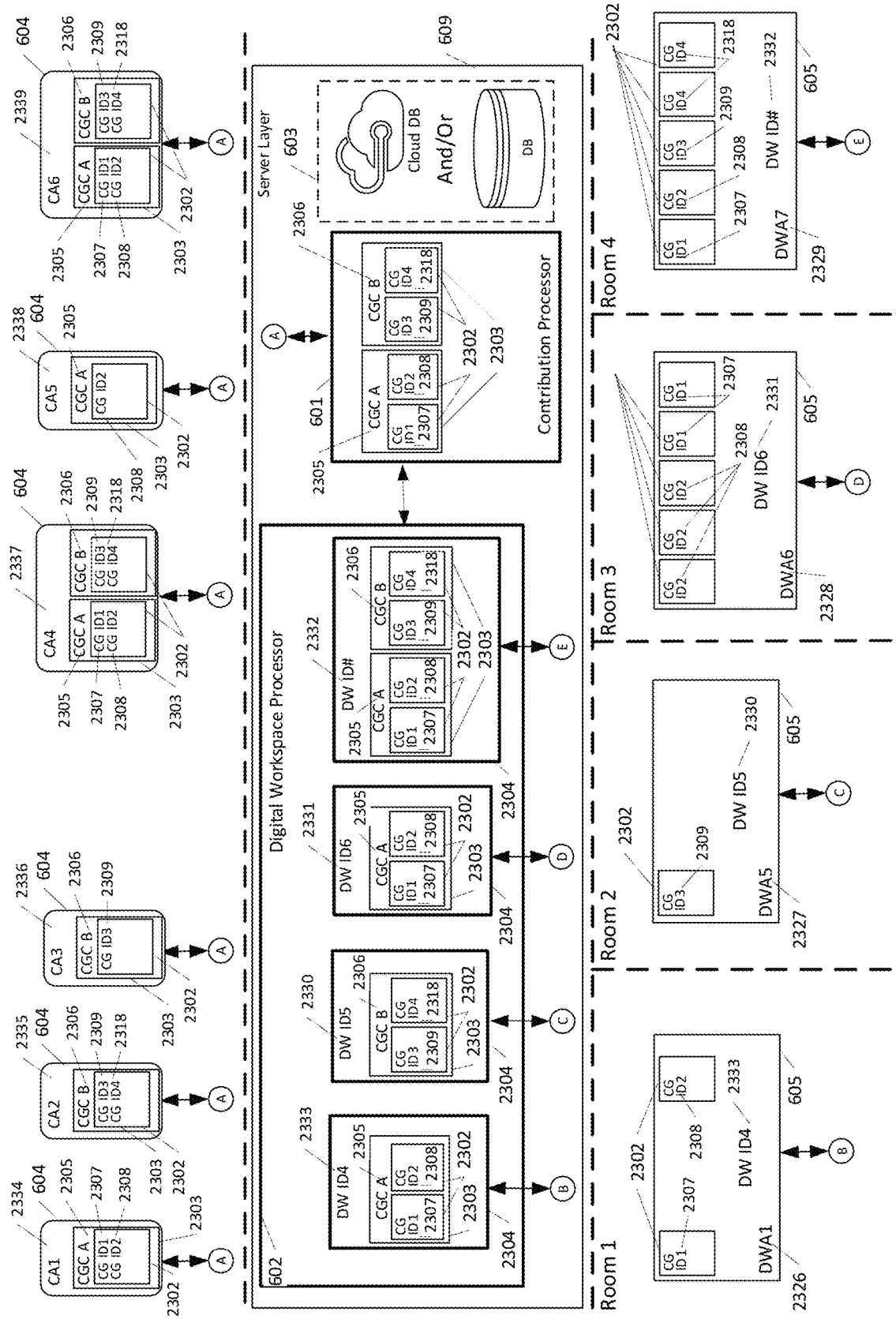

FIG. 23d builds upon FIG. 23c by illustrating even more complex CGC 2303 mappings from CA 604 to DWA 605 instances. Six (6) CA 604 instances are illustrated, CA1 2334, CA2 2335, CA3 2336, CA4 2337, CA5 2338, and CA6 2339, each configured to utilize a different CGC 2303 arrangement showing the flexibility and power of the CS 609.

The CA1 2334 is configured to utilize CGC 2303 CGC A 2305, which is configured to contain CG ID1 2307 and CG ID2 2308. The CA2 2335 is configured to utilize CGC 2303 CGC B 2306, which is configured to contain CG ID3 2309 and CG ID4 2318. The CA3 2336 is configured to utilize CGC 2303 CGC B 2306, which is configured to contain CG ID3 2309. The CA4 2337 is configured to utilize two CGC 2303 groups, CGC A 2305 and CGC B 2306. The CGC A 2305 is configured with CG ID1 2307 and CG ID2 2308. The CGC B 2306 is configured to contain CG ID3 2309 and CG ID4 2318. The CA5 2338 is configured to utilize CGC A 2305, which is configured to contain CG ID2 2308. The CA6 2339 is configured to utilize two CGC 2303 groups, CGC A 2305 and CGC B 2306. The CGC A 2305 is configured with CG ID1 2307 and CG ID2 2308. The CGC B 2306 is configured to contain CG ID3 2309 and CG ID4 2318.

A single CA 604 can be configured to contain any number of CGC 2303 groups, allowing for numerous ways to collect and map CD 3204 to numerous collaboration scenarios and digital workspaces 2304 instances. The CGC 2303 groups can be configured to contain any number of the available CG 2302 objects. This allows for complex contribution rules 3001 and privileges to control how CD 3204 is collected by the CA 604 and mapped to the digital workspace application 605.

The CP 601 is configured as per FIG. 23c with the same CGC 2303 arrangement. The DWP 602 has been configured differently to handle a more complex CG 2302 mapping. Four (4) DW 2304 instances have been configured DW ID4 2333, DW ID5 2330, DW ID6 2331, and DW ID# 2332. DW ID4 2333 is configured to contain CGC A 2305, which contains CG ID1 2307 and CG ID2 2308. The DW ID5 2330 is configured to contain CGC B 2306, which contains CG ID3 2309 and CG ID4 2318. The DW ID6 2331 is configured to contain CGC A 2305, which contains CG ID1 2307 and CG ID2 2308. The DW ID# 2332 is configured to contain CGC A 2305, which contains CG ID1 2307 and CG ID2 2308, and CGC B, which contains CG ID3 2309 and CG ID4 2318.

Room 1 contains a single DWA 605 instance DWA1 2326, which is configured to map to DW ID4 2333. The DWA1 2326 is mapped to CG ID1 2307 and CG ID2 2308. Room 2 contains a single DWA 605 instance DWAS 2327, which is configured to map to DW ID5 2330. The DWA2 2327 is mapped to CG ID3 2309 only. Room 3 contains a single DWA 605 instance, DWA6 2328, which is configured to map to DW ID6 2331. The DWA6 2328 is mapped to CG ID2 2308 three times and to CG ID1 2307 two times. The DWA6 2328 is configured to show the same CD 3204 in multiple formats from the same CGC 2303. This functionality allows for complex collaboration presentations, and the ability to utilize the same CD 3204 numerous times in the same DWA 605 instance removes the direct link of the contributor 610 requiring to be a signed-in user of the DWA 605. The efficiency of the data contribution effort is increased as the same contribution data 3204 does not need to be re-entered into the DWA 605 numerous times and in specific formats to be utilized in numerous and simultaneous ways in the digital workspace application 605. Room 4 contains a single DWA 605 instance, DWA7 2329, which is configured to map to DW ID# 2332, which contains one instance of CG ID1 2307, one instance of CG ID2 2308, one instance of CG ID3 2309, and two instances of CG ID4 2318. This illustration further outlines the flexible configurations that are allowed. If the DWA 605 has been configured in the CS 609 to map to a specific DW ID 2304 then the DWA 605 has access to all the CG 2302 objects and can reference those CG 2302 objects as many times as desired by the collaborators 616 simultaneously.

Figure 23E:
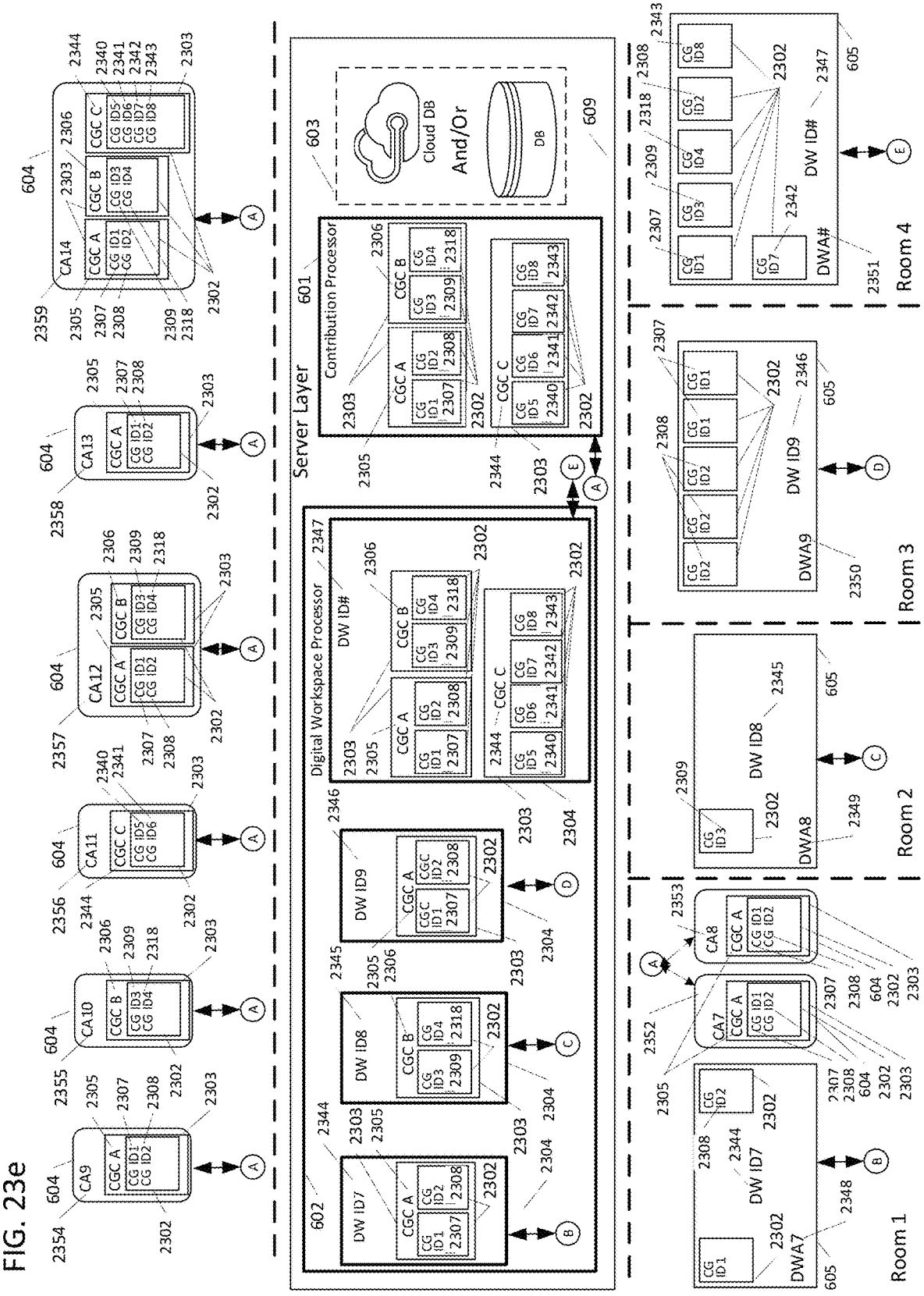

FIG. 23e illustrates how three CGC 2303 groups, CGC A 2305, CGC B 2306, and CGC C 2344 can be configured and used within the CS 609.

Six (6) CA 604 instances, CA9 2354, CA10 2355, CA11 2356, CA12 2357, CA13 2358, and CA14 2359 are not located in a specific room. As stated previously the CA 604 instances can be located anywhere a network connection is available to the CS 609. The CA9 2354 is configured to utilize CGC A 2305, which contains CG ID1 2307 and CG ID2 2308 objects. The CA10 2355 is configured to utilize CGC B 2306, which contains CG ID3 2309 and CG ID4 2318. The CA11 2356 is configured to utilize CGC C 2344, which contains CG ID5 2340 and CG ID6 2341. The CA12 2357 is configured to utilize CGC A 2305, which contains CG ID1 2307 and CG ID2 2308, and CGC B 2306, which contains CG ID 3 2309 and CG ID4 2318. The CA13 2358 is configured to utilize CGC A 2305, which contains CG ID1 2307 and CG ID2 2308. The CA14 2359 is configured to contain three CGC 2303 groups: CGC A 2305, CGC B 2306, and CGC C 2344. The CGC A 2305 contains CG ID 2307 and CG ID2 2308. The CGC B 2306 contains CG ID3 2309 and CG ID4 2318. The CGC C 2344 contains CG ID5 2340, CG ID6 2341, CG ID7 2342, and CG ID8 2343. The CA14 2359 has been configured to contribute to all CGC 2303 groups, allowing for maximum CD 3204 submission flexibility.

Note that, based on the particular CA 604 setting by the CS 609 linking/mapping rules 3001, certain CGC 2303 groups and CG 2302 objects are made available for use on the CA 604 by the contributor 610 accessing a particular CA 604 instance. The CS 609 CP 601 has been configured to contain three CGC 2303 groups: CGC A 2305, CGC B 2306, and CGC C 2344. The complexity of the CGC 2303 arrangements here is increasing, and the CS 609 is able to adapt accordingly. The CGC A 2305 is configured to contain CG ID 2307 and CG ID2 2308. The CGC B 2306 has been configured to contain CG ID3 2309 and CG ID4 2318. The CGC C 2344 has been configured to contain CG ID5 2340, CG IDG 2341, CG IDT 2342, and CG ID8 2343.

The DWP 602 is currently configured with four DW 2304 instances: DW IDT 2344, DW IDB 2345, DW ID9 2346, and DW ID# 2347. The DW IDT 2344 is configured to map to CGC A 2305, which contains CG ID1 2307 and CG ID2 2308. The DW IDB 2345 is configured to map to CGC B 2306, which contains CG ID3 2309 and CG ID4 2318. The DW ID9 2346 is configured to map to CGC A 2305, which contains CG ID1 2307 and CG ID2 2308. The DW ID# 2347 has been configured to map to all CGC 2303 groups. The CGC A 2305 contains CG ID 2307 and CG ID2 2308. The CGC B 2306 contains CG ID3 2309 and CG ID4 2318. The CGC C 2344 contains CG ID5 2340, CG ID6 2341, CG ID7 2342, and CG ID8 2343.

Room 1 contains a single DWA 605 instance, DWA7 2348, which is configured to connect to DW ID7 2344. The CG ID1 2307 and CG ID2 2308 are being accessed in DWA7 2348. Two CA 604 instances, CA7 2352 and CA8 2353, are also in Room 1. Both CA7 2352 and CA8 2353 are configured to map to CGC A 2305, which contains CG ID 1 2307 and CG ID 2 2308. During the collaboration session, two contributors 610 are able to submit CD 3204 to the DWA7 2348 session. As previously noted, the CA 605 instances communicate to the CP 601 and do not submit data directly to the DWA 605. Contributors 610 in Room 1 can contribute CD 3204 in their session and also have their CD 3204 available in other sessions and digital workspace applications 605 as illustrated in Room 3 and Room which is a distinct improvement over the current art.

Room 2 contains a single DWA 605 instance, DWA8 2340, which maps to DW 2304 ID8 2345. The CG ID3 2309 is utilized in this session at this time. Room 3 contains a single DWA 605 instance, DWA9 2350, which maps to DW 2304 ID9 2346. Three instances of CG ID2 2308 are being utilized and two instances of CG ID1 2307 are being utilized. Note that contributors 610 in Room 1 through CA7 2352 and CA8 2353 are able to contribute content to DWA9 2350 even though they are not directly in the room and on a different DWA 605 instance. This ability to contribute and map CD 3204 is currently not available in collaboration systems today, especially across unique digital workspace applications 605 of different types. Room 4 contains a single DWA 605 session, DWA# 2351, which maps to DW ID# 2347. The DWA# 2351 has been configured to utilize CG ID 2307, CG ID3 2309, CG ID4 2318, CG ID2 2308, CG ID8

2343, and CG ID7 2342. Numerous contributors 610 have been able to contribute CD 3204 across a plurality of DWAs 605.

Figure 23F:
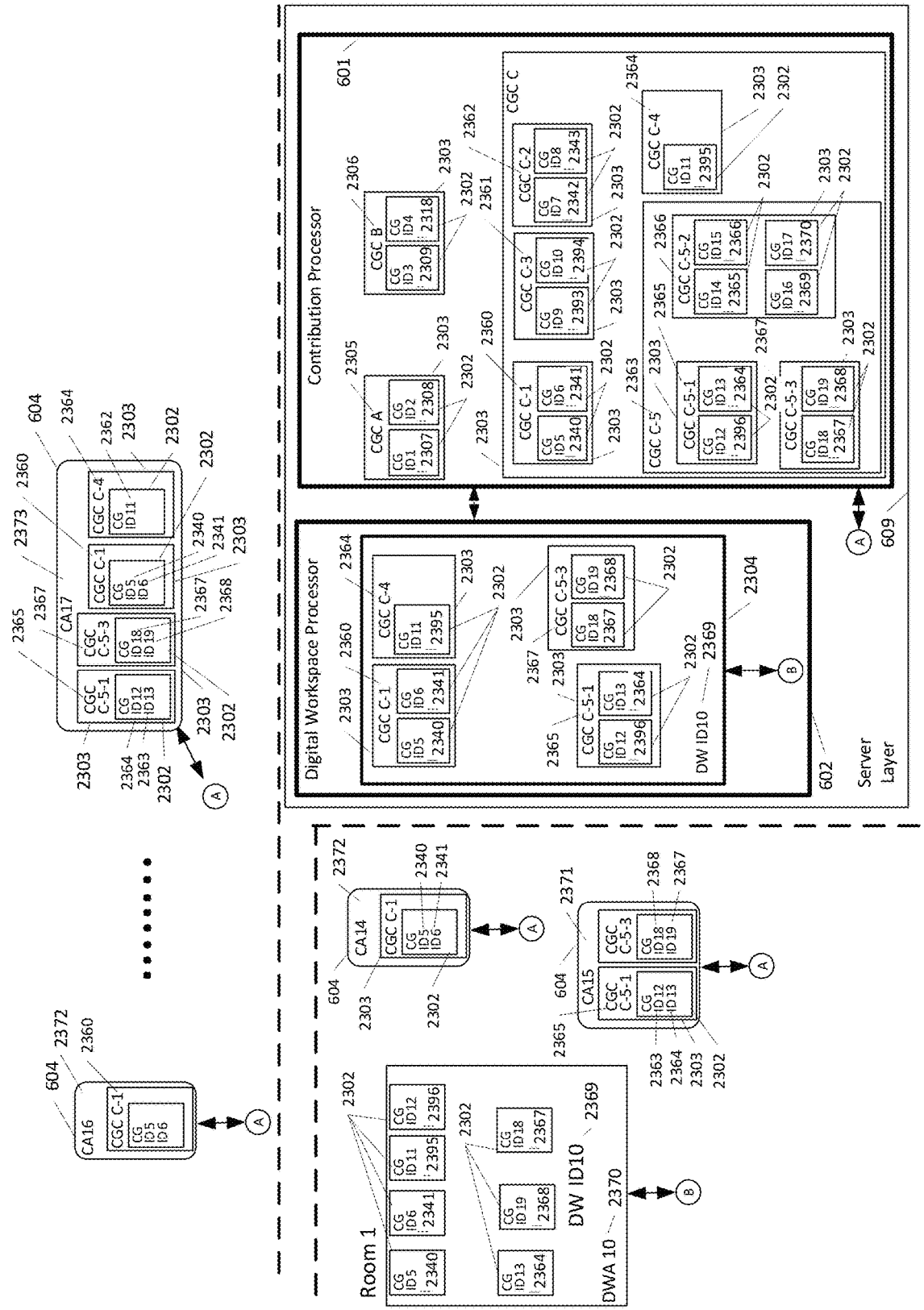

FIG. 23f shows how CGC 2303 can be nested structures nested into each other, creating the ability to setup complex groupings. Each CGC 2303 is able to maintain its own set of contribution rules 3001, configuration, and setup. The contribution processor 601 has been configured to contain numerous CGC 2303.

The CGC A 2305 is not nested. The CGC B 2306 is not nested. The CGC C 2368 contains nested CGC 2303 groupings. The CGC C 2368 contains CGC C-1 2360, CGC C-3 2361, CGC C-2 2362, CGC C-4 2364, and another nested CGC 2303 CGC-5 2363. The CGC C-1 contains CG ID5 2340 and CG ID6 2341. The CGC C-3 2361 contains CG ID9 2393 and CG ID10 2394. The CGC C-2 contains CG ID7 2342 and CG ID8 2343. The CGC C-4 2364 contains CG ID11 2395. The CGC C-5 2363 contains three nested CGC 2303 groups, CGC C-5-1 2365, CGC C-5-2 2366, and C-5-3 2367. The CGC C-5-1 2365 contains CG ID12 2396 and CG ID 13 2364. The CGC C-5-2 2366 contains CG ID14 2365, CG ID15 2366 CG ID16 2369, and CG ID17 2370. The CGC C-5-3 contains CG ID18 2367 and CG ID19 2368. It is within the scope of the disclosure to handle any level of nested CGC 2303 grouping structures. The nesting capability of CGC 2303 allows for complex organizations of CD 3204 that are not currently considered in the current art for anonymous contributors 610.

The DWP 602 is shown mapped to a small subset of the CGC 2303 group set for simplicity only. Any CGC 2303 is available to be mapped-to directly, as long as the collaborator 616 has privilege and access rights. There is no need to bring the whole nested CGC 2303 group over to the DW 602 instance 2304 to have access to a deeply nested CGC 2303. The DW ID10 2394 illustrates this functionality to map to any nested CGC 2303 group directly. The DW ID 10 2394 has been configured to map to CGC C-1 2360, CGC C-4 2364, CGC C-5-1 2365, and CGC C-5-3 2367.

The CA 604 instances CA16 2372, CA17 2373, CA15 2371, and CA14 2372 can also be configured to map directly to a specific CGC 2303. For example, CA16 2372 is mapped to CGC C-1 2360. The CA17 is mapped to CGC C-5-1 2385, CGC C-5-3 2367, CGC C-1 2360, and CGC C-4 2364. In Room 1, CA14 2372 is configured to be mapped to CGC C-1, and CA15 2371 is configured to be mapped to CGC C-5-1 2365 and CGC C-5-3 2367. The DWA 605 instance DWA10 2370, for completeness, is configured to map to DW ID10 2394. The DWA10 2369 is configured to display CG IDS 2340, CG ID6 2341, CG ID11 2395, CG ID 12 2396, CG ID13 2364, CG ID19 2368, and CG ID 18 2367.

Figure 23G:
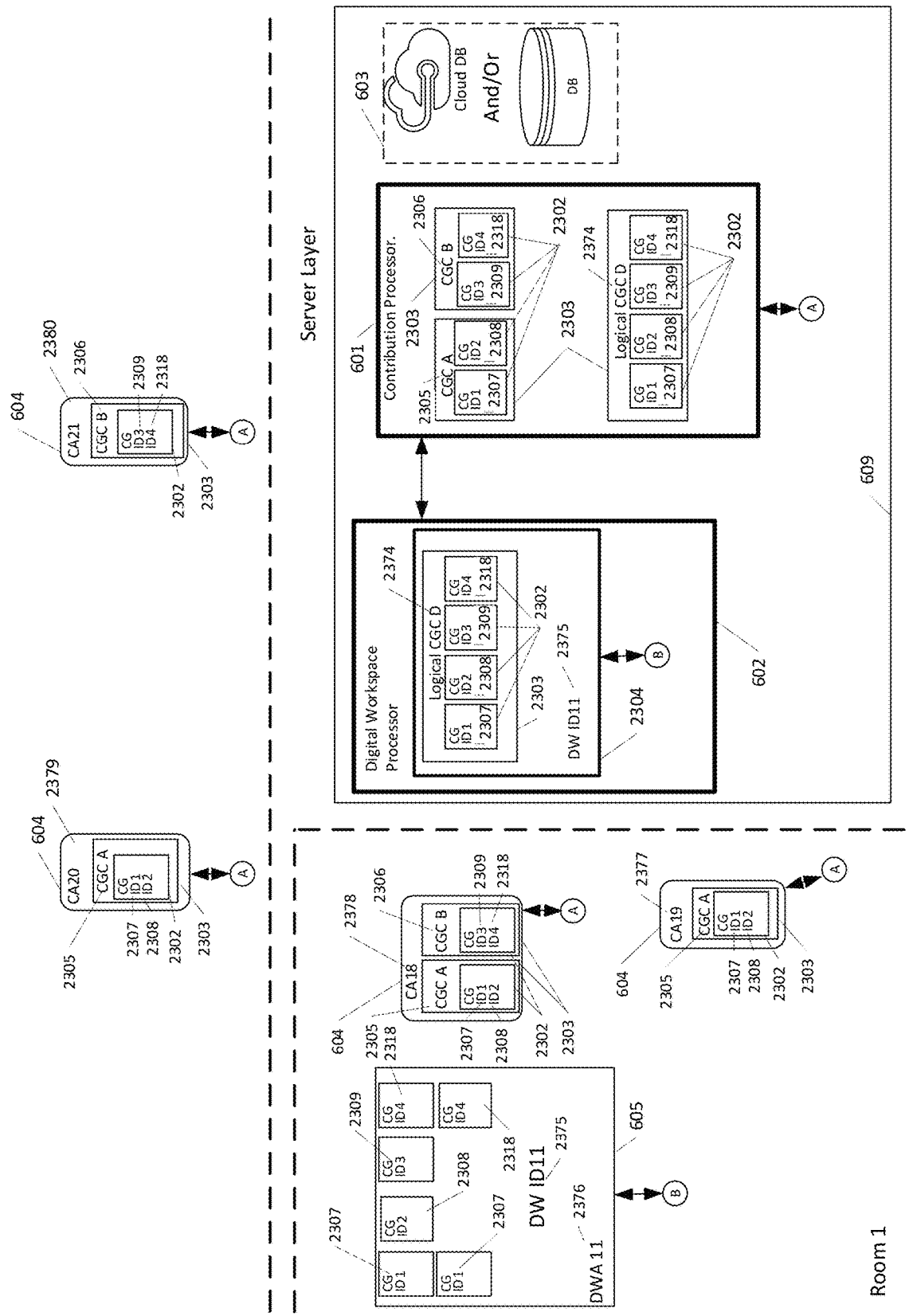

FIG. 23g further elaborates on the CGC 2303 configurations possible in the CP 601 mappings and settings. A logical CGC 2303 structure can be created. A logical CGC 2303 structure is a CGC 2303 that is not directly accessed by the CA 604 instances. The logical CGC 2303 is linked and populated in the CP 601. For example, CGC D 2374 is a logical CGC 2303 group. The CGC D 2374 has been configured to contain CG ID1 2307, CG ID2 2308, CG ID3 2309, and CG ID4 2318. The CG 2302 references, CG ID 2307, CG ID2 2308, CG ID3 2309, and CG ID4 2318 are populated within the CGC A 2305 and CGC B 2306 groups. By creating a logical grouping CGC D 2374, the collaborator 616 is able to create a grouping structure that collects all of the CD 3204 that they want to collect. This allows for a single CGC 2303 to be mapped to the DWP 602 and simplifies the process of mapping and sharing complex CGC 2303 and CG 2302 objects.

The DW instance 2304 DW ID11 2375 can be mapped to CGC D 2374 only, allowing a simplified setup and configuration. The configuration and setup of DWA 605 in Room 1 DWA11 2376 is also simplified. Through the mapping to DW ID11 2375, the DWA 605 has access to the logical group CGC D 2374. As such, the CG ID1 2307, CG ID2 2308, CG ID3 2309, and CG ID4 2318 are available to be used. It should be noted that the CA 604, CA20 2379, CA21 2380, CA18 2378, and CA19 2377 are all contributing and mapped to CGC A 2305 and CGC B 2306, respectively. They are not contributing directly to CGC D 2374.

FIG. 23h is an example of how different device 607 modality types can be mapped to the CGC 2303 and CG 2302 objects. It should be noted that the CG 2302 objects are able to handle numerous multimedia data structures and thus devices 607 of different types can contribute to the same CGC 2303 and CG 2302 objects.

The CA22 is running on a smart phone device 607, and is linked to CGC A 2305 and is contributing CD 3204 to CG ID1 2307. The CA23 2387 is running on a tablet type device 607, and is linked to CGC A 2305 and is able to contribute to CG ID1 2307 and CG ID2 2308. The CA24 2388 is running on a smart camera enabled device 607, and is linked to CGC A 2305 and is contributing CD 3204 to CG ID2 2308. The CA25 2389 is running on a voice enabled device 607, and is linked to CGC A 2305 and is contributing CD 3204 to CG ID 2307 and CG ID2 2308. The CA26 2390 is running on a plurality of IOT devices 607 which may include, but are not limited to, GPS devices, sensors, IOT hubs, and/or transportation devices. These devices are set up to contribute CD 3204 to CGC A ID1 2307 and CGC ID2 2308. The CA27 2391 is running on a computer laptop device 607, which is linked to CGC A 2305 and is contributing to CG ID 2307 and CG ID2 2308.

As long as the CA 604 can be installed and executed on a device 607 through a GUI or API interface, the device 607 is able to contribute CD 3204 to a CGC 2303. This enables tremendous flexibility and power that extends well beyond typical collaboration systems in the current art including even SCADA (System Acquisition And Control Data Acquisition) systems which have a very structured implementation and data sharing models that typically need to be assigned a specific ID within the system, which means that they cannot be anonymous and ad-hoc contributors 610 of CD 3204.

The CP 601 and DWP 602 configurations are simplified for illustration only. Both are configured to utilize CGC A 2305. DW ID12 2381 is mapped to CGC A 2305. The sharing end point examples are examples of how the digital workspace applications 605 can be unique and do not need to be self-contained to their own data set. Being able to access the CS API 2396 or the DW 2304 to directly access to the CD 3204 is allowed and abstracted from the specific DWA 605 instance.

Dashboard/BI application 2382 represents any typical application that displays data from a database. The Business Intelligence (BI) application 2382 can access, through the CS API 2396, the DW ID12 2381 instance. Utilizing the DW ID12 instance, access to CG ID1 2307 and CG ID2 2308 are enabled. Any data submitted to those two CG 2302 objects will be automatically displayed via the dashboard/BI application 2382.

The collaboration application 2383 is a typical use of user contribution data 3204. The collaboration application 2383 is linked to the same DW ID12 2381 instance and has access to the same CD 3204 data set. The difference in that, in a collaboration application 2383, the collaborators 616 can manipulate, modify, group, sort, and delete the data from their DWA 605 as they desire.

Data Object 2384 is a use case where the DW ID12 2381 is accessed directly as a data object within embedded code. By directly accessing the data object 2384, the code/software has direct access to the CGC A 2305 group objects.

The API App 2385 is a scenario where the CS API 2396 is used generically in any application such as a windows program, such as Excel, Word, Power point, or in other web-based document programs, such as Google docs, to access the CGC A 2305 dataset. Typical of this type application is that the applications do not lend themselves to ad-hoc data and anonymous contributor scenarios, however by utilizing the CS API 2396, even these applications can take advantage of CD 3204 submissions if it is required. The database (DB) and or third party 2386 is illustrated using the CS API to obtain CD 3204 to populate a third-party DB 2381.

With reference to FIGS. 24*a*, 24*b*, 24*c*, 24*d*, 24*e*, 24*f*, 24*g* and 24*h*, shown are diagrammatic illustrations of a plurality of connection modalities to support access, data flow, and object mappings of the contribution group collections 2303 and the contribution groups 2302, to the contribution application 604 and contribution processor 601. When the CA 604 is launched through a quick access method, having access to the link is authorization as being able to contribute to the contribution session. The contribution session, as to whether the link is active or not, is determined by the collaborator 616. If a link is no longer active or valid, then the CA 604 will not launch.

FIG. 24*a* outlines how a contributor 610 would join a CA 604 session utilizing QR code 2407. By scanning the QR code 2407, using a QR code scanner that is built into most smart phone devices, the device 607 is connected to a weblink that contains the CA 604 linking information 2401. The CA 604 configured with QR code 2407 is setup to establish a user interface that is designed to submit content to CGC A 2305 and CGC B 2306. The user interface screen specifically links in this example a video submission field 2408 to CG ID1 2307, a PDF submission field 2409 to CG ID2 2308, a text submission field 2410 to CG ID3 2309, and a sketch submission field 2411 to CG ID4 2318. The intent of this diagram is not to show an actual user interface implementation, but to show how different input fields 2408, 2409, 2410, and 2411 can be preferably mapped to CGC 2303 groups and CG 2302 objects.

FIG. 24*b* further illustrates the scanning of two different QR codes 2402 with different CD 3204 field mappings. It should be noted that, although two are shown, any number of configured QR codes 2405 and 2406 are possible, allowing for a large variety of CA 604 configurations and CD 3204 data field mappings. If QR code Group 3 2405 is scanned, then a mapping is configured to CGC A 2305 by the CA 604. If QR code Group 4 2406 is scanned, then another set of CGC 2303 mappings are configured, comprising CGC B 2306 and CGC C 2306. On the user interface screen of the CA 604, if the QR code 2405 is scanned, the video field1 2412 is mapped to CG ID1 2307. The GPS field2 2413 is mapped to ID2 2308. If QR code 2406 is scanned, then the voting3 field 2414 is mapped to CG ID3 2309, Audio field 2421 is mapped to CG ID4 2318, data entry field5 2415 is mapped to CG ID5 2340, and Data field6 2416 is mapped to CG ID6 2341.

Figure 24C:
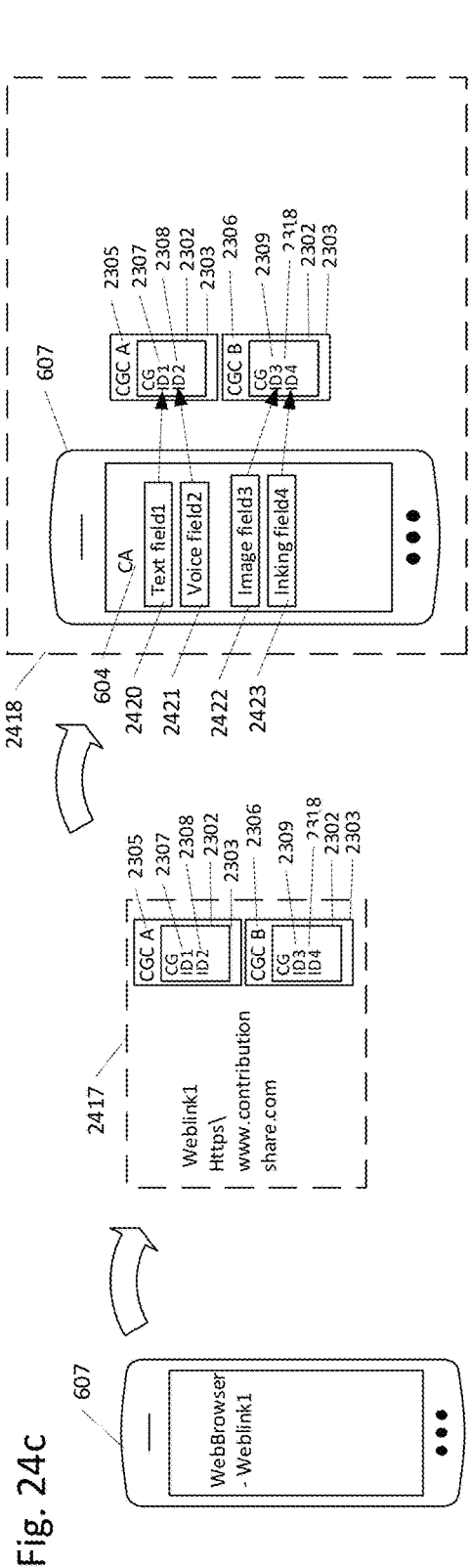
Figure 24D:
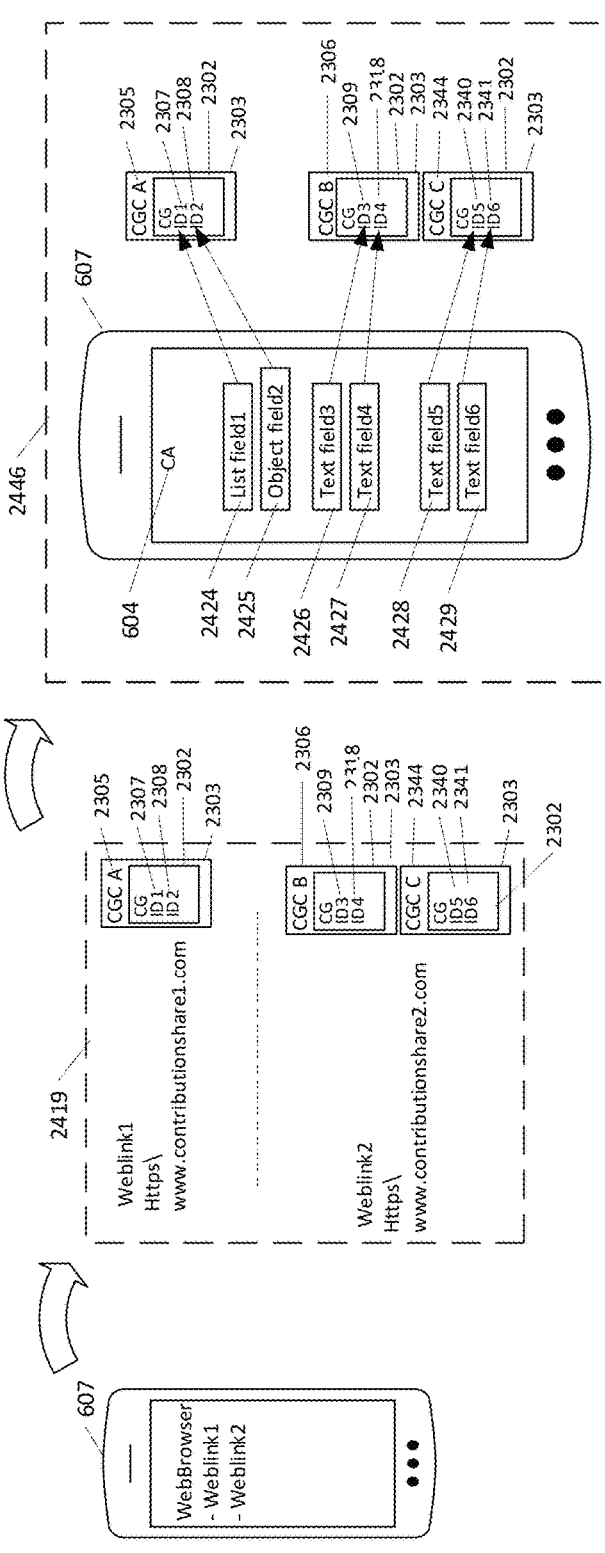

FIGS. 24*c* and 24*d* illustrate the same basic scenario, but instead of scanning a QR code, weblinks 2417, 2419 are entered directly into a web browser. The CA 604 is launched, and the following field mappings are configured. For weblink 2417, CGC A 2305 and CGC B 2306 are mapped. The CA 604 in this mapping scenario 2418 is mapped as follows: test field1 2420 is mapped to CG ID1 2307; voice field2 2421 is mapped to CG ID2 2308; image field 2422 is mapped to CG ID3 2309; and an inking field 2423 is mapped to CG ID4 2318.

In weblink scenario 2419, weblink1 and weblink2 are active. If the contributor 610 launches two tabs in a web browser or two separate web browser applications, both links 2419 are able to be activated and populated. Weblink1 is configured to CGCA 2305 and Weblink2 is configured to CGC B 2306 and CGC C 2344. The data field mappings 2446 are as follows: list field1 2424 is mapped to CG ID3 2309; object field2 2425 is mapped to CG ID2 2308; text field3 2426 is mapped to CG ID3 2309; test field4 2427 is mapped to CG ID4 2318; text field5 2428 is mapped to 2340; and text field6 2429 is mapped to CG ID6 2341. The CG 2302 mappings are illustrative of how, through a weblink configuration, numerous CD 3204 mappings to CGC 2303 groups and CG 2302 objects are possible.

Figure 24E:
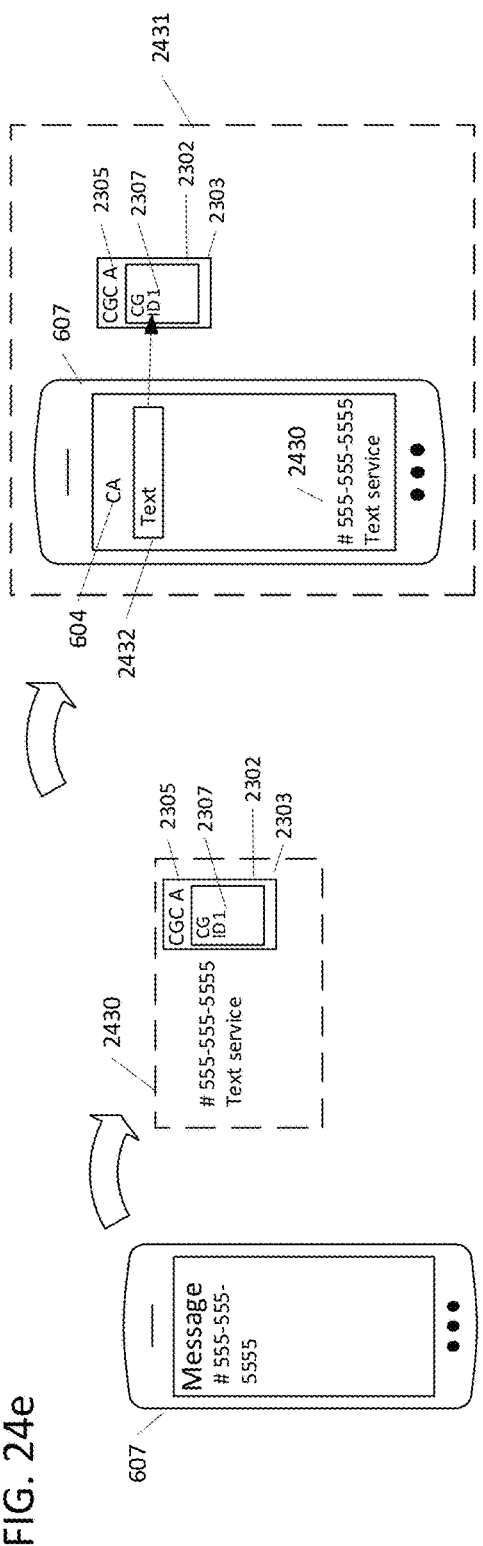
Figure 24F:
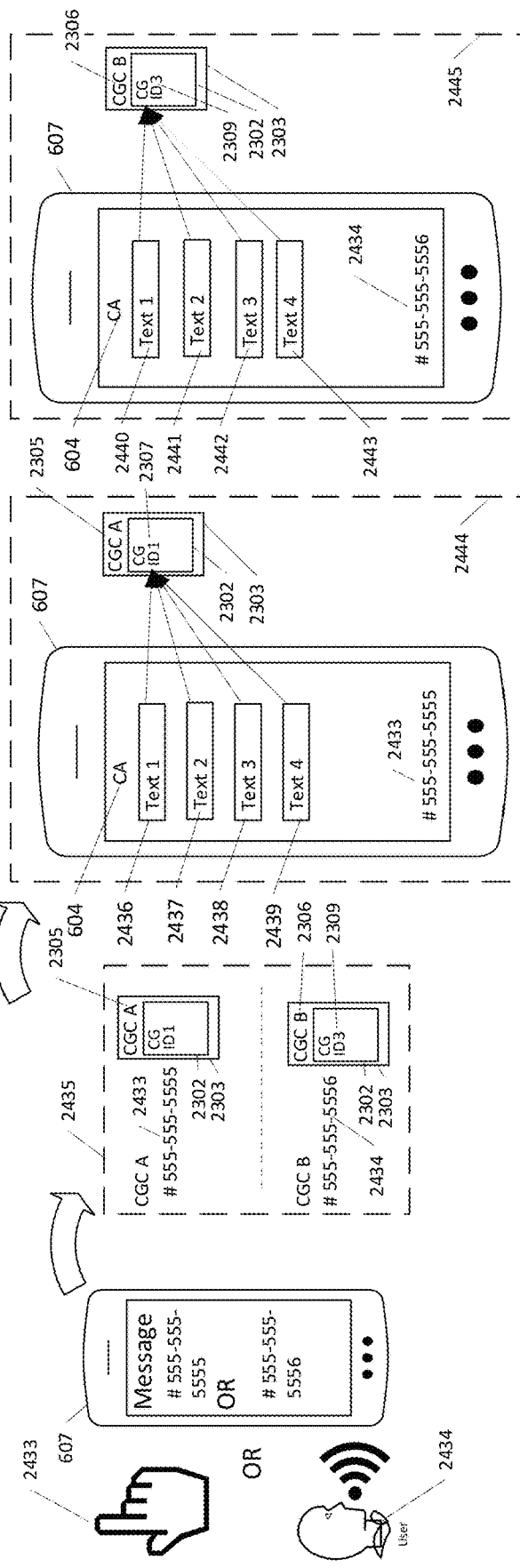

FIGS. 24*e* and 24*f* illustrate how a text messaging service can be mapped to a phone number 2430 and then map the text data sent from that phone number 2430 to a CGC 2303 and specific CG 2302 instance. This would preferably be accomplished by utilizing the CS API 2396 and integrating it into the text messaging engine. For example, text service "555-555-5555" 2430 is mapped to CGC A 2305 and CG ID1 2307. When a contributor 610 sends a text message to "555-555-5555" 2430, the single text message 2432 is submitted to CG ID1 2307.

FIG. 24*f* illustrates the contributor 610 either typing a phone number 2433 "555-555-555" mapped to CGC A 2305, or a making a voice call 2434 to a separate number "555-555-5556" mapped to CGC B 2306. In the text message scenario 2433, text messages 2436, 2437, 2438, and 2439 are sent and submitted to CG ID1 2307 in order, sequentially. In the second voice text scenario 2434, the text files 2440, 2441, 2442, and 2443 are submitted to CG ID3 2309.

FIGS. 24*g* and 24*h* show how smart sensors and IOT devices interacting with the CS API 2396 can connect to the CS 609. FIG. 24*g* illustrates two devices 607, a Smart sensor 2452 and an IOT device 2453, which are mapped to CGC A 2305 using Access_Code_A 2448. Smart sensor 2450 is mapped to CG ID1 2307 and CG ID2 2308, and the IOT device 2451 is mapped to CG ID2 2308. FIG. 24*h* illustrates using multiple sensors 2454 and two access codes 2455 to map to two CGC 2303 groups. Senor 2452 is mapped to Access_Code_A, which links to CGC A 2305. Sensor 2453 is mapped to Access_Code_B, which links to both CGC A 2305 and CGC B 2306. Sensor 2452 sends its CD 3204 to CG ID1 2307. Sensor IOT Device 2453 maps to CG ID2 2308 and CG ID3 2309. The CGC 2303 grouping architecture allows for complex and flexible CG 2302 mappings. The device ID is not important. Meaning the device 607 can stay anonymous. A single device 607 can contribute to multiple CG 2302 objects at the same time. Note that the data contributed as CD 3204 could be more than one measurement or data point type as certain smart sensors collect more than one type of measurement or data points.

With reference to FIG. 25*a*, shown is a Level 0 diagram of the components required in a contribution session and the general relationships between them. In a component diagram, general relationships are represented by lines with no arrowheads. Contributors 610 can use a CA 604 to send contributions 3301 to a CP 601. The CP 601 then processes and shares the contribution objects with a DWP 602, which then processes and shares the contribution objects with a DWA 605, which then maps the contribution objects to DW objects. Collaborators 616 can view or manipulate the DW objects within the DWA 605.

Figure 25B:
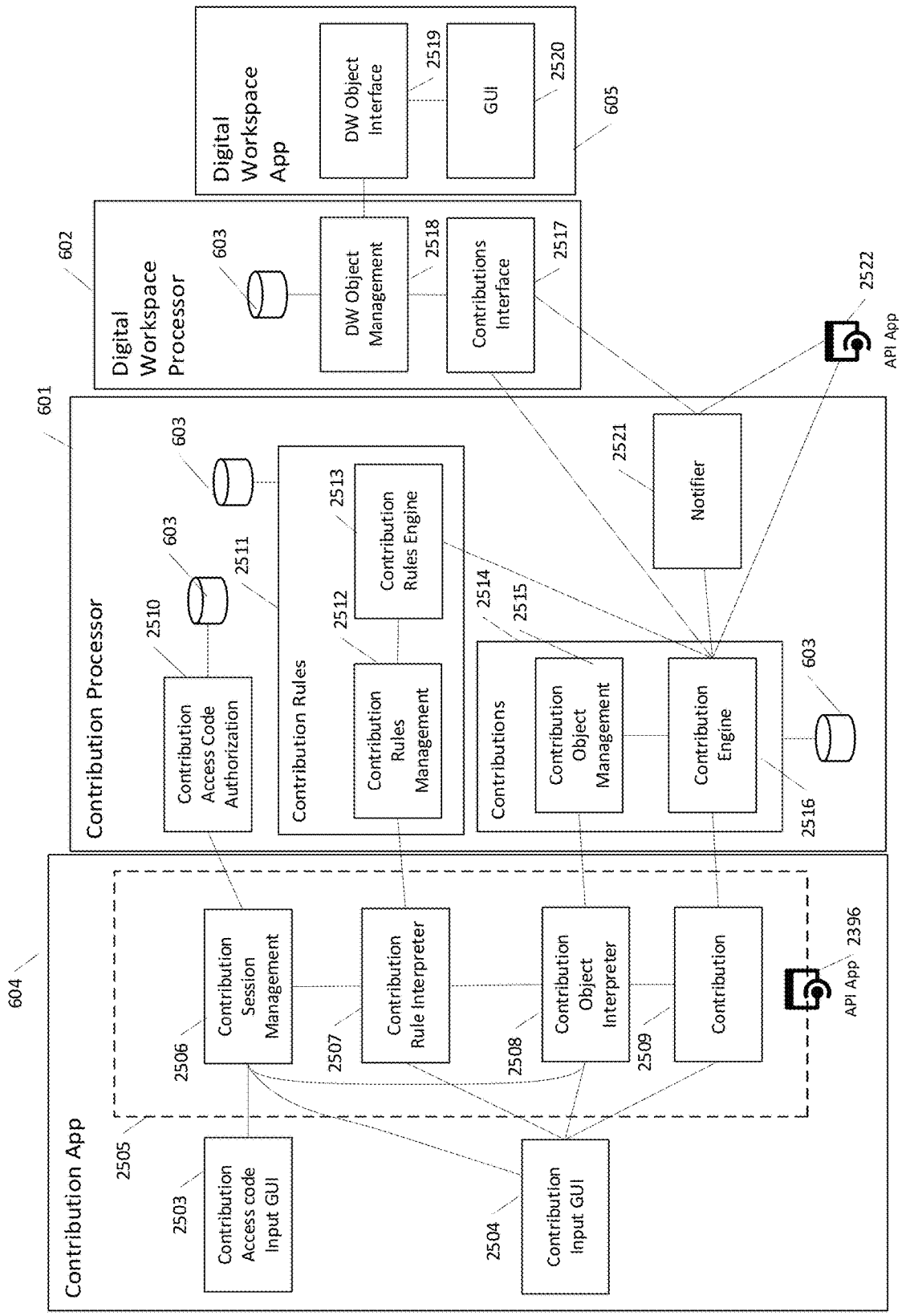

With reference to FIG. 25*b*, shown is a Level 1 diagram of the components and subcomponents required in a contribution session. The connectors between the components indicate general relationships, as represented by lines with no arrowheads. The CA 604 is where the CD 3204 is generated. The CA 604 may contain a GUI that the contributor 610 can interact with, but a GUI is not necessary if the CA 604 acts as an API 2396, which may contain the subcomponents demarked by the dotted line. If a GUI is present, the contribution access code input GUI 2503 is desired so that the user can input a valid CAC 3201 and connect to a contribution session. To validate the CAC 3201, the contribution access code (CAC) 3201 is passed into the contribution session management subcomponent 2506 that will communicate with the contribution processor 601, specifically with the contribution access code authorization subcomponent 2510. The contribution access code authorization subcomponent 2510 receives CACs 3201 and validates them against the stored CACs 3201. For valid CACs 3201, a contribution session object is returned back to the CA 604. The contribution session object will contain a contribution access token which will then be used by the CA 604 to submit contributions 3301.

If the CA 604 is prepared to dynamically interpret contribution rules 3001 such that the contribution input GUI 2504 is generated based on the contribution rules 3001, the contribution rules 3001 are also requested if they are not already built into the CA 604 or sent as part of the contribution session object. The contribution rules 3001 may be used by the contribution rule interpreter subcomponent 2507 to generate a GUI, but this step may not be necessary if the CA 604 has already received the data structures as part of the contribution session object, or if the contribution rules 3001 are built into the CA 604. The contribution data structures may also be requested from the CP 601, or they may be built into the CA 604. The contribution data structures may also be used to dynamically generate the contribution input GUI 2504, but this step may not be necessary if the CA 604 already has the contribution data structures built in. The contribution input GUI 2504 then accepts CD 3204 which is then mapped to a contribution data structure in the contribution object interpreter component 2508, where some of the contribution rules 3001 may or may not be applied to the contribution objects before they are submitted to the CP 601 through contribution 2509.

When the CP 601 retrieves a contribution 3301, the contribution 3301 is handled by the contribution engine 2516 component. The contribution engine 2516 component maps the received contribution objects to the expected contribution data structures and then utilizes the contribution rules engine 2513 to evaluate the contribution rules 3001 on the contribution objects. The rules 3001 are stored in the contribution rules management component 2512, which are then utilized by the contribution rules engine 2513 when executing the contribution rules 3001 on the contribution objects in the contribution rules processor 2511. Once the rules 3001 have been applied to the contribution objects, if the contribution 3301 is successful, the contribution object management component 2515 stores the transformed and validated contribution objects. The contribution engine 2516 employs the notifier component 2521 to send updated contribution objects to any linked DW 2304 or other API apps 2522 that subscribe to the contribution session.

The DWP 602 manages and stores DW objects and may or may not be co-located with the DWA 602. The contributions interface subcomponent 2517 inside the DWP 602 receives updated contribution objects from a connected CP 601, maps the contribution objects to DW objects inside the DW 2403, and stores the DW objects within the DW Object Management component 2518. The contributions interface component 2517 is also responsible for requesting contribution objects from any linked contribution sessions. Once the contribution objects have been mapped to DW objects and saved by the DWP 602, the DWA 605 contains a DW object interface 2519 to retrieve the DW objects and interpret them for display on a GUI 2520. There may also be API apps 2522 that request or subscribe to contribution objects from the CP 601.

Figure 26:
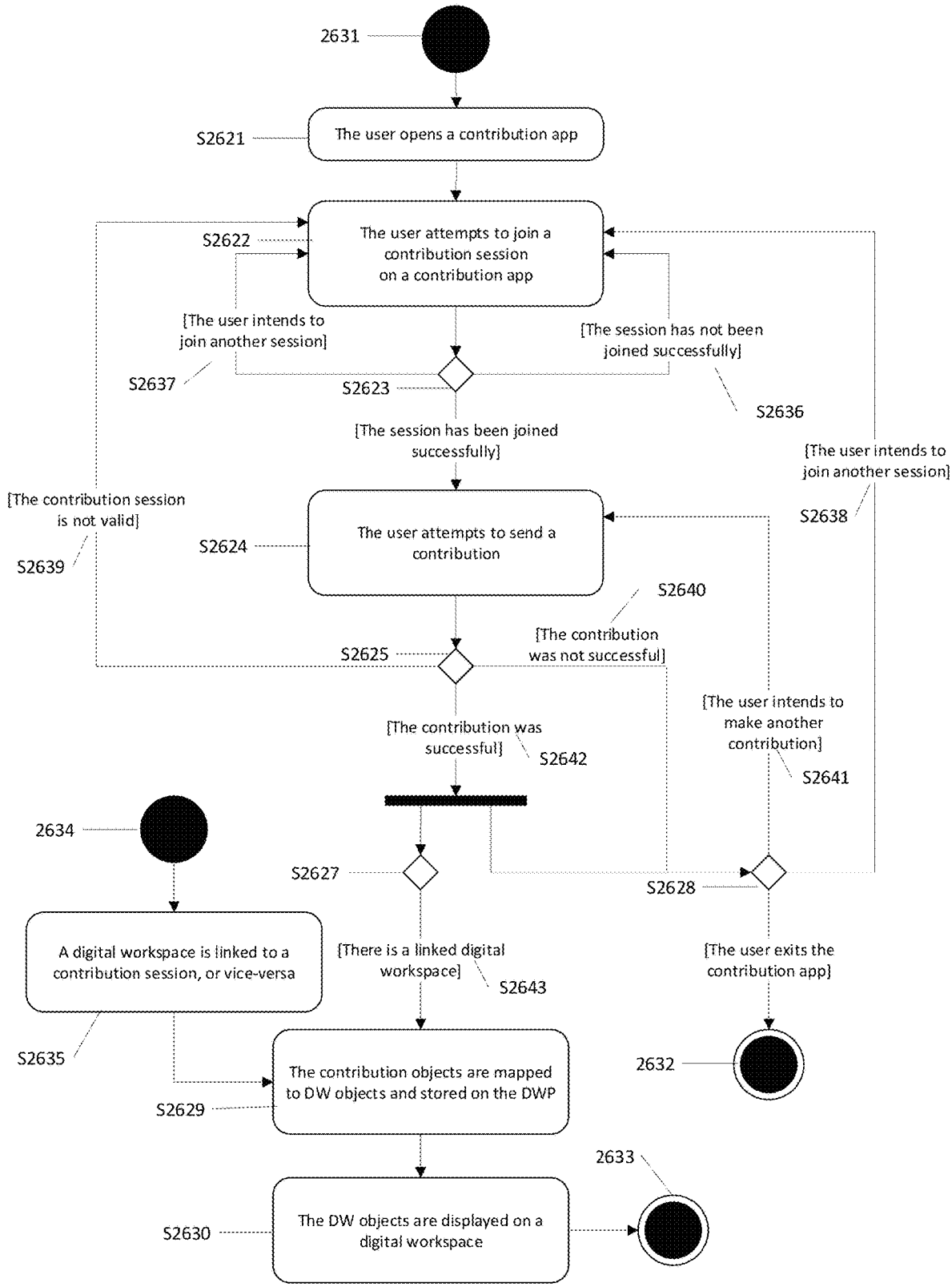
FIG. 26 is an implementation-preferred embodiment logic flow diagram of the preferred contribution system.

With reference to FIG. 26, illustrated is a high-level activity diagram that may occur in a contribution system. There are two starting points illustrated: one starting point is where a contributor 610 opens S2621 a CA 604, and the other starting point is the linkage S2635 of a contribution session with a DW instance 2304. The two starting points can occur independently of each other, or not. When considering the starting point 2631 of a contributor 610 opening S2621 a CA 604 and then attempting to join S2622 a contribution session, the most basic case is that the contributor 610 successfully joins a contribution session and then successfully sends S2642 a contribution 3301. However, other flows may occur depending on the intention of the contributor 610 or based on the results of the contributor's 610 actions.

In some cases, FIG. 26 shows that the contributor 610 may want to join more than one S2637, S2638 contribution session. There is no logical limit to the number of simultaneous contribution sessions that any contributor 610 may join, except for any limitations specified by the business logic that developers have included in the CA 604. A contributor 610 may also need to join another contribution session in the case that a previous contribution session has expired S2639. Another contribution session may be joined S2637 immediately after other sessions have been joined, following the failure S2638 of a contribution 3301, or when a contribution 3301 has succeeded S2638. Additionally, there are no limits to the number of contributions 3301 that a contributor 610 may submit, except for any limits specified by any applicable contribution rules 3001.

If there is a DW 2304 linked to a contribution session, then any successful contributions 3301 submitted to that contribution session are also forwarded to the DWP 602 so that the contribution objects can be saved S2629 in the DWP 602 DB 603. The contribution objects may also be mapped in terms of DW objects so that they can be displayed S2630 on a DWA 605. Any manipulations made to the DW objects in the DW 2304 are not reflected in the contribution objects stored in the CP 601. Whenever a DW instance 2304 is initially linked S2635 to a contribution session, the existing contribution objects of the contribution session are sent from the CP 601 to the DWP 602.

With reference to FIGS. 27*a*, 27*b*, and 27*c*, shown are the high-level steps and components involved in joining a contribution session. The first step S2701 shown in FIG. 27*a* of joining a contribution session is that the contributor 610 must provide S2702 some identifier of the contribution session to the CA 604, known as a CAC 3201. The form of a CAC 3201 may comprise words, numbers, letters, and/or symbols, and may be of any reasonable length that would be expected of an identifier. The CAC 3201 should be transmittable to the CP 601 for validation. If the contributor 610 is an automated process, then the CAC 3201 should still be specified by a human user at some point before the automated process joins the contribution session.

In order for the CP 601 to validate a CAC 3201, an active contribution session should be referenced by the CAC 3021. There is no prescribed method for how to create an active contribution session, as a collaborator/facilitator 616 can create a contribution session by doing anything from using a dashboard to directly modifying the DB 603 on the CP 601. If the CAC 3201 is authorized by the CP 601, as depicted in FIG. 27*b*, then a contribution session object is returned S2704 to the CA 604 that has requested to connect to the contribution session, where the contribution session object contains a contribution access token. The contributor 610 is then notified S2703 that contributions 3301 can then be submitted.

If the CAC 3201 is deemed invalid by the CP 601, as depicted in FIG. 27*c*, then an authorization error message is returned S2706 to the CA 604. The CA 604 may handle the authorization error message in a multitude of ways; for example, the CA 604 may simply close, it may trigger GUI changes to inform the contributor 610 of the failure, or it may relay the authorization error message to another application. The preferred approach, based on the user experience principle of providing feedback to users, would be to notify S2705 the contributor 610 that authorization has failed and then prompt the contributor 610 to re-enter a CAC 3201.

Although a contributor 610 is preferred to be anonymously authorized into a contribution session, the identity of the contributor 610 may also be authenticated prior to authorization by some standard authentication service, if instead the facilitator/collaborator 616 of the contribution session prefers contributors 610 to be authenticated.

Figure 28:
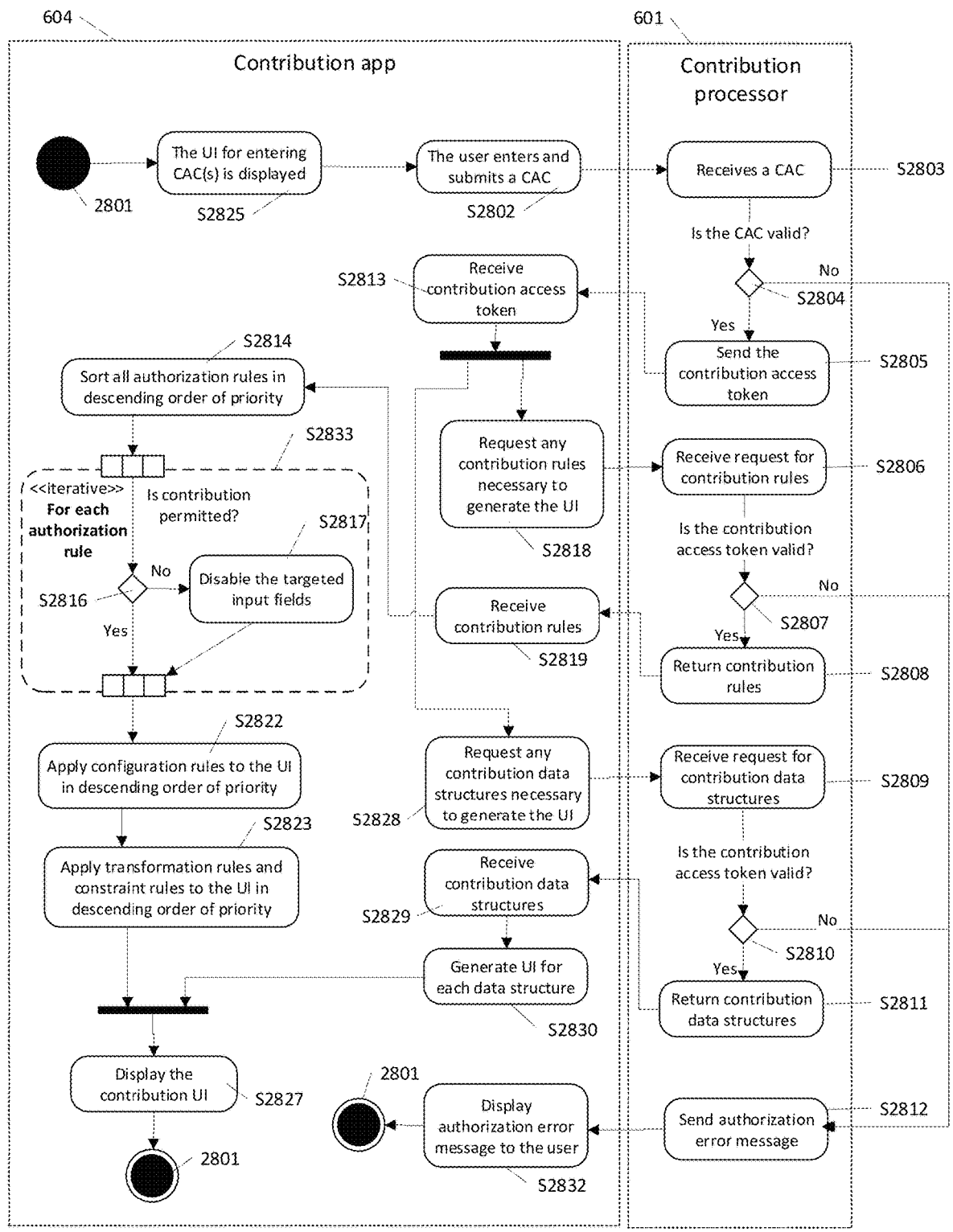
FIG. 28 is a logic flow diagram of the preferred contribution application authorization process.

With reference to FIG. 28, shown is an activity diagram of the activities that occur within the CA 604 and CP 601 when a contributor 610 attempts to join a contribution session. When a contributor 610 attempts to join a contribution session using a CA 604, the first view presented S2825 to the contributor 610 comprises an input for one or more CAC 3201. In order for the CA 604 to have the permission to submit contributions 3301 to a contribution session, the CAC 3201 must first be authorized by the CP 601 and exchanged for a contribution access token, as shown in steps S2802, S2803, S2804, S2805, and S2813. If the CAC 3201 is not valid, then the CP 601 notifies S2831 the CA 604 of the failure, and then the CA 604 will preferably provide feedback S2832 to the contributor 610.

After the contribution access token is received by the CA 604, the CA 604 should present S2827 the contributor 610 a contribution input GUI 2504 for submitting contributions 3301 to the contribution session through an interactive display device 2801. In some implementations, it may be possible for the CA 604 to dynamically generate a contribution input GUI 2504. The benefit of dynamically generating the contribution input GUI 2504 is that the CA 604 can flexibly respond to changes to contribution data 3204 structures or contribution rules 3001, although the CA 604 would have to be designed to interpret and react to this information. There is also the possibility that a CA 604 may already have the contribution data 3204 structures or contribution rules 3001 built into the CA 604, in which case the contribution data 3204 structures or contribution rules 3001 would not need to be retrieved from the CP 601. A benefit of applying the contribution rules 3001 to the CA 604 is that contributor 610 inputted data can be validated in real-time before it is submitted to the CP 601, which would improve the user experience of the CA 604 by providing quick feedback. At the very least, the CA 604 must contain the IDs of the contribution data 3204 structures, so that it can direct data into the correct contribution objects.

The activities in FIG. 28 show a possible flow for how a CA 604 may request and retrieve any contribution data 3204 structures or contribution rules 3001 it requires from the CP 601 to generate the contribution input GUI 2504. Since the contribution rules 3001 and contribution data 3204 structures may contain sensitive meta-data related to the contribution session, the contribution rules 3001 and contribution data 3204 structures should be retrieved after the CAC 3201 has been validated in order to protect the privacy of the contribution session. FIG. 28 shows that the contribution rules 3001 and contribution data 3204 structures may be retrieved from the CP 601 with a valid contribution access token. Although the receipt S2813 of the contribution rules 3001 and contribution data 3204 structures is shown as part of joining a session, they can also be requested at any time during the contribution session to ensure that the contribution rules 3001 and contribution data 3204 structures are up to date. The contribution data 3204 structures and contribution rules 3001 may also be retrieved along with the contribution access token in step S2813, as part of a contribution session object. If the contribution data 3204 structures and contribution rules 3001 were returned with the CAC 3201, then steps S2808 and S2811 would be combined with S2805, steps S2813 and S2829 would be combined with step S2813, and there would be no need for steps S2818, S2828, S2806, S2807, S2808, S2809, S2810, and S2811.

If the contribution access token is not valid at decision points S2807 or S2810, then an authorization error message is sent to the CA 604 in step S2831. Preferably, the CA 604 would then display S2832 through an interactive display device 2801 an authorization error message to the contributor 610 to ensure a favorable user experience, however, this may not be necessary.

If the CA 604 is designed to interpret the contribution data 3204 structures to generate the contribution input GUI 2504, then the contribution data 3204 structures will be applied to the contribution input GUI 2504 in step S2830. For example, a CA 604 may be prepared to generate the same number of dropdown menus as there are CG 2302, so if five unique CG 2302 are retrieved from the CP 601, then five dropdown menus would be generated on the contribution input GUI 2504.

If the CA 604 is designed to interpret the contribution rules 3001 to generate the contribution input GUI 2504, the contribution rules 3001 can either be evaluated to construct the view of the contribution input GUI 2504, the contribution rules 3001 may be bound to the GUI and evaluated with a trigger, or the contribution rules 3001 can be saved internally within the CA 604 and evaluated during later instructions. In any case, the CA 604 must be designed to interpret the contribution rules 3001 to showcase the intended effect of the contribution rules 3001 to the contributor 610.

In FIG. 28, the interpretation of the contribution rules 3001 is shown in steps S2814, S2833, S2816, S2817, S2822, and S2823. To determine the order of contribution rule 3001 execution, the significance of the contribution rule 3001 categories and priorities 3007 are further described referring to FIG. 31*a*. Steps S2814, S2833, S2816, S2817, S2822, and S2823 in FIG. 28 show that contribution rules 3001 are applied across all contribution objects such as CAC 3201, CGC 2303, and CG 2302, as each contribution rule 3001 category is visited. However, an equally valid method to apply the contribution rules 3001 would be to visit each contribution object and apply its specific rules 3001. In the alternative approach where each contribution object is visited, the contribution objects would be visited iteratively and the contribution rules 3001 of each contribution object would be applied in turn, while still considering the categories and priorities 3007 of the contribution rules 3001 to determine the order of execution.

When the authorization rules 3002 are used to dynamically generate S2833 the contribution input GUI 2504 of a CA 604, the authorization rules 3002 determine whether the input fields are disabled S2817 or not. In some implementations of the CA 604, the rest of the contribution rule 3001 categories may not need to be evaluated for an input field if the field is disabled. In other implementations, the rest of the contribution rules 3001 may still need to be evaluated—for example, the CA 604 may still want to display the disabled input field, except it may be greyed out.

The next set of contribution rules 3001 that are evaluated S2822 are the configuration rules 3003, which effect the representation of CGC 2303 and CG 2302 on the contribution input GUI 2504. CG 2302 contain one or more CD 3204, so it is likely that their representation on the contribution input GUI 2504 will group the input fields. Therefore, since the CG 2302 are likely to represent containers on the GUI that group input fields, they are evaluated before transformation 3005 or constraint 3004 rules.

The transformation 3005 and constraint 3004 rules are applied S2823 last, and are grouped together, because their effects are dependent on one other. The transformation 3005 and constraint 3004 rules are valuable to a good user experience, because they may be used to give the contributor 610 quick feedback on whether the inputted CD 3204 adheres to the constraints 3004, or what the data is like after it is transformed 3005, or it limits the input selection to only be valid CD 3204.

Decision point S2816 shows that the output of an authorization rule 3002 is a Boolean value, which indicates whether the input of CD 3204 is permitted into the target contribution objects. If the evaluation of the authorization rule 3002 at decision point S2816 determines that the input of CD 3204 is not permitted, then the target contribution data objects are disabled S2817. Disabling data objects may be presented in different ways on a CA 604; for example, it may mean that GUI elements representative of the target contribution objects are removed or disabled. To optimize performance of the CA 604, if a contribution data object has already been determined to be disabled at decision point S2816, then other contribution rules 3001 that target that contribution object may not need to be evaluated, depending on the presentation of the disabled UI elements. For example, if the disabled UI elements are still presented, but with a reduced opacity and limited functionality, then the rest of the contribution rules 3001 may still need to be applied in order to prepare the appearance of the GUI element. However, if disabled GUI elements will be completely hidden from view, then the rest of the contribution rules 3001 do not need to be evaluated, because their effect will not have an impact on the contribution input GUI 2504.

Figures 29A, 29B:
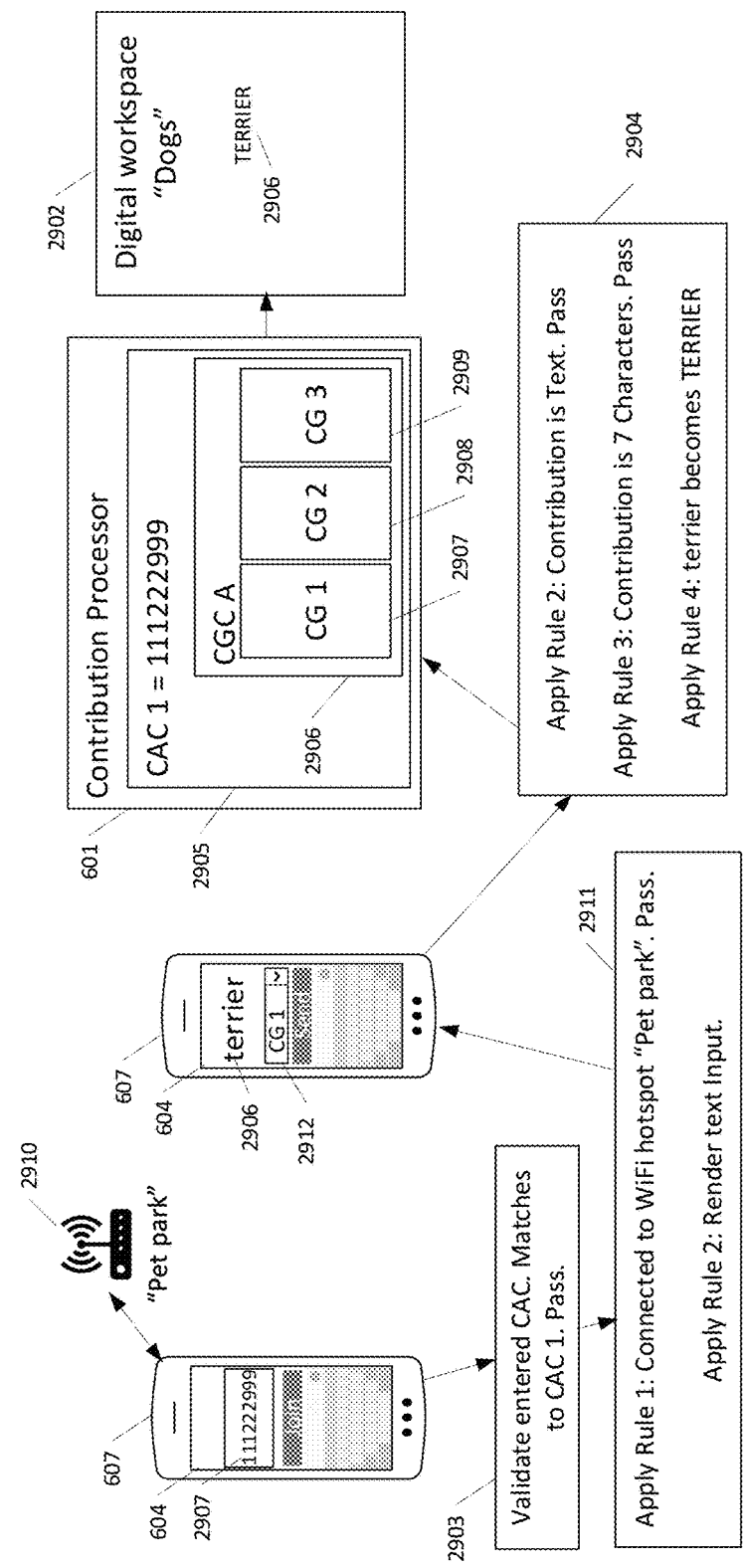
FIGS. 29a, 29b and 29c are diagrammatic illustrations of applying preferred configurable rules between the contribution application and the contribution processor.

With reference to FIGS. 29a and 29b, shows are an example of how contribution rules 3001 may be applied on the CA 604 to inform the contribution input GUI 2504, and the contribution rules 301 may also be applied on the CP 601 after the contribution is submitted. In FIG. 29a, examples of contribution rules 3001 are shown. FIG. 29b, shows that on the CP 601, CGC A 2906 belongs to CAC 1 2905, and that CG 1 2907 belongs to CGC A 2906, which means that all of the target contribution objects of the contribution rules 3001 shown in table 2901 belong to the same contribution session.

To join the contribution session, the contributor 610 first inputs a valid CAC 3201 in the input field 2907. When the CAC 3201 in the input field 2907 is submitted, the CP 601 will verify that the CAC 3201 references an existing and active contribution session. If the inputted CAC 3201 is validated by the CP 601 successfully, as has been done in 2903, then contribution rules 3001 within the matched CAC 3201 may then be applied on the CA 604. The first contribution rule 3001 that is applied in FIG. 29b is Rule 1 2901, because it is an authorization rule 3002 and authorization rules 3002 are applied first. Rule 1 2901 states that the contributor's 610 device 607 must be connected to Wi-Fi hotspot "Pet Park", which is found to be true 2911. Since Rule 1 2901 evaluates to true, and there are no other authorization rules 3002 to apply, then the rest of the contribution rules 3001 that help to generate the contribution input GUI 2504 are applied.

The next rule to be applied is Rule 2 2901, which states that the CD 3204 must be of type text. If the CA 604 is prepared to interpret Rule 2 2901, then it renders a textbox on the contribution input GUI 2504. The contributor 610 is then able to enter text "terrier" 2906 into the textbox. There is another constraint rule 3004 that may be applied on the CA 604, Rule 3 2901, however in the case of the example in FIG. 29b, the CA 604 has not been designed to interpret Rule 3 2901. Had Rule 3 2901 been applied on the CA 604, it might provide visual feedback to the contributor 610 to ensure that they have entered at least 5 characters before they submit their contribution 3301.

The contributor 610 then selects which CG 2302 to submit their content "terrier" 2906 to by selecting a CG 2302 ID in dropdown 2912, since CGC A 2906 contains three possible CG 2302 destinations for the CD 3204: either CG 1 2907, CG 2 2908, or CG 3 2909. After the contribution 3301 reaches the CP 601, more contribution rules 3001 are applied to the contribution objects, including some of the contribution rules 3001 that have already been applied on the CA 604. Box 2904 shows which contribution rules 3001 are applied to the contribution objects: Rule 2 2901, Rule 3 2901, and Rule 4 2901. Since all of the contribution rules 3001 in box 2904 have been verified or applied successfully, then the transformed form of the CD 3204 "TERRIER" 2906 is stored on the CP 601.

When the DW objects created from the contribution objects of CAC 1 2905 are accessed on a DW 2304, such as a DW 2304 called "Dogs" 2902, the DW object is displayed in uppercase as "TERRIER" 2906. Although not shown in FIG. 29b, the DW 2304 may be designed to apply additional processing defined in the DWP 602 or DWA 605 to the contribution objects.

Figure 29C:
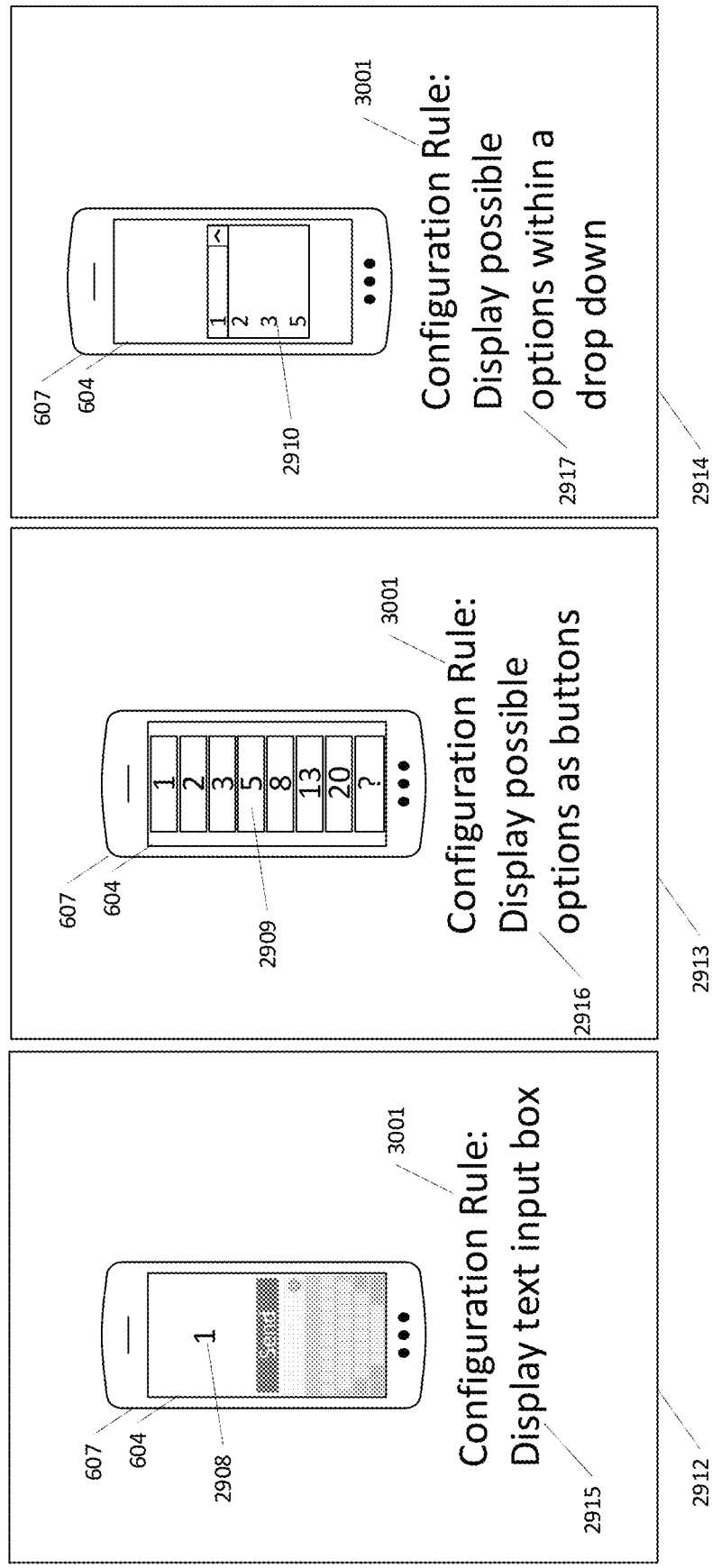

With reference to FIG. 29c, shown is how configuration rules 3001 can be used to render different contribution input GUI 2504. Assuming that the constraint rule 3004 example 2911 is applied on the CA 604 shown in FIG. 29c, there may exist an additional configuration rule 3003 that dictates how the constraint rule 3004 example 2911 should be interpreted. In case 2912, the configuration rule 3003 example 2915 states that the contribution input GUI 2504 should be rendered as a text input box. In case 2909, the configuration rule 3003 example 2916 states that the contribution input GUI 2504 should be rendered to show the possible values as buttons. In case 2914, the configuration rule 3003 example 2917 states that the contribution input GUI 2504 should be rendered to show the possible values within a dropdown menu. Any of cases 2912, 2913, or 2914 show valid renderings of the contribution input GUI 2504. However the cases differ based on the configuration rule 3003 that is applied in each case. The configuration rule 3003 for a contribution object can be set by a facilitator/collaborator 616 on the fly, and if the CA 604 is prepared to interpret the configuration rules 3003, it allows a flexible way for the facilitator/collaborator 616 to display a different contribution input GUI 2504 to different contributors 610.

Figure 30:
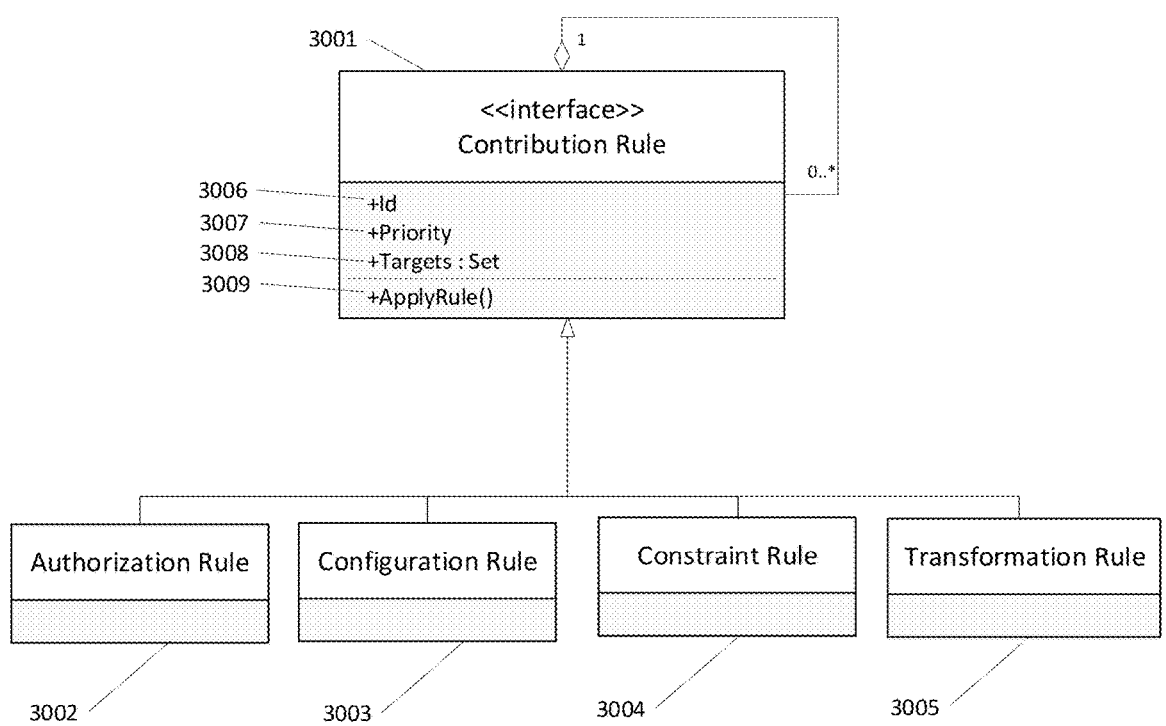
FIG. 30 is a class structure diagram outlining the preferred rules engine module relationships.
Figure 31A:
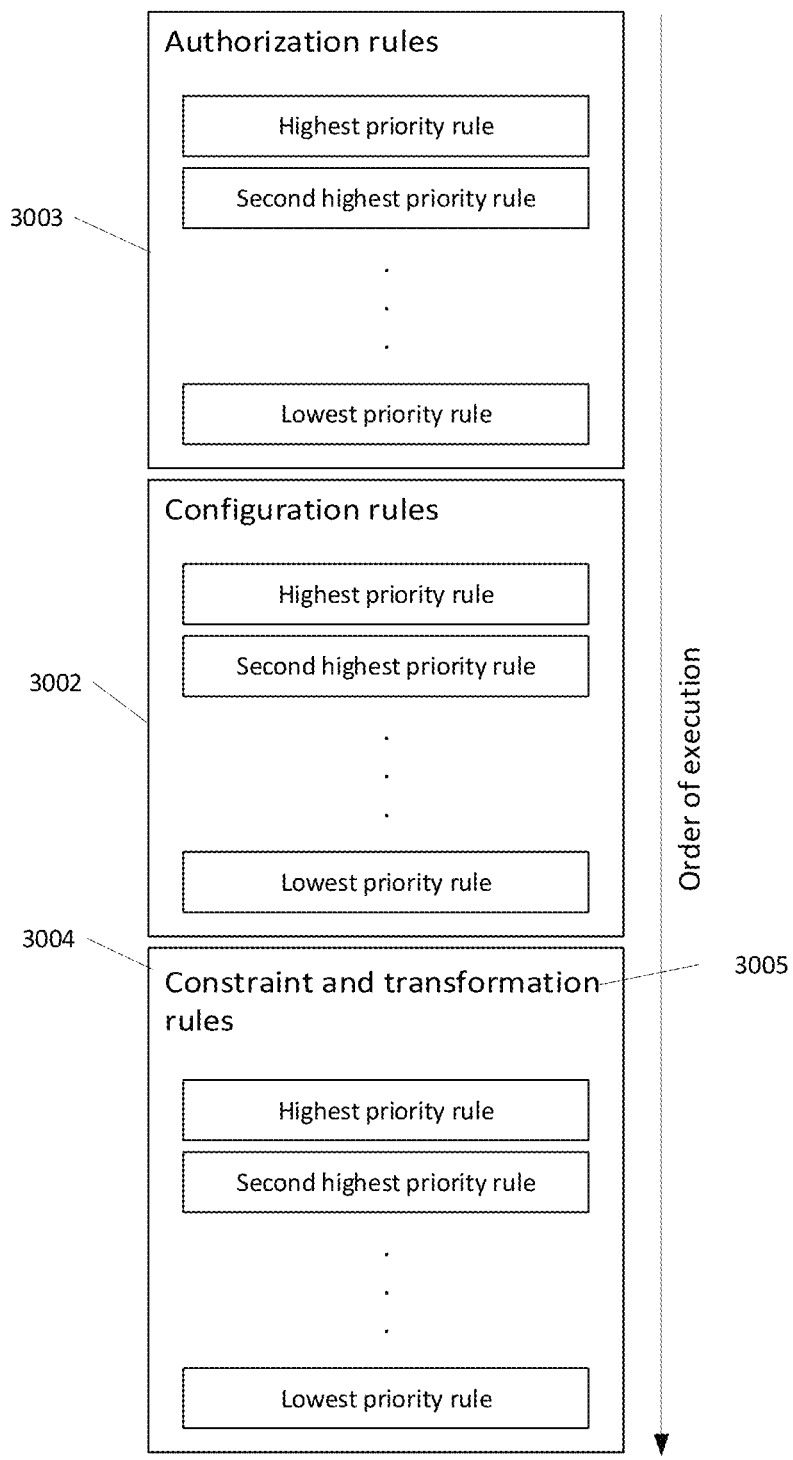

With reference to FIG. 30, illustrated is a class diagram for contribution rules 3001. The contribution rule 3001 interface class specifies a property called Id 3006 that can be used to differentiate between contribution rules 3001 and to link contribution rules 3001 to the contribution objects that they target. The contribution rule 3001 interface class also specifies a property for priority 3007 that indicates the execution order of contribution rules 3001 and its function is shown in FIG. 31*a*. The property for targets 3008 is a set of contribution objects IDs that the contribution rule 3001 targets, where the relationship between contribution rules and objects is also shown in the class diagram of FIG. 32*a*. In some implementations, the property for targets 3008 may not be needed if the target contribution objects already have references to the contribution rules 3001 and the contribution rules 3001 are not expected to be found independently of the contribution objects that reference them. The number of targets that a contribution rule 3001 may contain is unlimited, and a contribution object may be targeted by an unlimited number of contribution rules 3001. In terms of class functions, the contribution rule 3001 interface specifies a function called ApplyRule( )3009 that contains the logic of the contribution rule 3001, and can be constructed such that it references an unlimited number of other contribution rules 3001 within the function. The output type of ApplyRule( )varies depending on the type of the contribution rule 3001 it belongs to.

The types of rules that may implement the contribution rule 3001 interface comprise the authorization rule 3002, configuration rule 3003, constraint rule 3004, and the transformation rule 3005. All types of rules can target CAC 3201, CGC 2303, or CG 2302 contribution objects, as shown in the class diagram in FIG. 32*a*, but the specifics of how the rules are applied to each type of contribution object is described below.

Figure 31C:
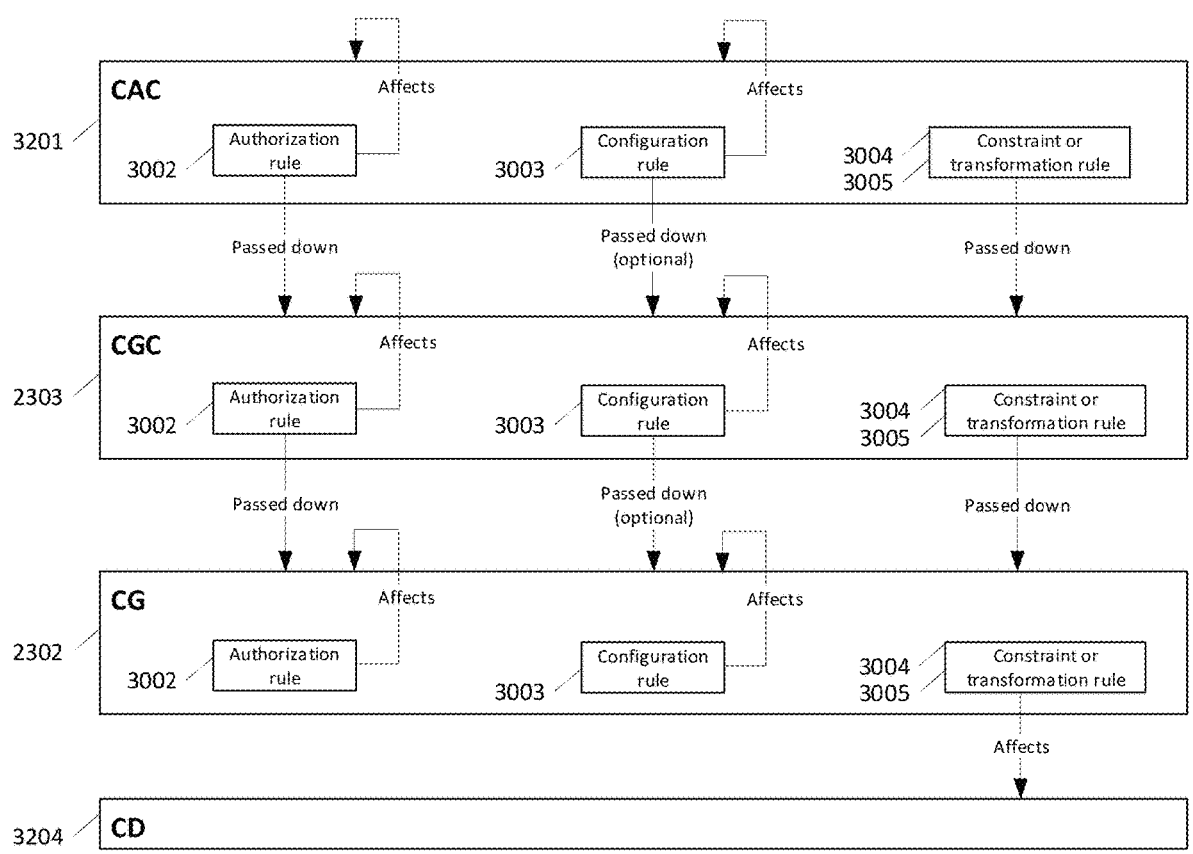

Authorization rules 3002 dictate whether CD 2302 is authorized to be collected. The output of an authorization rule 3002 is a Boolean, so it may either be true or false. Authorization rules 3002 may apply to CAC 3201, CGC 2303, or CG 2302, as shown in FIG. 31*c*. When the authorization rule 3002 applies to a CAC 3201 object, then the authorization rule 3002 dictates whether the contribution session is active or not. When the authorization rule 3002 applies to a CGC 2303, the authorization rule 3002 dictates whether any children CG 2302 can accept CD 3204. When the authorization rule 3002 applies to a CG 2302, then the authorization rule 3002 dictates whether the CG 2302 can accept CD 3204. As shown in FIG. 31*c*, authorization rules 3002 are passed down from targeted contribution objects to children contribution objects, which means that authorization rules 3002 are heritable. Authorization rules 3002 may also affect the contribution objects that they are passed down to. Although not shown in FIG. 31*c* for simplicity, heritable contribution rules 3001 may also be passed down from a CAC 3201 directly to a CG 2302, provided that the CG 2302 is a direct child of the CAC 3201. For example, if there is a CAC 3201 that has an authorization rule 3002 that evaluates to false, then any CG 2302 that are referenced by the CAC 3201 will not be permitted to accept CD 3204. Examples of authorization rules 3002 are listed in table 3101 of FIG. 31*b*.

Configuration rules 3003 adjust how contribution objects behave or are presented, but do not apply to the CD 3204 itself. The types of contribution objects that configuration rules 3003 may apply to are CAC 3201, CGC 2303, or CG 2302, as shown in FIG. 31*c*. Configuration rules 3003 may evaluate to any output data type, including, but not limited to, Booleans, integers, floating points, strings, or other object types. Configuration rules 3003 may be implemented such that they affect all children contribution objects of a target contribution objects, however, in some cases it may be favorable to apply a configuration rule 3003 to one single contribution object without affecting its children. Therefore, FIG. 31*c* shows that configuration rules 3003 may be passed down to children contribution objects, but it is optional. Whether a configuration rule 3003 is passed down to children contribution objects may be specified in the configuration rule 3003 class itself using a property. Examples of configuration rules 3003 are listed in table 3101 of FIG. 31*b*.

Constraint rules 3004 define constraints and limits for CD 3204. The output of constraint rules 3004 is a Boolean which determines whether the CD 3204 has satisfied the constraint or not. For example, if there is CD 3204 expected to describe time in terms of the 24-hour format, then there may be a constraint rule 3004 that specifies the minimum hour value to be 0 and there may be a second constraint rule 3004 that specifies the maximum hour value to be 24. More examples of constraint rules 3004 are listed in table 3101 of FIG. 31*b*.

Transformation rules 3005 define processing of the CD 3204. The output of a transformation rule 3005 can be any output data type. For example, there may exist CD 3204 text submitted in various languages, but the facilitator/collaborator 616 of the contribution session would like to translate all CD 3204 to English text. The facilitator/collaborator 616 may then specify a transformation rule 3005 that transforms all text CD 3204 to English, if they are not already in English. More examples of transformation rules 3005 are listed in table 3101 of FIG. 31*b*. Constraint 3004 and transformation 3005 rules are applied to CG 2302, as shown in FIG. 31*c*, because CG 2302 directly contain CD 3204. However, if constraint 3004 or transformation 3005 rules are targeted to higher contribution objects such as CAC 3201 or CGC 2303, then the constraint 3004 or transformation 3005 rules may be inherited down the tree structure to all CG 2302 children of the targeted CAC 3201 or CGC 2303 contribution objects, where the constraint 3004 or transformation 3005 rules may then affect the CD 3204. To determine in which order the contribution rules 3001 should be executed, the category of a contribution rule 3001 is considered, as well as the priority 3007 of the contribution rule 3001.

With reference to FIGS. 31*a*, 31*b* and 31*c*, authorization rules 3003 are preferably executed first, and within the authorization rules 3003, the authorization rules 3003 with the highest priority 3007 are executed first. Authorization rules 3003 will determine whether CD 3204 is permitted to be collected for any children contribution objects of the target contribution object. Therefore, none of the other contribution rules 3001 will need to be evaluated for a target contribution object if authorization rules 3003 do not permit CD 3204 to be added to the target contribution object and its children contribution objects.

Following the authorization rules 3003, the configuration rules 3002 are preferably executed, and within the configuration rules 3002, the contribution rules 3001 with the highest priority 3007 are executed first. If the contribution 3301 does not satisfy the configuration rules 3002, then there is no need to evaluate the constraint 3004 and transformation 3005 rules, because the contribution 3301 will be rejected at this stage.

Preferably last, constraint 3004 and transformation 3005 rules are then executed, and within those categories, the constraint 3004 or transformation 3005 rules with the highest priority 3007 are executed first. Constraint 3004 and transformation 3005 rules are grouped together, because the order of execution between these two types of contribution rules 3001 is important to determine a single output. For example, assume there exists a transformation rule 3005 that capitalizes the text in CD 3204, and there also exists a constraint rule 3004 that specifies that the text must not exceed one line of text for some width. There may exist a contribution 3301 submitted in lowercase that wraps to one line, but when the same text is transformed to uppercase, then it wraps to two lines. The two contribution rules 3001 will then produce a different result if executed in different orders. If the constraint rule 3004 is first verified, then the transformation rule 3005 will successfully be applied to the text. If the transformation rule 3005 is first applied, the constraint rule 3004 will then reject the contribution 3301. Since order matters when applying constraint 3004 and transformation 3005 rules, the execution order between constraint 3004 and transformation 3005 rules is specified by the priority 3007 of each.

Priority 3007 may be represented by anything that has order to it. The priority 3007 may be represented by decimal numbers, integers, letters of the alphabet, or a mix of the aforementioned types. For example, if priority 3007 is denoted by numbers, where the smallest numbers indicate highest priority 3007 and the largest numbers indicate lowest priority 3007, then contribution rules 3001 with the smallest priority 3007 number are executed first and the contribution rules 3001 with the largest priority 3007 number are executed last.

Figure 32A:
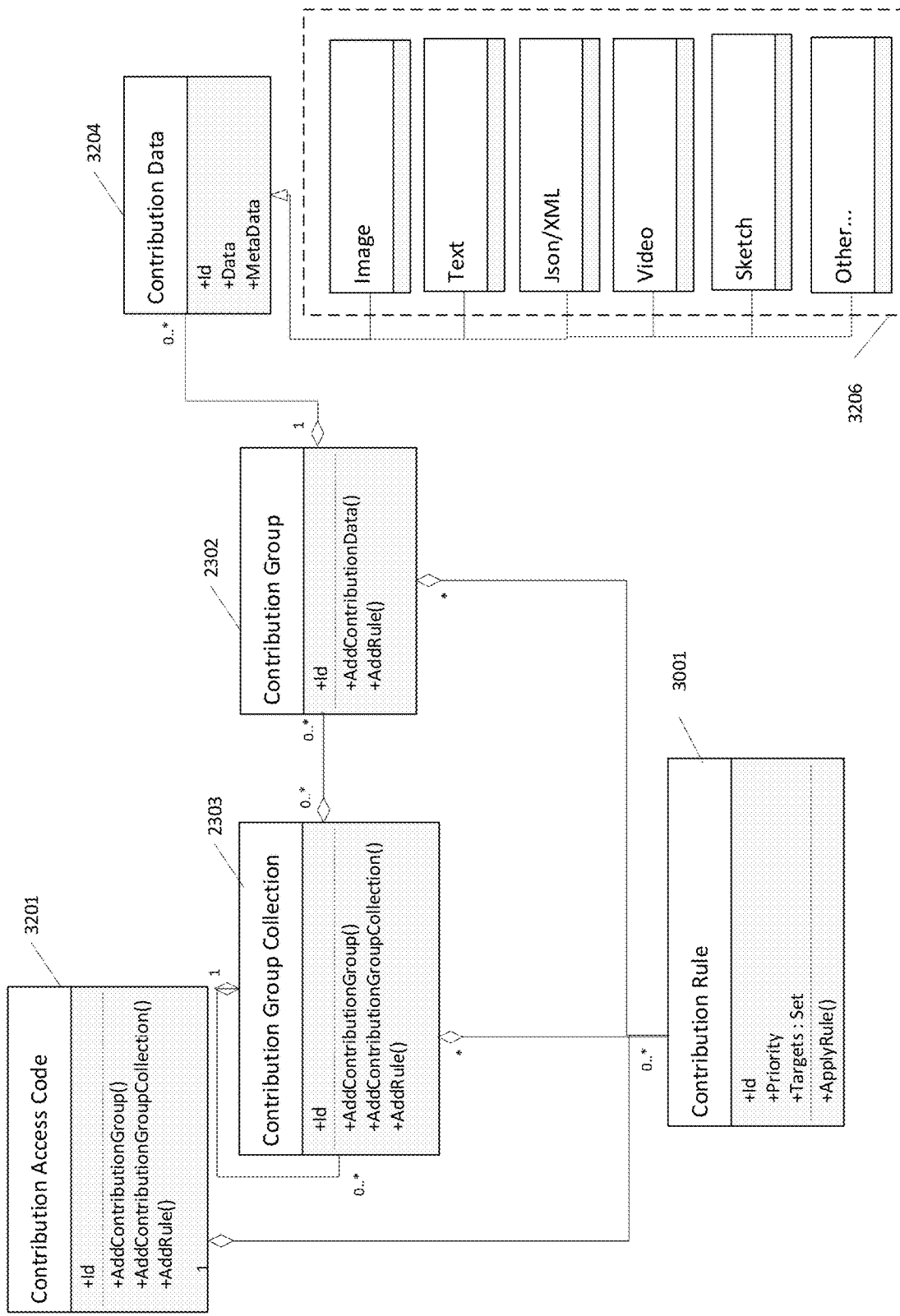
FIGS. 32a, 32b, 32c, 32d and 32e are diagrammatic illustrations of the preferred data structures for the contribution system.

In summary, authorization rules 3002 may affect CAC 3201, CGC 2303, or CG 2302 contribution data objects, as shown in the class diagram in FIG. 32a. Authorization rules 3002 may also be inherited by children contribution objects of the target object. Configuration rules 3003 may or may not affect the children contribution objects of the target object, depending on whether it is intended or not. Transformation 3005 and constraint 3004 rules affect the CD 3204 and make the most sense when they are applied to CG 2302, because CG 2302 hold CD 3204. If Transformation 3005 or constraint 3004 rules are applied to higher contribution data objects such as CAC 3201 or CGC 2303, then the contribution rules 3001 would be inherited down the tree structure to any CG 2302 children of those contribution objects.

With reference to FIG. 32a, illustrated a potential class diagram for the contribution objects found in a contribution session in order to demonstrate the relationships between the different types of contribution objects. Each contribution session is represented by one CAC 3201, because each contribution session must have a CAC 3201 to which contributors 610 can authorize. Each CAC 3201 may have an unlimited amount of CGC 2303 or CG 2302 as children, where in turn each CGC 2303 may also have an unlimited amount of CGC 2303 or CG 2302 as children. Finally, each CG 2302 may have an unlimited amount of CD 2302 as children. Although not shown, a CAC 3201 may also reference other CAC 3201, so that a "master" CAC 3201 can be conveniently used to authorize contributors 610 into multiple contribution sessions at once.

Both the CAC 3201 and CGC 2303 classes may contain a method to add CG 2302 children, AddContributionGroup( ), and they may also contain a method to add CGC 2303 children, AddContributionGroupCollection( ). The CG 2302 class may contain a method called AddContributionData( ) in order to add CD 3204 children to itself. Since CAC 3201, CGC 2303, and CG 2302 may all be targeted by contribution rules 3001, they may each contain a method named AddRule( ) in order to add contribution rules 3001 to themselves. Alternatively, the contribution rules 3001 may not need to be added within each CAC 3201, CGC 2303, or CG 2302 object, and can be linked to these contribution objects by other means, such as a for example but not limited to a table or dictionary.

The CD 3204 class may contain data and meta-data that has been contributed. The CD 3204 class shown in FIG. 32a may be derived to other classes 3206 that are specific to the type of CD 3204. Types of CD 3204 may include, but is not limited to, images, text, JSON/XML, videos, and/or sketches, as listed in 3206. The classes of specific CD 3204 types 3206 may include fields, properties, and/or methods that are relevant to storing or accessing that type of CD 3204. Different contribution sessions may be independent of each other, but it is also possible for contribution sessions to share contribution objects.

Figure 32B:
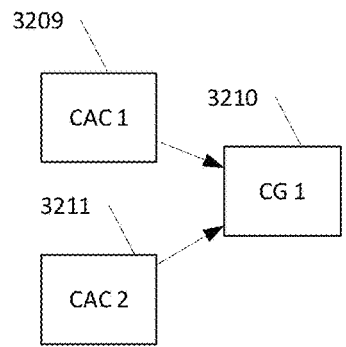

With reference to FIG. 32b, illustrated is an example of how contribution objects may share child contribution objects, where CAC 1 3209 and CAC 2 3211 in FIG. 32b, both reference CG 1 3210. Therefore, if a contributor 610 joins a contribution session through CAC 1 3209, the contributor 610 may be permitted to contribute CD 3204 to the same CG 2302 as another contributor 610 that joins a contribution session through CAC 2 3211. Moreover, contribution objects may also share child contribution objects that are nested down the hierarchical tree, which the example in FIG. 32c illustrates.

Figure 32C:
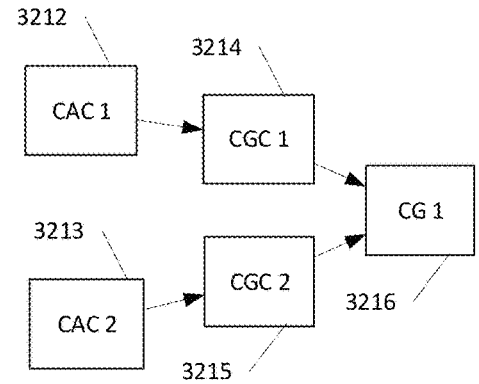

With reference to FIG. 32c, CAC 1 3209 first references CGC 1 3214, which then references CG 1 3216. However, CAC 2 3213 references CGC 2 3215, which also references CG 1 3216. Therefore, CG 1 3216 is indirectly shared by CAC 1 3212 and CAC 2 3213 in FIG. 32c, but directly shared in FIG. 32b.

Figure 32D:
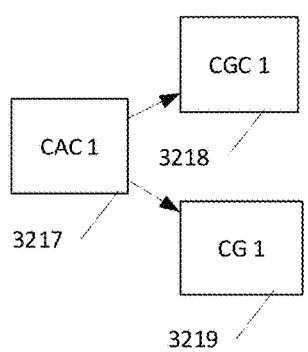

With reference to FIG. 32d, shown is an example illustrating that a contribution object may have multiple child contribution objects. In FIG. 32d, CAC 1 3217 has two child objects: CGC 1 3218 and CG 1 3219, although a contribution object may have an unlimited amount of child contribution objects. The types of contribution objects that may have unlimited child contribution objects are CAC 3201, CGC 2303, or CG 2302. In the example of FIG. 32d, CD 3204 may either be sent to CG 1 3218 or to any children of CGC 1 3218.

Figure 32E:
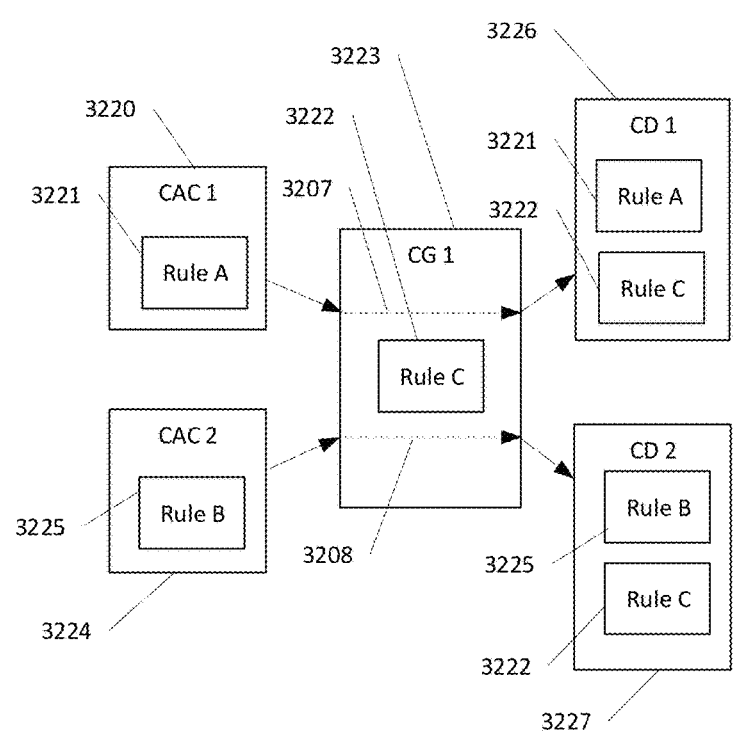

With reference to FIG. 32e, illustrated is an example of how CD 3204 may have different rules applied to their data, depending on the parent contribution objects. For example, both CAC 1 3220 and CAC 2 3224 in FIG. 32e reference CG 1 3223, but CAC 1 3220 is targeted by some heritable Rule A 3221 while CAC 2 3224 is targeted by some heritable Rule B 3225. If CD 1 3226 is submitted by a contributor 610 to CAC 1 3220, then CD 1 3226 will be added as a child object to CG 1 3223, as shown by the dotted arrow 3207. Rule A 3221 will be applied to CD 1 3226, since CD 1 3226 was sent through CAC 1 3220, but Rule B 3225 of CAC 2 3224 will not be applied to CD 1 3226, because CD 1 3226 was not sent through CAC 2 3224. Similarly, dotted line 3208 shows the addition of CD 2 3227 that has been sent through CAC 2 3224. Rule B 3225 of CAC 2 3224 is applied to CD 2 3227, but Rule A 3221 of CAC 1 3220 is not applied to CD 2 3227, because CD 2 3227 was not sent through CAC 1 3220. However, Rule C 3227 of CG 1 3223 is applied to both CD 1 3226 and CD 2 3227, since both have been sent through CG 1 3223.

Figure 33A:
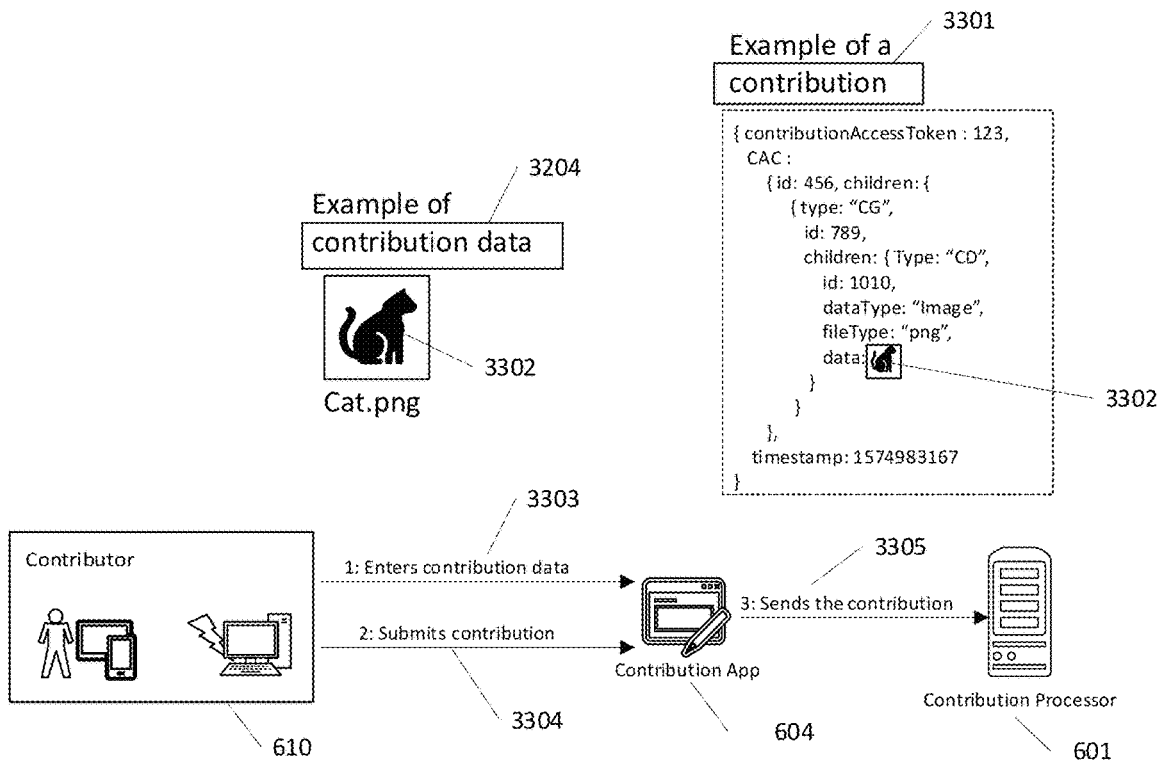
FIGS. 33a, 33b and 33c are functional diagrams of the preferred data contribution process.

With reference to FIG. 33a, shown is the data flow between components as a contributor 610 attempts to submit a contribution 3301. In FIG. 33a, the contributor 610 enters 3303 their CD 3204 into the CA 604 in step 1, and then proceeds to submit 3304 the contribution 3301 in step 2. The CA 604 then sends 3305 the contribution 3301 to the CP 601 in step 3 of FIG. 33a, which contains a contribution access token, so that the contribution access token can be validated. An example of CD 3204 is shown as the cat image 3302. The cat image 3302 is then included as CD 3204 inside the contribution 3301. A contribution 3301 contains the contribution objects, a contribution access token, and any other meta-data such as timestamp of submission.

Figure 33B:
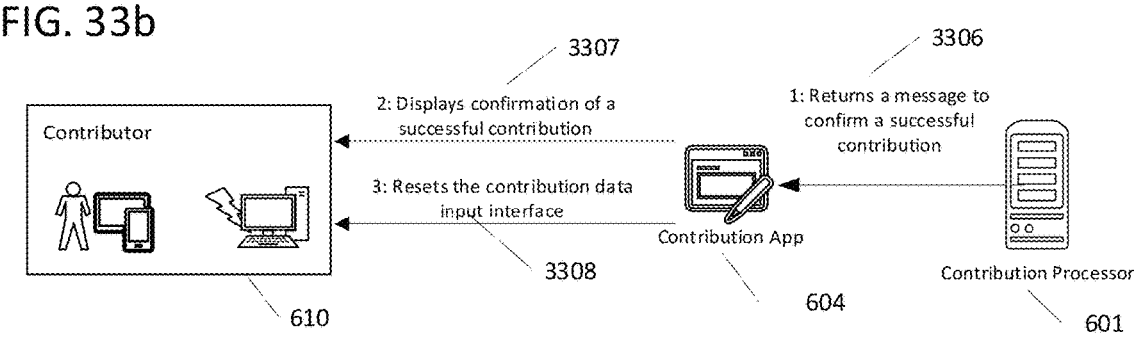

With reference to FIG. 33b, shown is the outcome of a successful contribution 3301, where the CP 601 returns 3306 a message to the CA 604 to indicate that the contribution 3301 has proceeded successfully. To provide a good user experience, the CA 604 may then display 3307 a notification to the contributor 601 to indicate that the contribution 3301 was successful, as shown in step 2 of FIG. 33b, although this step may not be necessary. The CA 604 may then reset 3308 the contribution input GUI 2504 that accepts CD 3204 from the contributor 610, as shown in step 3 of FIG. 33b, so that the contributor 610 may submit another contribution.

Figure 33C:
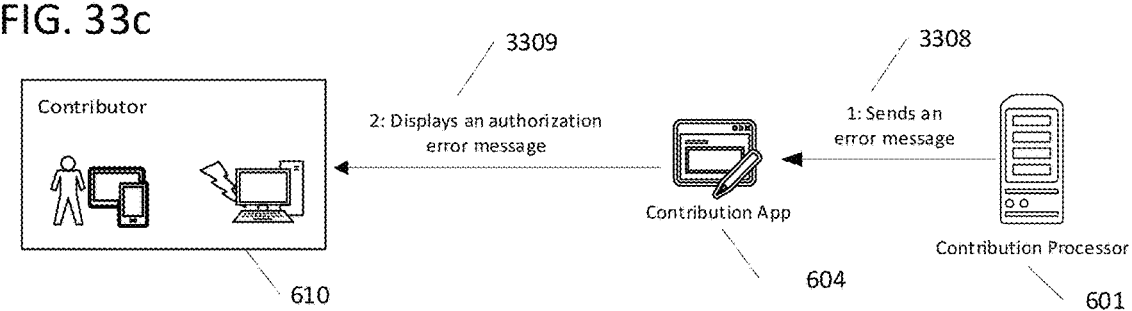

With reference to FIG. 33c, shown is the outcome of an unsuccessful contribution 3301, where the CP 601 returns 3308 a message to the CA 604 to indicate that the contribution 3301 has failed, as shown in step 1. The contribution 3301 may fail for a variety of reasons, such as an invalid contribution access token, violation of any contribution rules 3001, or other errors. To provide a good user experience, the CA 604 may then display 3309 a notification to the contributor 610 to indicate that the contribution 3301 failed, as shown in step 2 of FIG. 33c, although this step may not be necessary.

Figure 34:
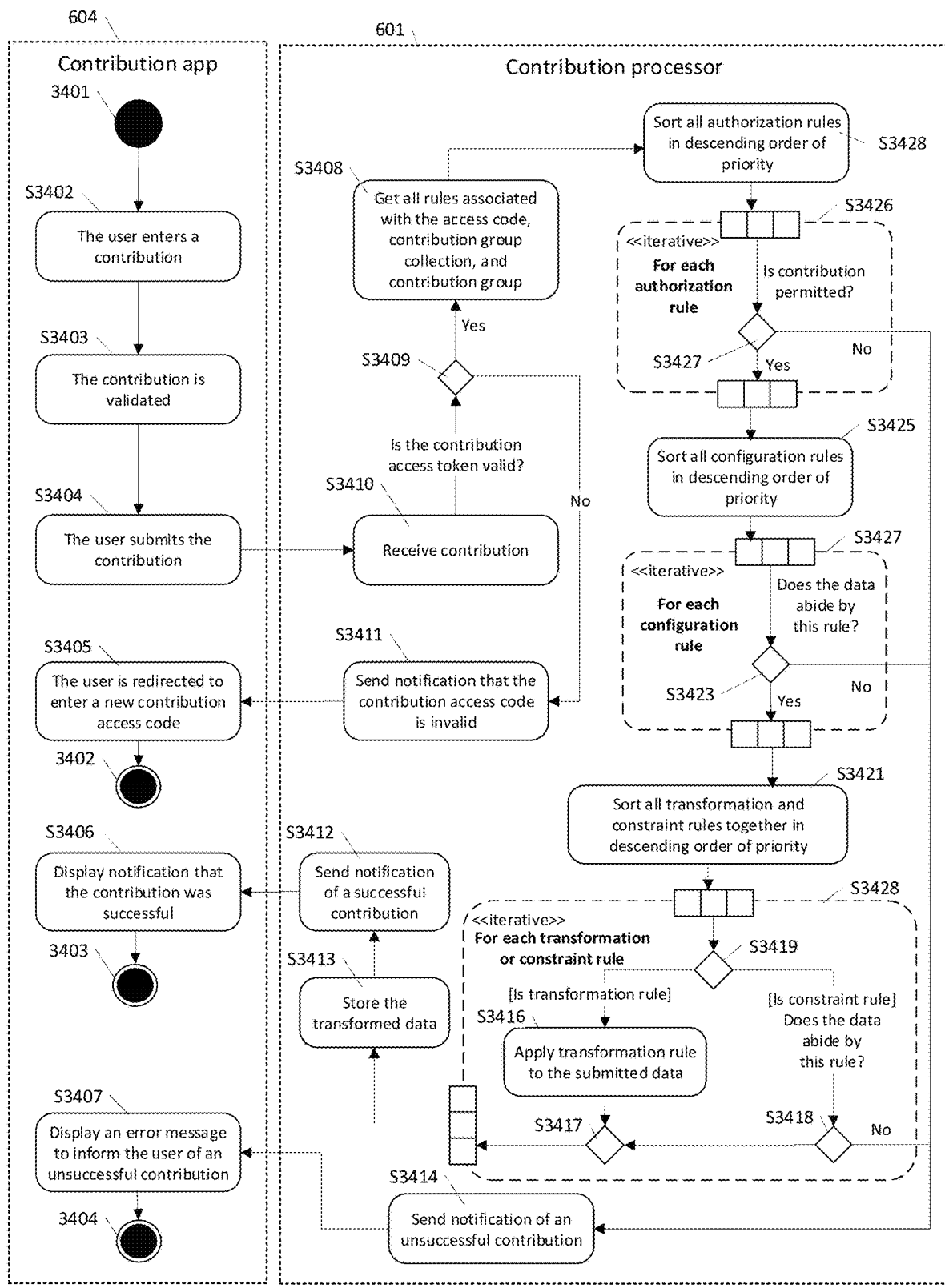
FIG. 34 is a logic flow diagram of the preferred contribution data submission process.

With reference to FIG. 34, shown is the activities that occur within components when a contribution 3301 has been submitted. At starting point 3401 in FIG. 34, the contributor 610 of the CA 604 first enters CD 3204, step S3402. The inputted CD 3204 may then be validated on the CA 604 as mentioned in step S3403. The CD 3204 may be validated against the contribution rules 3001 ahead of submission to the CP 601, so that the user may have quick feedback for any corrections needed. Data validation on the CA 604 may not be necessary, as some of the contribution rules 3001 would also be validated and applied on the CP 601, possibly for a second time. However, there may exist some contribution rules 3001 that are best validated on the CA 604, for example, any authorization rules 3002 that specify the required Wi-Fi hotspot connection of a contribution device 607. Such contribution rules 3001 may be validated on the CP 601 if the name of the hotspot is transmitted as meta-data inside the contribution 3301, however, processing time and contribution 3301 size may be saved if the contribution rule 3001 was instead validated on the CA 604. There may also be configuration rules 3003 that affect the visual appearance of the CA 604, which would not be evaluated on the CP 601. Additionally, the CA 604 may enforce any other contribution rules 3001 for validation that are not defined as contribution rules 3001.

After validation has been satisfied on the CA 604, the contribution 3301 is submitted in step S3404. The contribution 3301 may then be received by the CP 601, as written in step S3410. At decision point S3409, the CP 601 then validates the contribution access token, which has been included in the contribution 3301 as meta-data. If the contribution access token is not valid, then a notification is sent back to the CA 601 in step S3411, and the CA 601 may redirect the user to enter another CAC 3201 in step S3405, in order to activate a contribution session. If the contribution access token is confirmed to be valid at decision point S3409, then the CP 601 retrieves S3408 all of the contribution rules 3001 that should be evaluated for each of the CAC 3201, CGC 2303, or CG 2302 objects in the contribution 3301 and may group the contribution rules 3001 together by type.

As also shown in FIG. 31a, the first types of contribution rules 3001 to be evaluated for a contribution are authorization rules 3002. In step S3428, all of the authorization rules 3002 retrieved in S3408 are sorted in descending order of priority, so that the highest-priority rules are evaluated first. Each authorization rule is then visited in step S3426 and evaluated at decision point S3427 to determine whether contribution is permitted. If an authorization rules 3002 determines that contribution is not permitted, then the contribution 3301 is classified as unsuccessful and the CA 604 is notified accordingly in step S3414. The rest of the contribution rules 3001 are not evaluated if the contribution 3301 is considered unsuccessful. If decision point S3427 finds that contribution has been permitted by all authorization rules 3002, then the configuration rules 3003 are the next types of contribution rules 3001 to be evaluated, as also shown in FIG. 31a.

In step S3425, the configuration rules 3003 retrieved in S3408 are sorted in descending order of priority, so that the highest priority 3007 contribution rules 3001 are evaluated first. All of the configuration rules 3003 are then iteratively evaluated. At decision point S3423, if the configuration rule has not been followed as expected, then the contribution 3301 is classified as unsuccessful and the CA 604 is notified accordingly in step S3414. The rest of the contribution rules 3001 are not evaluated if the contribution 3301 is considered unsuccessful. There may exist configuration rules 3003 that are solely relevant to the appearance of the CA 604, so those contribution rules 3001 may be ignored on the CP 601, which may be determined by a property in the configuration rule class. If all of the contribution rules 3001 that are relevant to the CP 601 have been followed, then the transformation 3005 and constraint 3004 rules are evaluated next.

In step S3421, all of the transformation 3005 and constraint 3004 rules are grouped together and then sorted in descending order of priority 3007, so that the highest priority 3007 contribution rules 3001 are evaluated first. All of the transformation 3005 and constraint 3004 rules are then iteratively evaluated. At decision point S3419, if the rule is a constraint 3004 rule, then decision points S3417, S3418 determines whether the CD 3204 abides by the rule. If the data is found to not abide by a constraint 3004 rule, then the contribution 3301 is classified as unsuccessful and the CA 604 is notified accordingly in step S3414. The rest of the contribution rules 3001 are not evaluated if the contribution 3301 is considered unsuccessful. If decision point S3419 determines that the contribution rule 3001 is a transformation 3005 rule, then the contribution rule 3001 is applied to the CD 3204 in S3416. If all of the transformation 3005 and constraint 3004 rules have been successfully validated or applied, then the transformed CD 3204 is stored S3413 on the CP 601. If the CD 3204 has been successfully stored, then the CP 601 notifies the CA 604 in step S3413 that the contribution 3001 has succeeded.

In the case that the contribution 3001 has not been successful, then the CA 604 may be designed to display an informative error message to the contributor 610 in step S3407. The CA 604 may not need to show an error message to the contributor 610, but it is recommended for a good user experience.

Figure 35A:
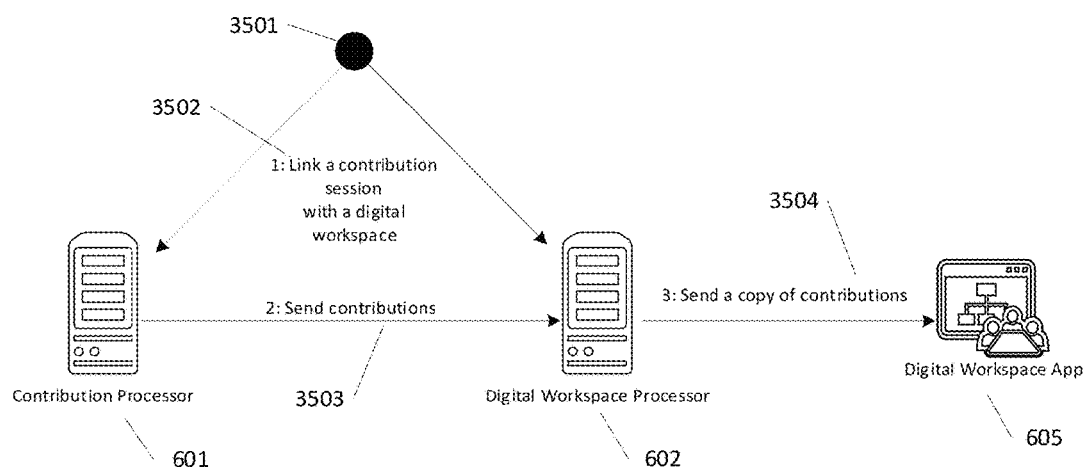
FIGS. 35a and 35b are functional diagrams of the preferred data flow from the contribution processer to the digital workspace processer to the digital workspace application.

With reference to FIG. 35a, shown is the data flow between components when a DW 2304 is first linked to a contribution session. The source of the linkage between the DW 2304 and the contribution session is depicted by 3501 in FIG. 35a, which represents an activity external to the CS 609. The linkage may occur via some dashboard application, it may be directly added by modifying the DB within the CP 601 and DWP 602, or by some other means. Once the linkage 3502 has occurred, as depicted in step 1 of FIG. 35a, the CP 601 is then prompted in step 2 to send 3503 the relevant contributions 3001 to the DWP 602. The DWP 602 maps the contribution objects to DW objects, and then DW objects are sent 3504 to a DWA 605 in step 3 so that the DW objects can be displayed and manipulated.

Figure 35B:
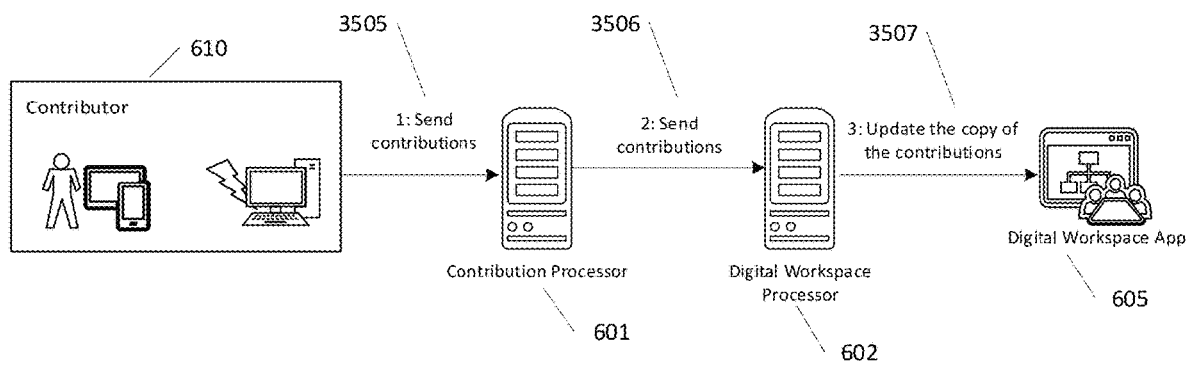

With reference to FIG. 35b, shown is the data flow between components when contribution object updates are sent to a linked DW 2304. After the contributor 610 sends 3505 a contribution 3001 as shown in step 1 of FIG. 35b, the CP 601 processes the contribution 3001 as it normally does, but if there is a linked DW 2403 for that contribution session, then the CP 601 relays 3506 the contribution objects to the DWP 602 in step 2. The DWP 602 then sends 3507 any updates to the DWA 605 in step 3 so that the displayed DW objects can be updated.

Figure 36:
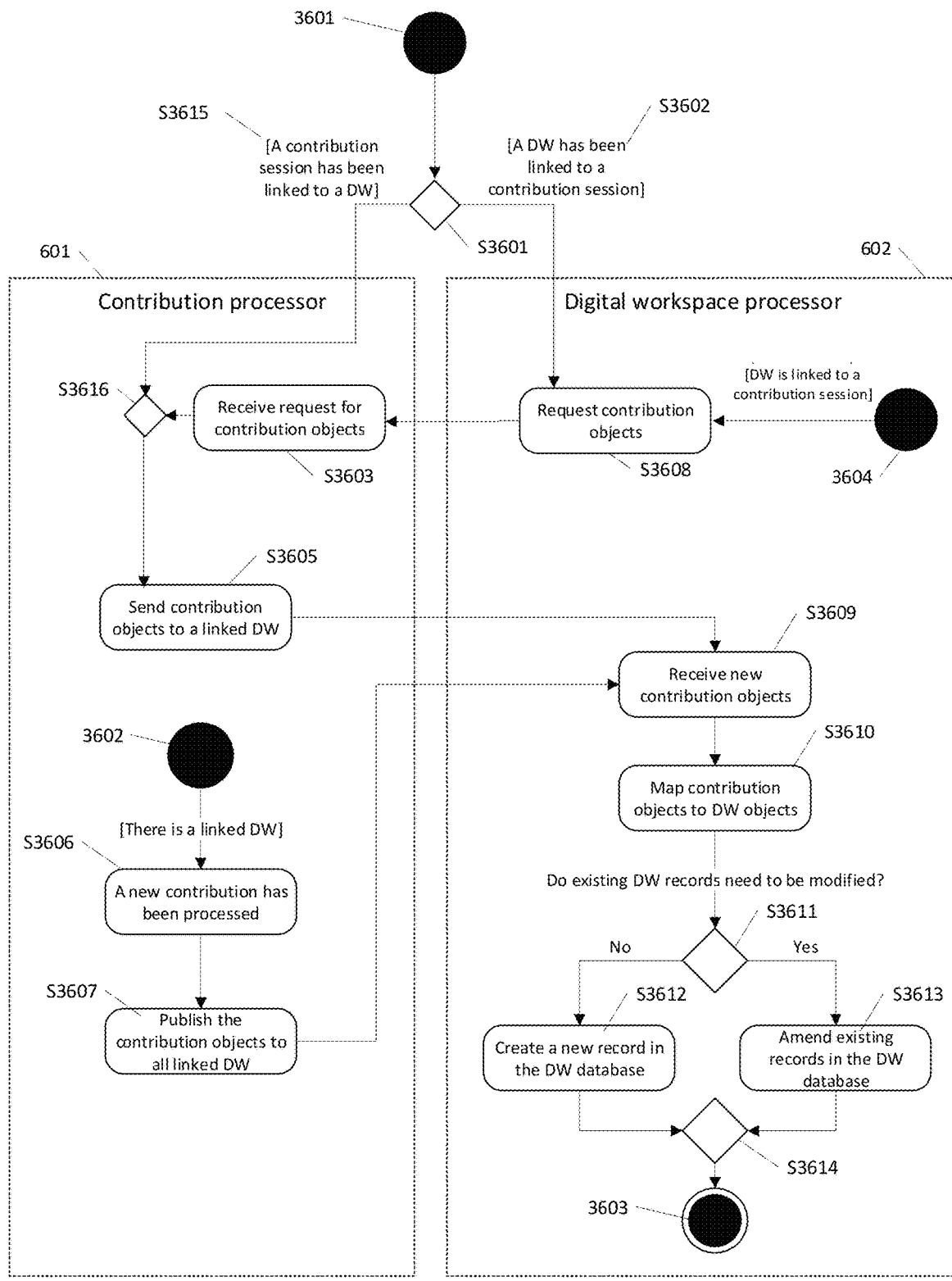
FIG. 36 is a logic flow diagram from the preferred contribution processor to the digital workspace application.

With reference to FIG. 36, shown is the activities that occur when a contribution session has been linked to a DW 2304. A link may include authorization between the CP 601 and DWP 602, so that contribution objects can be passed from the CP 601 to the DWP 602. For starting points 3602 or 3604 to occur, starting point 3601 should first be executed at some point before. Just after starting point 3601, two mutually exclusive paths may occur between decision point S3601 and merge point S3616. Either the contribution session may be linked to the DW 2304 as shown in step S3615, or the DW 2304 may be linked to the contribution session as shown in step S3602. If the contribution session is linked to the DW 2304 such that the DWP does not have to request the contribution objects, then the CP 601 initiates the sending of the contribution objects to the DW 2304 in step S3605. However, if the DW 2304 is linked to the contribution session such that the DWP 602 must request the contribution objects in step S3608, then the CP 601 receives this request in S3603 and then sends the contribution objects to the DWP 602 in step S3605. A contribution session may be linked to an unlimited number of DWs 2304, and a DW 2304 may be linked to an unlimited amount of contribution sessions.

Once the DWP 602 receives the new contributions 3001 as shown in step S3609, then the contribution objects are mapped to the DW objects in step S3610. The mapping of the contribution objects to the DW objects is further shown in the class diagram of FIG. 37. At decision point S3611, the DWP 602 checks whether a mapping of the CD 3204 already exists in the DWP 602 DB 603. If the contribution objects have already been mapped to the DW objects, then the DW object is amended, as mentioned in step S3613. If there is a matching DW object for the contribution object ID, then the contribution object has already been saved in the DWP 602 DB 603 and needs to be updated with the new contribution object. However, if the record does not already exist, then a new record is created in the DWP 602 DB 603 for the contribution objects as shown in step S3612. When a new DW object has either been created or updated, then the end point 3603 is reached. After the end point 3603 is reached, the DWP 602 may then update the DWA 605 with any changes to the DW objects.

Once a link has been made between a contribution session and a DW 2304, then starting point 3602 may occur whenever CD 3204 is submitted. When a new contribution 3001 has been processed on the CP 601 in step S3606, if there is an existing link between the contribution session and a DW 2304, then the contribution 3001 is published to the linked DW 2304. When the DWP 602 receives the contribution objects in step S3609, the contribution objects are mapped to DW objects. If the DWP 602 is unable to receive contribution object updates for some time, starting point 3604 may occur, where the DWP 602 requests the contribution object updates that it needs once it is available to receive the contribution objects.

Figure 37:
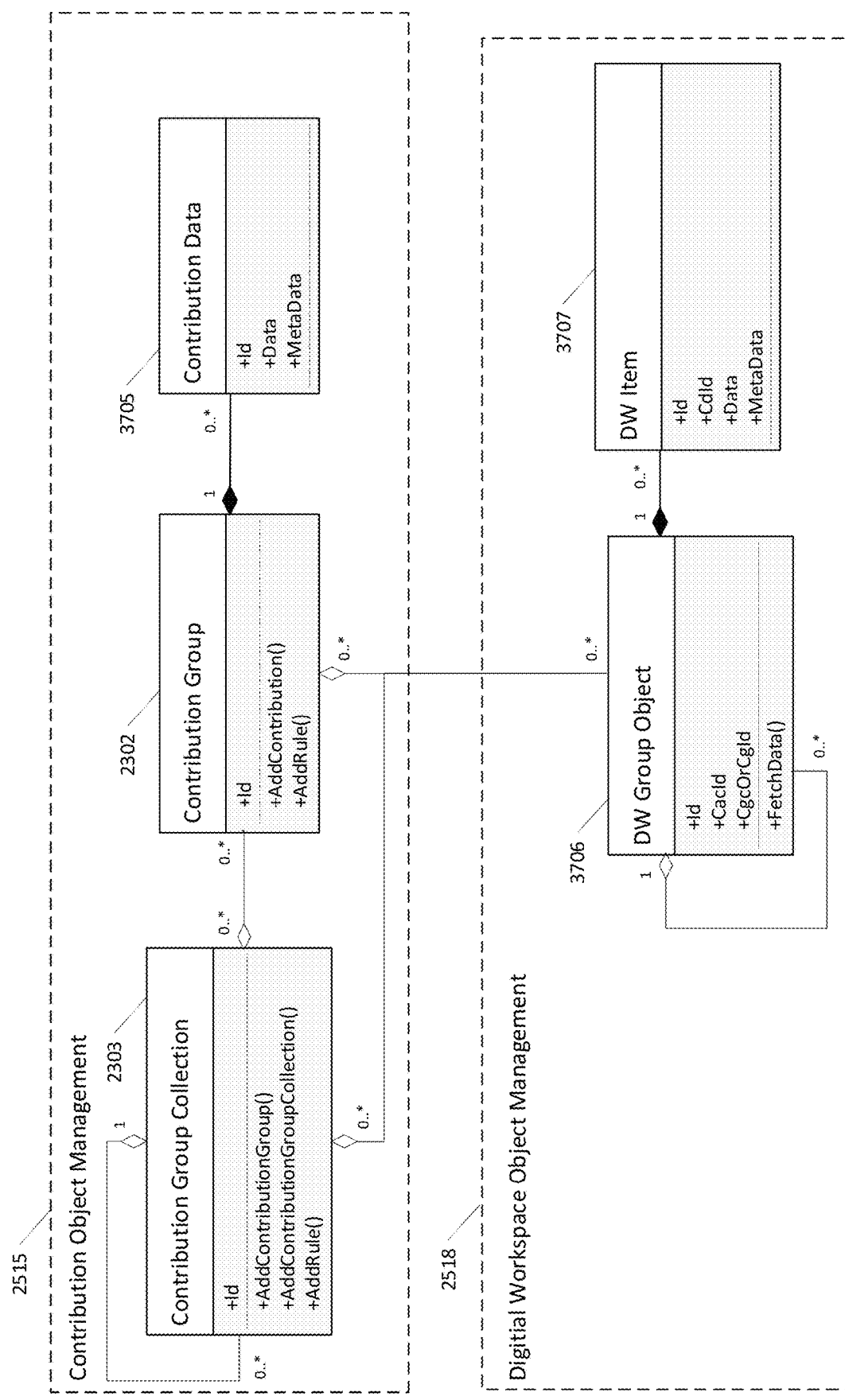
FIG. 37 is a class structure diagram outlining the preferred contribution processor to digital workspace processor data mappings relationships.

With reference to FIG. 37, shown is a class diagram that shows how contribution objects may be mapped to DW objects. The CAC 3201, CGC 2303, and CG 2302 class diagrams have already been discussed in the class diagram of FIG. 32a. DW objects may either be DW group objects 3706 or DW items 3707. In FIG. 37, CGC 2303 or CG 2302 may be mapped to an unlimited amount of DW group objects 3706. A DW group object 3706 may contain an Id so that it can be identified within the DW 2304. However, the DW group object 3706 may also contain a CacId to map it to a contribution session. Additionally, the DW group object 3706 may also contain a CgcOrCgId to identify which CGC 2303 or CG 2302 have been mapped to it. The mapping of contribution objects to DW objects needs to be identified, so that when new contribution objects are received by the DWP 602, the corresponding DW objects can be updated or created.

One way to check whether contribution objects have already been saved by the DWP 602 is to compare the Ids of either the CGC 2303 or CG 2302 in the contribution objects to the CgcOrCgId of the DW group object 3706. If the CGC 2303 or CG 2302 Ids match, then the Ids of the CD 3204 in the contribution objects may be compared to the CdIds of the DW items 3707. If a DW item 3707 already exists with the same CdId as found in the contribution objects, then the received contribution objects may be ignored, because then the new contribution objects do not need to modify any existing DW objects. However, if the CD 3204 Id does not match the CdId of any existing DW item 3707, then a new DW item 3707 may be created that contains a unique Id, the CdId, the CD 3204 data, the CD 3204 meta-data, as well as any other processing required by the DW. The DW group object 3706 may also have a method to request any updates to the corresponding contribution object from which it formed, called FetchData( ).

Figure 38A:
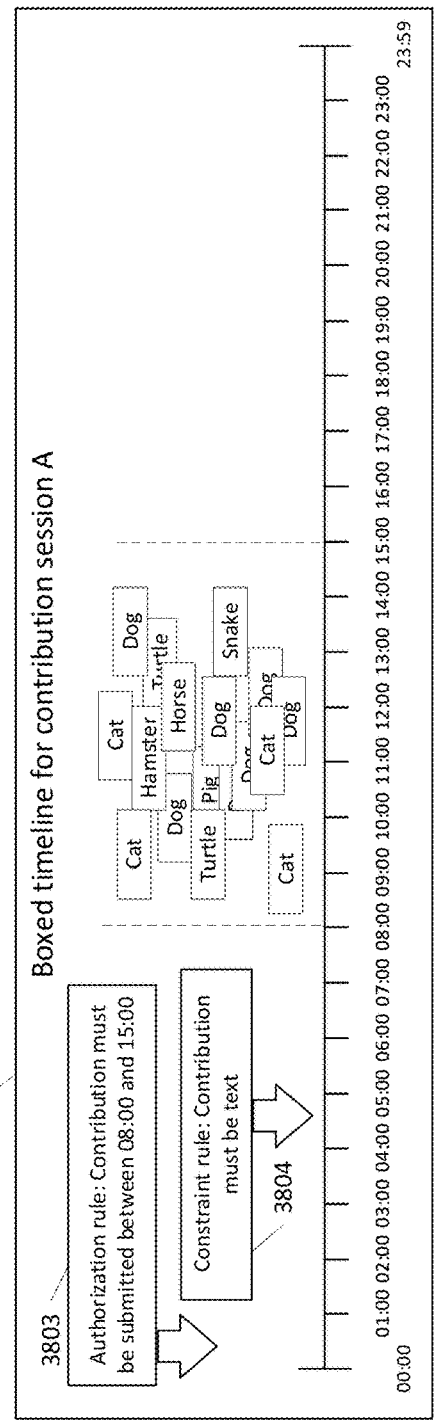
FIGS. 38a and 38b are diagrammatic illustrations examples of how the preferred system time-based contribution rules can be applied.

With reference to FIG. 38a, shown is an example of how contribution rules 3001 can be applied to customize a contribution session according to the needs of a facilitator/collaborator 616. In the example of FIG. 38a, there exists a contribution session where a group of contributors 610 have been asked to contribute cards that name the types of pets that they own. However, the facilitator/collaborator 616 of the contribution session has specified an authorization rule 3002 that only authorizes contributions 3001 made within a time window, between 08:00 and 15:00 3803. The facilitator/collaborator 616 may also use an authorization rule 3002 to keep the contribution session active for some number of days, or it may be a continuous contribution session where contributions 3001 are accepted everyday between 08:00 and 15:00. Additional contribution rules 3001 may also be applied to the contribution session, such a constraint 3004 rule 3804 that permits only text.

In FIG. 38a, the CA 604 has been connected to a contribution session A, through CAC A 3201. An authorization 3002 rule 3803 targets CAC A, where contributions 3001 are only accepted between the time window of 08:00 and 15:00. The submitted contributions 3001 are shown on the timeline in 3801. Multiple contributions 3001 may be processed at once, which is illustrated by contributions 3001 that have been submitted at the same time, such as "Cat" and "Turtle" which have both been submitted at 08:30.

The contributions 3001 may be evaluated against the authorized time window by either considering the time of contribution submission or time of contribution receipt by the CP 601, whichever is preferred. There may exist some delay between contribution 3001 submission and receipt by the CP 601. The interpretation of the time window may be important in the case shown in FIG. 38a, because the authorization 3002 rule 3803 may be interpreted differently for different time zones. The time zone of the contributions 3001 may need to be converted to a common time zone, especially when the authorization 3002 rule 3803 is evaluated on geographically distributed CA 604 or if the CP 601 is hosted on remote or distributed servers. The time zone may be specified in the authorization 3002 rule 3803 as meta-data and then it may be accounted for when authorization 3002 rule 3803 is evaluated, in conjunction with the time of contribution 3001 submission or receipt.

Figure 38B:
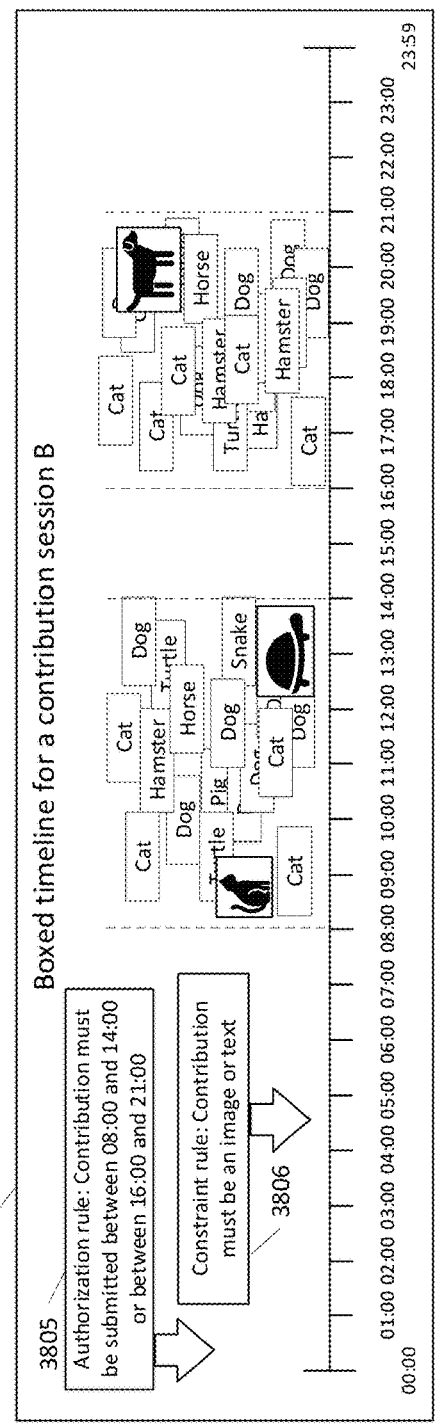

With reference to FIG. 38b, illustrated is authorization 3002 rule 3805 similar to the one in FIG. 38a, but contributions 3001 are permitted within two windows: 08:00 to 14:00 and 16:00 to 21:00. The two windows may be specified by two authorization rules 3002, one rule per time window, however both authorization rules 3002 must be compounded into one authorization 3002 rule 3805 that will only permit contributions 3001 when one of the referenced authorization rules 3002 evaluate to true and the other to false. It is not possible for a contributor 610 to submit one contribution 3001 within multiple time windows, so for the contribution 3001 to be permitted, exactly one of the time windows must be satisfied. In FIG. 38b, the contribution session is specified by CAC 3201 B, as the CA 604 is shown to be connected to. Additional contribution rules 3001 may also be applied in addition to the time windowed authorization 3002 rule 3805, such as a constraint 3004 rule 3806 specifying that only images or texts are submitted to the session. Again, constraint 3004 rule 3806 is a compound of two constraint 3004 rules, where one rule allows only text, and another allows only images. The constraint 3004 rule 3806 evaluates to true when exactly one of the two contribution rules 3001 referenced is true.

Both examples in FIG. 38a and FIG. 38b demonstrate the advantage of using contribution rules 3001 within contribution sessions, especially if the contribution rules 3001 may be modified in real-time. The facilitator/collaborator 616 of the contribution session may have a quick way to modify the contribution rules 3001 or which contribution rules 3001 are applied, such as through a dashboard, which makes it convenient and flexible to customize an information-collecting contribution session. For example, the facilitator/collaborator 616 may switch between the scenarios in FIG. 38a and FIG. 38b by modifying the contribution rule 3001 targets, modifying the contribution rules 3001 themselves, or by distributing different CACs 3201 to the contributors 610, such as either CAC A in FIG. 38a or CAC B in FIG. 38b.

With reference to FIG. 39a, shown is another example of an authorization rule 3002 applied to a contribution session, where the contributors 610 are only authorized to contribute if they are located within the "Active Contribution Zone" 3901 circled on the map in 3801. If any contributors 610 are located outside of the "Active Contribution Zone" 3901, then the CA 604 or CP 601 will not permit their contributions 3001. Location-based authorization rules 3002 may be based on GPS coordinates or they may be based by connections to Wi-Fi hotspots. For example, the CA 604 may use the GPS location of the device 604 to detect whether the contributor 610 is located, and if the location falls within the radius around the location specified in the authorization rule 3002, then the contributor 610 may be permitted to contribute.

With reference to FIG. 39b, shown is the application of a rule similar to the one shown in FIG. 39a, however two location-based contribution zones are permitted by the authorization rule 3002, "Active Contribution Zone 1" 3902 and "Active Contribution Zone 2" 3903. Each active contribution zone may be separately specified by two different location-based authorization rules 3002, but CAC B of FIG. 39b is affected by one authorization rule 3002 that evaluates both location-based authorization rules 3002. For contributions 3301 to be permitted for CAC B 3201 in FIG. 39b, either contribution rules 3001 for "Active Contribution Zone 1" 3902 or "Active Contribution Zone 2" 3903 should be satisfied. For location-based authorization rules 3002, there may be cases where multiple contribution rules 3001 may be satisfied, since the geographic areas may overlap.

Contribution rules 3001 may also be stacked in such a way that the examples in FIG. 39a or FIG. 39b may be combined with the examples in FIG. 38a or FIG. 38b. For example, a contribution session may have the following contribution rules 3001: contributions must be text, contributions must be submitted between 08:00 and 15:00, and the contributions must originate from either "Active Contribution Zone 1" 3902 or "Active Contribution Zone 2".

Figure 40A:
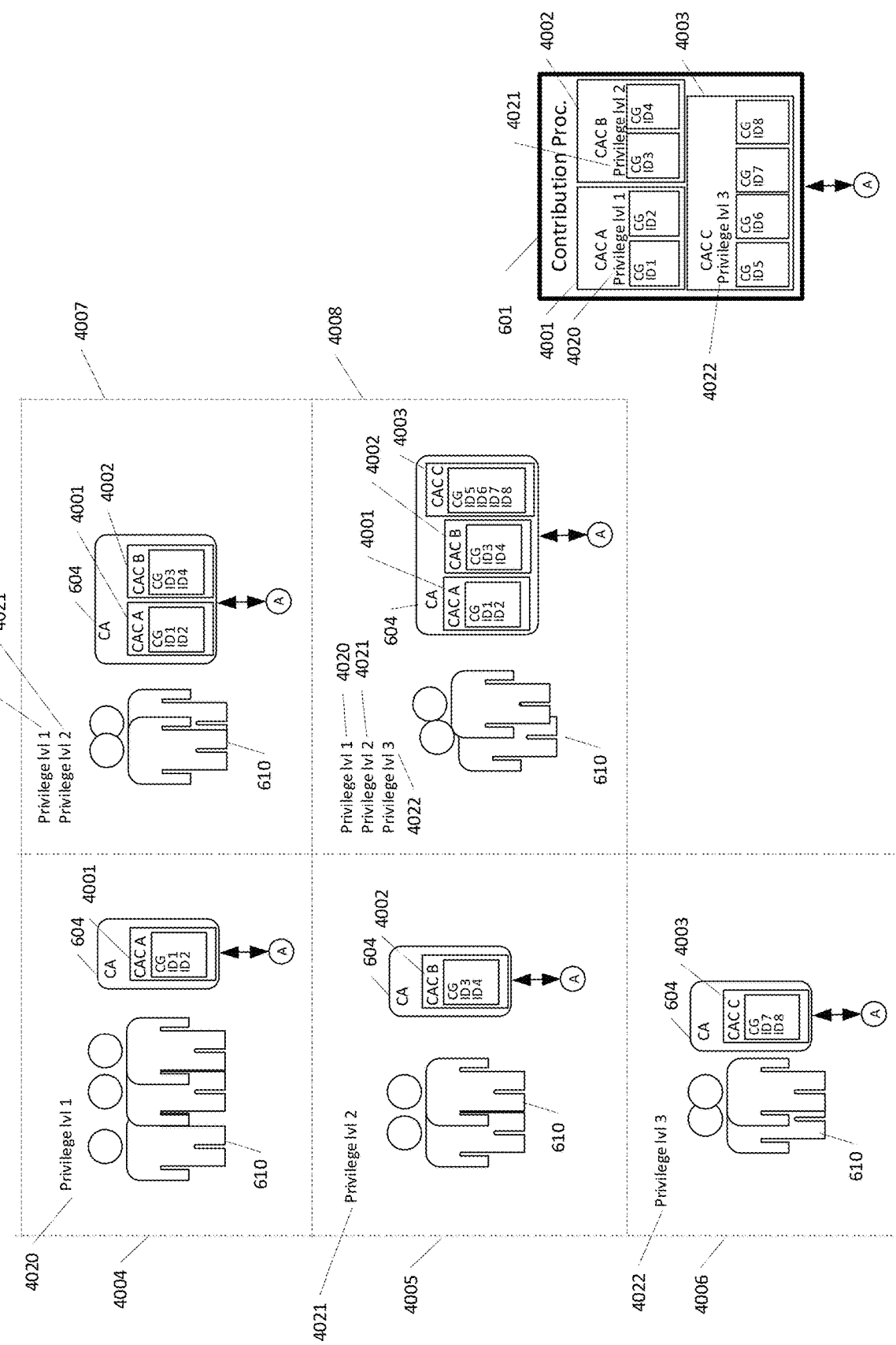
FIGS. 40a and 40b are diagrammatic illustrations examples of how the preferred system contributor privilege-based contribution rules can be applied.

With reference to FIG. 40a, illustrated is one way that a CAC 3201 may be used to provide different contribution privileges for different contributors 610. In FIG. 40a, each CAC provides access to different CGs 2302, and therefore the CACs 3201 provide different contribution privileges. The CP 601 has three CACs 3201 with IDs A 4001, B 4002, and C 4002, where CAC A 4001 provides a privilege level of '1' 4020, CAC B 4002 provides a privilege level of '2' 4021, and CAC C 4002 provides a privilege level of '3' 4022. For example, a contributor 610 with privilege level '1' 4020 can only contribute to CG 2302 1 and 2, whereas a contributor 610 with privilege level '2' 4021 can only contribute to CG 2302 3 and 4. Cases in rectangles 4004, 4005, 4006, 4007, and 4008 in FIG. 40a all show groups of contributors 610 that have individually been authorized to different levels of privilege. For example, a facilitator/collaborator 616 collecting feedback from a school may organize different levels of contribution privilege for students than for teachers, because different types of data may need to be collected from each group. All contributors 610 in case 4004 have been authorized to CAC A 4001, and therefore only have privilege level of '1' 4020. Similarly, the contributors 610 in case 4005 have been authorized to a privilege level of '2' 4021 and the contributors 610 in case 4006 have been authorized to a privilege level of '3' 4022.

However, if multiple CACs 3201 are entered by the contributors 610, then the different privilege levels can be combined. In case 4007, the contributors 610 have authorized to both CAC A 4001 and CAC B 4002, and therefore have privilege levels of '1' 4020 and '2' 4021. In case 4008, the contributors 610 have authorized to both CAC A 4001, CAC B 4002, and both CAC C 4003, so therefore those contributors have privilege levels of '1' 4020, '2' 4021, and '3' 4022.

Figure 40B:
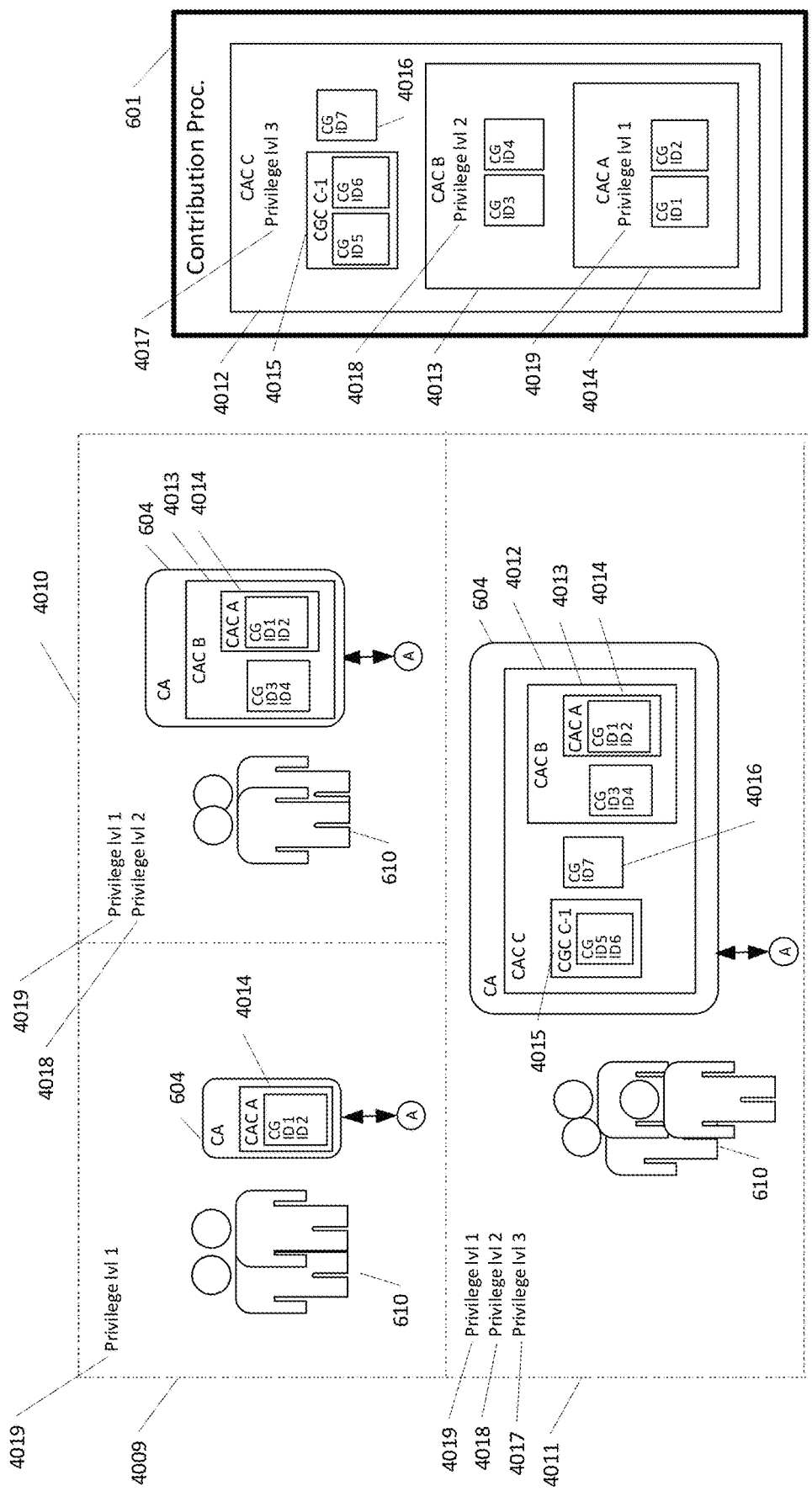

With reference to FIG. 40b, shown is another way to provide different contribution privileges for contributors 610, which may be done by nesting CACs 3201. The CP 601 in FIG. 40b contains three CAC 3201, where one is nested within another. CAC C 4012 contains CAC B 4013, which in turn contains CAC A 4014. Authorization into any parent CAC 3201 provides access to all nested CAC 3201 children. For example, in case 4010, contributors 610 have authorized into CAC B 4013, which means that the contributors 610 may also contribute into CAC A 4014. Therefore, the contributors 610 in 4010 may contribute to CG 2302 3 and 4, but also into the CG 2302 of CAC A 4014, which are CG 2302 1 and 2. In case 4011, the contributors 610 have been authorized to contribute to CAC C 4012, so then the contributors 610 may also contribute to CAC B 4013 and CAC A 4014. The advantage of nesting CACs 3201 is that only one CAC 3201 needs to be authorized, even for contributors 610 that have multiple privilege levels. In comparison, the examples in FIG. 40a need multiple CACs 3201 to be authorized in order to satisfy multiple privilege levels.

The individual components shown in outline or designated by blocks in the attached drawings are all well-known in the electronic processing arts, and their specific construction and operation are not critical to the operation or best mode for carrying out the invention. While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system including one or more servers coupled to one or more user devices through networks for allowing the user devices to contribute multimedia data to one or more digital workspaces regardless of geographic locations of the user devices, comprising:

a contribution processor implemented in the one or more servers, wherein the contribution processor comprises one or more contribution group collections that comprise one or more contribution groups, and is configured to receive contribution data from the user devices and to organize the contribution data in the one or more contribution groups based on contribution sessions represented by contribution access codes, wherein the contribution processor includes contribution rules derived from the contribution access codes, the contribution rules targeting the contribution group collections and contribution groups that have been pre-configured for the contribution group collections and contribution groups to behave as presented, and wherein the contribution data include any type of data object;

a digital workspace processor implemented in the one or more servers, wherein the digital workspace processor comprises the one or more digital workspaces and is configured to access the contribution data in the contribution processor via application programing interface (API) by mapping the contribution group collections and contribution groups of the contribution processor to the one or more digital workspaces, wherein the digital workspace processor is configured to allow one or more authenticated user devices to access the contribution data, and wherein the contribution data stored in the contribution groups are accessed and used by any of a plurality of different types of digital workspace applications of the authenticated user devices that are allowed to access the one or more digital workspaces to which the contribution groups are mapped; and one or more databases to store data from the contribution processor and the digital workspace processor.

2. The contribution system of claim 1 wherein the contribution processor is configured to:

interface with contribution applications installed in the one or more user devices to authenticate and collect contribution data from the user devices;

receive the contribution data from the contribution applications, wherein the contribution applications include one or more contribution group collections including one or more contribution groups mapped by the contribution processor, and the contribution data is submitted to the one or more contribution groups of the contribution applications; and store the contribution data in corresponding contribution groups of contribution group collections of the contribution processor.

3. The contribution system of claim 2 wherein the contribution groups of the contribution processors are mapped to contribution applications of multiple user devices to allow the multiple user devices to contribute data to the same contribution groups of the contribution processor at the same time.

4. The contribution system of claim 2 wherein the contribution groups of the contribution processors are mapped to contribution applications of different user devices to allow the different user devices to contribute data to the corresponding contribution groups of the contribution processor.

5. The contribution system of claim 1 wherein the one or more contribution groups containing the contribution data are mapped to the digital workspace applications of the one or more authenticated user devices to allow the authenticated user devices to modify or manage the contribution data.

6. The contribution system of claim 1 wherein the same contribution groups containing the contribution data are accessible to multiple authenticated user devices to allow the multiple authenticated user devices to utilize the contribution data base on needs of each authenticated device.

7. The contribution system of claim 1 wherein the one or more contribution groups containing the contribution data are mapped multiple times to the same authenticated user devices to allow the authenticated user devices to utilize the contribution data multiple ways.

8. The contribution system of claim 1 wherein contribution processor is further configured to store the contribution data in the one or more databases when the contribution data is received, and wherein the digital workspace processor is configured to retrieve the contribution data stored in the one or more databases to allow the authenticated user devices to modify or manage the contribution data.

9. The contribution system of claim 2 wherein the contribution groups of the contribution processor containing the contribution data are mapped to the one or more digital workspaces in real-time when the contribution data is received from the contribution applications.

10. The contribution system of claim 1 wherein the contribution group collections are nested by containing references to another contribution group collections.

11. The contribution system of claim 2 wherein the contribution applications of the user devices are configured by the contribution rules of the contribution processor to be mapped by the contribution processor.

12. The contribution system of claim 1 wherein the user devices include anonymous user devices that have not been authenticated to identities.

13. The contribution system of claim 1 wherein the data object includes one or more of texts, inking, document objects, notes objects, files, documents, spreadsheets, presentation formats, computer-aided design and drafting (CADD), design, drawing formats, and/or meta-data that include time stamps, date, GPS location, size, shape, resolution, users added attributes, inking, and/or annotations.

14. A method for allowing one or more user devices to contribute multimedia data to one or more digital workspaces regardless of geographic locations of the user devices by utilizing one or more servers coupled to the user devices through networks, comprising:
  interfacing with contribution applications installed in the user devices, via a contribution processor implemented in the servers, for authenticating and collecting contribution data, wherein the contribution processor comprises one or more contribution group collections that comprise one or more contribution groups that store the contribution data, wherein the contribution data include any type of data object;
  receiving, via the contribution processor, contribution data from the contribution applications of the user devices, wherein the contribution applications include one or more contribution group collections including one or more contribution groups mapped by the contribution processor, and the contribution data is submitted to the one or more contribution groups of the contribution applications;
  organizing the contribution data in corresponding contribution groups of contribution group collections of the contribution processor based on contribution sessions represented by contribution access codes, wherein the contribution processor includes contribution rules derived from the contribution access codes, the contribution rules targeting the contribution group collections and contribution groups that have been pre-configured for the contribution group collections and contribution groups to behave as presented;
  mapping the contribution group collections and contribution groups of the contribution processor to the one or more digital workspaces of a digital workspace processor implemented in the servers, wherein the digital workspace processor is configured to access the contribution data in the contribution processor via application programing interface (API); and
  allowing one or more authenticated user devices to access the contribution data via the digital workspace processor, wherein the contribution data stored in the contribution groups are accessed and used by any of a plurality of different types of digital workspace applications of the authenticated user devices that are allowed to access the one or more digital workspaces to which the contribution groups are mapped.

15. The method of claim 14 wherein the contribution groups of the contribution processors are mapped to contribution applications of multiple user devices to allow the multiple user devices to contribute data to the same contribution groups of the contribution processor at the same time.

16. The method of claim 14 wherein the contribution groups of the contribution processors are mapped to contribution applications of different user devices to allow the different user devices to contribute data to the corresponding contribution groups of the contribution processor.

17. The method of claim 14 wherein the one or more contribution groups containing the contribution data are mapped to the digital workspace applications of the one or more authenticated user devices via the digital workspace processor to allow the authenticated user devices to modify or manage the contribution data.

18. The method of claim 14 wherein the same contribution groups containing the contribution data are accessible to multiple authenticated user devices to allow the multiple authenticated user devices to utilize the contribution data base on needs of each authenticated device.

19. The method of claim 14 wherein the one or more contribution groups containing the contribution data are mapped multiple times to the same authenticated user devices to allow the authenticated user devices to utilize the contribution data multiple ways.

20. The method of claim 14 further comprising:
  storing the contribution data via the contribution processor in one or more databases when the contribution data is received; and
  retrieving the contribution data stored in the one or more databases to allow the authenticated user devices to modify or manage the contribution data.

21. The method of claim 14 further comprising mapping the contribution groups of the contribution processor containing the contribution data to the one or more digital workspaces in real-time when the contribution data is received from the contribution applications.

22. The method of claim 14 wherein the contribution group collections are nested by containing references to another contribution group collections.

23. The method of claim 14 wherein the contribution applications of the user devices are configured by the contribution rules of the contribution processor to be mapped by the contribution processor.

24. The method of claim 14 wherein the user devices include anonymous user devices that have not been authenticated to identities.

25. The method of claim 14 wherein the data object includes one or more of texts, inking, document objects, notes objects, files, documents, spreadsheets, presentation formats, computer-aided design and drafting (CADD), design, drawing formats, and/or meta-data that include time stamps, date, GPS location, size, shape, resolution, users added attributes, inking, and/or annotations.

26. One or more non-transitory computer-readable media implemented in one or more servers coupled to one or more user devices through networks for allowing the user devices to contribute multimedia data to one or more digital workspaces regardless of geographic locations of the user devices, the non-transitory computer readable media including instructions configured to cause one or more processors to perform operations comprising:

interfacing with contribution applications installed in the user devices, via a contribution processor implemented in the servers, for authenticating and collecting contribution data, wherein the contribution processor comprises one or more contribution group collections that comprise one or more contribution groups that store the contribution data, wherein the contribution data include any type of data object;

receiving, via the contribution processor, contribution data from the contribution applications of the user devices, wherein the contribution applications include one or more contribution group collections including one or more contribution groups mapped by the contribution processor, and the contribution data is submitted to the one or more contribution groups of the contribution applications;

organizing the contribution data in corresponding contribution groups of contribution group collections of the contribution processor based on contribution sessions represented by contribution access codes, wherein the contribution processor includes contribution rules derived from the contribution access codes, the contribution rules targeting the contribution group collections and contribution groups that have been pre-configured for the contribution group collections and contribution groups to behave as presented;

mapping the contribution group collections and contribution groups of the contribution processor to the one or more digital workspaces implemented in the servers, wherein the digital workspace processor is configured to access the contribution data on the contribution processor via application programing interface (API); and allowing one or more authenticated user devices to access the contribution data via the digital workspace processor, wherein the contribution data stored in the contribution groups are accessed and used by any of a plurality of different types of digital workspace applications of the authenticated user devices that are allowed to access the one or more digital workspaces to which the contribution groups are mapped.

27. The one or more non-transitory computer-readable media of claim 26 wherein the contribution groups of the contribution processors are mapped to contribution applications of multiple user devices to allow the multiple user devices to contribute data to the same contribution groups of the contribution processor at the same time.

28. The one or more non-transitory computer-readable media of claim 26 wherein the contribution groups of the contribution processors are mapped to contribution applications of different user devices to allow the different user devices to contribute data to the corresponding contribution groups of the contribution processor.

29. The one or more non-transitory computer-readable media of claim 26 wherein the one or more contribution groups containing the contribution data are mapped to the digital workspace applications of the one or more authenticated user devices via the digital workspace processor to allow the authenticated user devices to modify or manage the contribution data.

30. The one or more non-transitory computer-readable media of claim 26 wherein the same contribution groups containing the contribution data are accessible to multiple authenticated user devices to allow the multiple authenticated user devices to utilize the contribution data base on needs of each authenticated device.

31. The one or more non-transitory computer-readable media of claim 26 wherein the one or more contribution groups containing the contribution data are mapped multiple times to the same authenticated user devices to allow the authenticated user devices to utilize the contribution data multiple ways.

32. The one or more non-transitory computer-readable media of claim 26 wherein the operations further comprising:

storing the contribution data via the contribution processor in one or more databases when the contribution data is received; and retrieving the contribution data stored in the one or more databases to allow the authenticated user devices to modify or manage the contribution data.

33. The one or more non-transitory computer-readable media of claim 26 wherein the operations further comprising mapping the contribution groups of the contribution processor containing the contribution data to the one or more digital workspaces in real-time when the contribution data is received from the contribution applications.

34. The one or more non-transitory computer-readable media of claim 26 wherein the contribution group collections are nested by containing references to another contribution group collections.

35. The one or more non-transitory computer-readable media of claim 26 wherein the contribution applications of the user devices are configured by the contribution rules of the contribution processor to be mapped by the contribution processor.

* * * * *